(12) United States Patent
Ito et al.

(10) Patent No.: US 12,552,349 B2
(45) Date of Patent: Feb. 17, 2026

(54) BRAKE PEDAL DEVICE

(71) Applicant: DENSO CORPORATION, Kariya (JP)

(72) Inventors: Kengo Ito, Kariya (JP); Etsugo Yanagida, Kariya (JP); Daisuke Hokuto, Kariya (JP); Masashi Arao, Kariya (JP); Yasuhisa Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/780,163

(22) Filed: Jul. 22, 2024

(65) Prior Publication Data

US 2024/0383453 A1 Nov. 21, 2024

Related U.S. Application Data

(63) Continuation of application No. PCT/JP2023/001176, filed on Jan. 17, 2023.

(30) Foreign Application Priority Data

Jan. 26, 2022 (JP) .................................. 2022-010189

(51) Int. Cl.
*B60T 7/04* (2006.01)
*B60T 7/06* (2006.01)
(Continued)

(52) U.S. Cl.
CPC ................ *B60T 7/06* (2013.01); *B60T 7/042* (2013.01); *G05G 1/36* (2013.01); *G05G 1/38* (2013.01); *G05G 1/44* (2013.01); *G05G 5/03* (2013.01)

(58) Field of Classification Search
CPC ... B60T 7/02; B60T 7/04; B60T 7/042; B60T 7/06; B60T 8/17; G05G 1/30; G05G 1/36;
(Continued)

(56) References Cited

U.S. PATENT DOCUMENTS 6,330,838 B1 * 12/2001 Kalsi ..................... B60K 26/02
74/560
8,205,523 B2 * 6/2012 Stewart .................... B60T 7/06
74/513

(Continued)

FOREIGN PATENT DOCUMENTS

DE 4109658 A1 * 9/1992 ............... G05G 1/30
EP 0670235 A1 * 9/1995 ............. B60K 26/02
(Continued)

*Primary Examiner* — Adam D Rogers
(74) *Attorney, Agent, or Firm* — Nixon & Vanderhye P.C.

(57) ABSTRACT

In a brake pedal device, a brake pedal is connected to a casing with a posture changeable by a brake operation of a driver, and includes an operation unit that is pressed by a driver. A reaction force generating unit is provided inside the casing, and the reaction force generating unit is configured to generate a reaction force with respect to the brake pedal in accordance with an amount of change in the posture of the brake pedal during the brake operation, and to cause the brake pedal to return to a reference position when the brake operation is released. A sensor unit is provided outside the casing, to detect an amount of change in the posture of the brake pedal, and a sensor protector is provided at the casing in a position away from the brake pedal, to cover at least a part of the sensor unit.

19 Claims, 34 Drawing Sheets

(51) Int. Cl.
  *G05G 1/30* (2008.04)
  *G05G 1/36* (2008.04)
  *G05G 1/38* (2008.04)
  *G05G 1/44* (2008.04)
  *G05G 5/03* (2008.04)

(58) Field of Classification Search
  CPC .. G05G 1/38; G05G 1/44; G05G 5/03; G05G 5/05
  See application file for complete search history.

(56) References Cited

U.S. PATENT DOCUMENTS

| | | | | |
|---|---|---|---|---|
| 8,353,393 | B2 * | 1/2013 | St.Clair | B60T 7/085 |
| | | | | 188/161 |
| 8,502,656 | B2 * | 8/2013 | Lee | G01D 5/145 |
| | | | | 340/426.33 |
| 8,984,986 | B2 * | 3/2015 | Inuzuka | G05G 5/03 |
| | | | | 74/513 |
| 11,981,202 | B2 * | 5/2024 | Nagashima | B60K 26/02 |
| 12,204,360 | B2 * | 1/2025 | Hokuto | B60T 7/042 |
| 12,269,452 | B2 * | 4/2025 | Hokuto | B60T 7/06 |
| 12,304,304 | B2 * | 5/2025 | Ito | B60T 7/06 |
| 12,366,879 | B2 * | 7/2025 | Fukuda | G05G 5/05 |
| 2006/0219048 | A1 | 10/2006 | Ueno | |
| 2010/0206122 | A1 * | 8/2010 | Seiltz | G05G 1/38 |
| | | | | 74/512 |
| 2011/0271736 | A1 | 11/2011 | Dang | |
| 2012/0056739 | A1 | 3/2012 | Lee et al. | |
| 2014/0343814 | A1 | 11/2014 | Byun et al. | |
| 2018/0253120 | A1 | 9/2018 | Kim et al. | |
| 2020/0371543 | A1 | 11/2020 | Kita et al. | |
| 2021/0271285 | A1 * | 9/2021 | Viethen | G05G 1/36 |
| 2022/0297645 | A1 | 9/2022 | Yanagida et al. | |
| 2023/0406270 | A1 * | 12/2023 | Hokuto | G05G 1/44 |
| 2024/0217491 | A1 * | 7/2024 | Kim | B60T 7/042 |

FOREIGN PATENT DOCUMENTS

| | | | | |
|---|---|---|---|---|
| JP | H08263160 A | | 10/1996 | |
| JP | 2003261014 A | | 9/2003 | |
| JP | 2004245733 A | | 9/2004 | |
| JP | 2006285305 A | * | 10/2006 | ............ B60T 7/042 |
| JP | 2007253869 A | | 10/2007 | |
| JP | 2011500453 A | * | 1/2011 | ............ B60T 7/042 |
| JP | 2012056564 A | * | 3/2012 | ............ B60T 7/042 |
| JP | 2016004438 A | | 1/2016 | |
| JP | 2019144999 A | * | 8/2019 | ............ B60T 7/042 |
| JP | 2020013361 A | | 1/2020 | |
| JP | 2021094897 A | * | 6/2021 | ........... B60T 13/686 |

* cited by examiner

BRAKE PEDAL DEVICE

CROSS REFERENCE TO RELATED APPLICATION

The present application is a continuation application of International Patent Application No. PCT/JP2023/001176 filed on Jan. 17, 2023, which designated the U.S. and claims the benefit of priority from Japanese Patent Application No. 2022-010189, filed on Jan. 26, 2022. The entire disclosures of all of the above applications are incorporated herein by reference.

TECHNICAL FIELD

The present disclosure generally relates to a brake pedal device.

BACKGROUND

Conventionally, a pedal device is disclosed as the one including a pedal housing, a pedal pad, a Hall sensor that detects an angle of the pedal pad, and a pressure member and an elastic member that generate a reaction force for restoring a position of the pedal pad when a stepping operation is released. The Hall sensor, the pressure member, and the elastic member are housed in an internal space formed inside the pedal housing. Additionally, the pedal pad is supported by the pedal housing.

SUMMARY

According to one aspect of the present disclosure, a brake pedal device includes a casing, a brake pedal, a reaction force generating unit, a sensor unit and a sensor protector. The brake pedal is connected to the casing with a posture changeable by a brake operation of a driver, and includes an operation unit that is pressed by the driver when the brake operation is performed. The reaction force generating unit is provided inside the casing, and the reaction force generating unit is configured to generate a reaction force with respect to the brake pedal in accordance with an amount of change in the posture of the brake pedal during the brake operation, and to cause the brake pedal to return to a reference position when the brake operation is released. The sensor unit is provided outside the casing, to detect an amount of change in the posture of the brake pedal, and the sensor protector is provided at the casing in a position away from the brake pedal, to cover at least a part of the sensor unit.

BRIEF DESCRIPTION OF THE DRAWINGS

Objects, features, and advantages of the present disclosure will become more apparent from the following detailed description made with reference to the accompanying drawings, in which.

DESCRIPTION OF EMBODIMENTS

Figure 1:
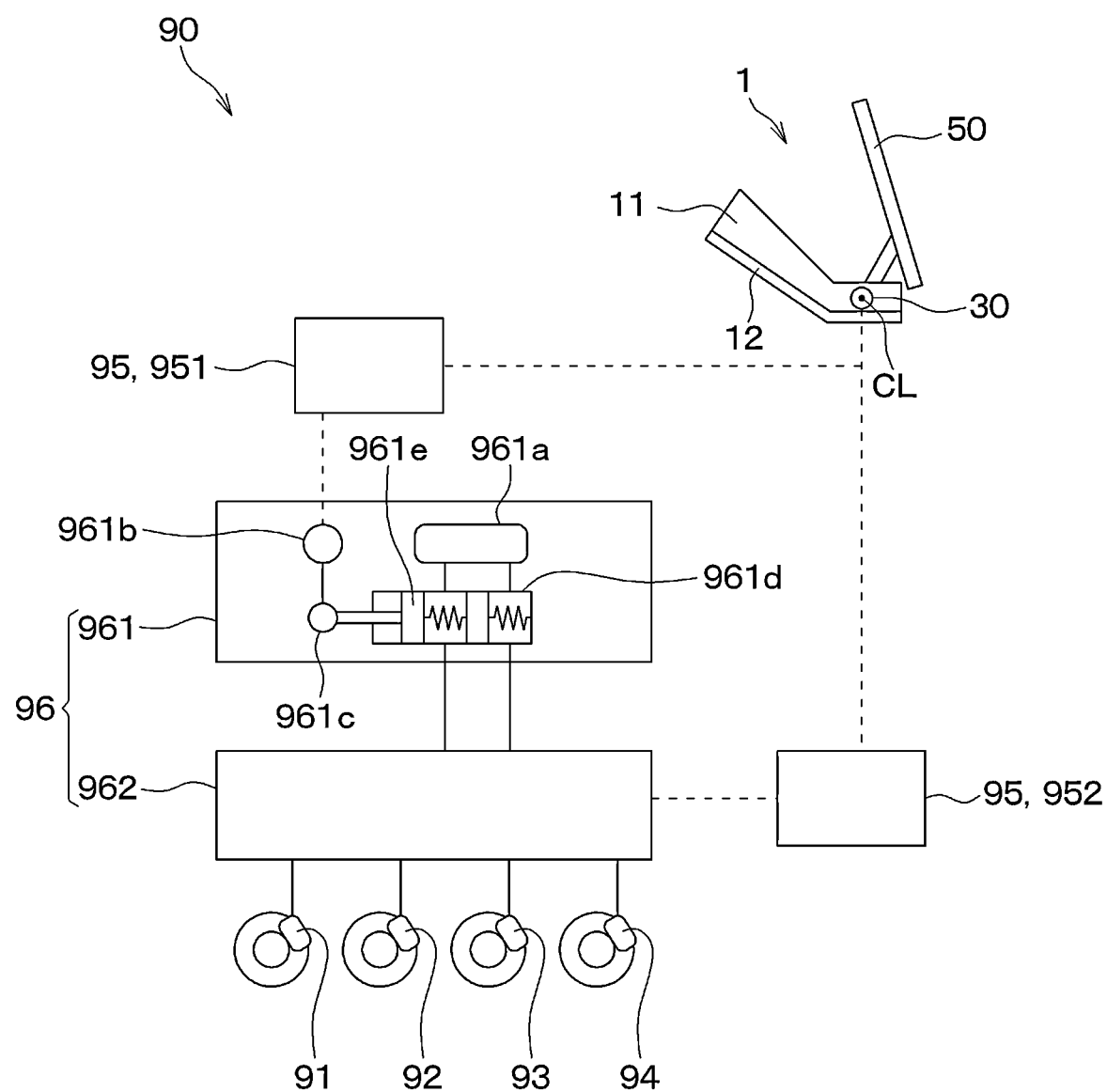
FIG. 1 is a schematic configuration diagram of a brake-by-wire system using a pedal device according to a first embodiment.

A pedal device may be applied to an accelerator pedal device or a brake pedal device of a vehicle.

In case that the pedal device is applied to a brake pedal device, a reaction force generating device may need to generate a larger reaction force than when it is applied to an accelerator pedal device. Therefore, when applying the pedal device to a brake pedal device, the reaction force generating device may possibly be required to have a larger shape (i.e., device size), in order to be capable of generating a larger reaction force. In this case, the internal space of the pedal housing is filled with the reaction force generating device, and there may be a possibility that the Hall sensor cannot be accommodated in the internal space. When the Hall sensor cannot be accommodated in the internal space and is placed outside the pedal housing, the Hall sensor must be protected for avoiding a failure of the Hall sensor due to the driver's foot coming into contact with the Hall sensor.

The inventors of the present application considered protecting the Hall sensor with the pedal pad by enlarging the shape of the pedal pad. Specifically, the inventors of the present application studied protecting the Hall sensor with the pedal pad by extending a side surface of the pedal pad on the Hall sensor side downward to cover the surface of the Hall sensor.

However, if the pedal pad is made larger, there is a risk that the pedal pad may interfere with the Hall sensor placed outside the pedal housing. Further, increasing the size of the pedal pad causes an increase in the mass of the pedal pad. Then, the reaction force generating device that restores the pedal pad when the operation is released needs to generate a larger reaction force in order to cope with the increased mass of the pedal pad. In such case, the pedal housing that supports the pedal pad, which is restored by a larger reaction force, may be required to have a larger device size in order to withstand the larger reaction force.

An increase in the device size of a casing that functions as a pedal housing is undesirable because it becomes factors in increasing the device size of the brake pedal device and in reducing the mountability of the brake pedal device on a vehicle. Such a problem has been found out through intensive studies by the inventors of the present application. The above-described situation is not limited to a case where a sensor unit that detects the angle of the pedal is a Hall sensor, but remains the same regardless of what kind of sensor unit is used.

It is an object of the present disclosure to provide a brake pedal device that protects a sensor unit provided outside a casing while suppressing an increase in size of the casing.

According to one aspect of the present disclosure, a brake pedal device includes a casing, a brake pedal, a reaction force generating unit, a sensor unit and a sensor protector. The brake pedal is connected to the casing with a posture changeable by a brake operation of a driver, and includes an operation unit that is pressed by the driver when the brake operation is performed. The reaction force generating unit is provided inside the casing, and the reaction force generating unit is configured to generate a reaction force with respect to the brake pedal in accordance with an amount of change in the posture of the brake pedal during the brake operation, and to cause the brake pedal to return to a reference position when the brake operation is released. The sensor unit is provided outside the casing, to detect an amount of change in the posture of the brake pedal, and the sensor protector is provided at the casing in a position away from the brake pedal, to cover at least a part of the sensor unit.

Because the sensor protector is provided at the casing away from the brake pedal, the mass of the brake pedal can be reduced compared to a case where the brake pedal has a sensor protector. Therefore, the reaction force of the reaction force generating unit for restoring the brake pedal to the reference position can be made smaller. Thus, it is possible to suppress an increase in size of the casing to withstand the reaction force of the reaction force generating unit, and it is also possible to protect the sensor unit provided outside the casing by using the sensor protector.

Hereinafter, embodiments of the present disclosure will be described with reference to the drawings. In the following embodiments, components that are the same as or equivalent to those described in the preceding embodiment(s) will be indicated by the same reference symbols, and the description thereof may be omitted. In the following embodiments, when only partial configuration is described in one embodiment, remaining configuration may adopt same configurations as that described in the preceding embodiments. The respective embodiments described herein may be partially combined with each other as long as no particular problems are caused even without explicit statement of these combinations.

First Embodiment

The present embodiment will be described with reference to FIGS. 1 to 10. A brake pedal device 1 of the present embodiment is used, for example, in a brake-by-wire system 90 that controls brakes of a vehicle shown in FIG. 1. First, this brake-by-wire system 90 will be explained.

The brake-by-wire system 90 includes wheel cylinders 91 to 94, an ECU 95, a brake circuit 96, and a brake pedal device 1, as shown in FIG. 1.

The wheel cylinders 91 to 94 are arranged at each wheel of the vehicle. Further, brake pads (not shown) are attached to each of the wheel cylinders 91 to 94.

The ECU 95 includes a first ECU 951 and a second ECU 952. The first ECU 951 includes a microcomputer, a drive circuit, and the like (not shown). Further, the first ECU 951 controls a first brake circuit 961 of the brake circuit 96, which will be described later, based on a signal from the brake pedal device 1, which will be described later. The second ECU 952 includes a microcomputer, a drive circuit, and the like (not shown). Further, the second ECU 952 controls a second brake circuit 962 of the brake circuit 96, which will be described later, based on a signal from the brake pedal device 1, which will be described later.

The brake circuit 96 includes the first brake circuit 961 and the second brake circuit 962. The first brake circuit 961 includes a reservoir 961a, a motor 961b, a gear mechanism 961c, and a master cylinder 961d. The reservoir 961a stores brake fluid. The motor 961b drives the gear mechanism 961c. The gear mechanism 961c reciprocates a master piston 961e of the master cylinder 961d in an axial direction of the master cylinder 961d. The second brake circuit 962 includes a solenoid valve (not shown) and the like. Further, the second brake circuit 962 controls a hydraulic pressure of each of the wheel cylinders 91 to 94 by opening and closing the solenoid valve in response to a control signal from the second ECU 952.

The first ECU 951 and the second ECU 952 of the present embodiment are connected to an accelerator sensor (not shown), and are configured to be capable of receiving a signal from the accelerator sensor according to an amount of accelerator opening that changes according to an operation of a driver.

Figure 2:
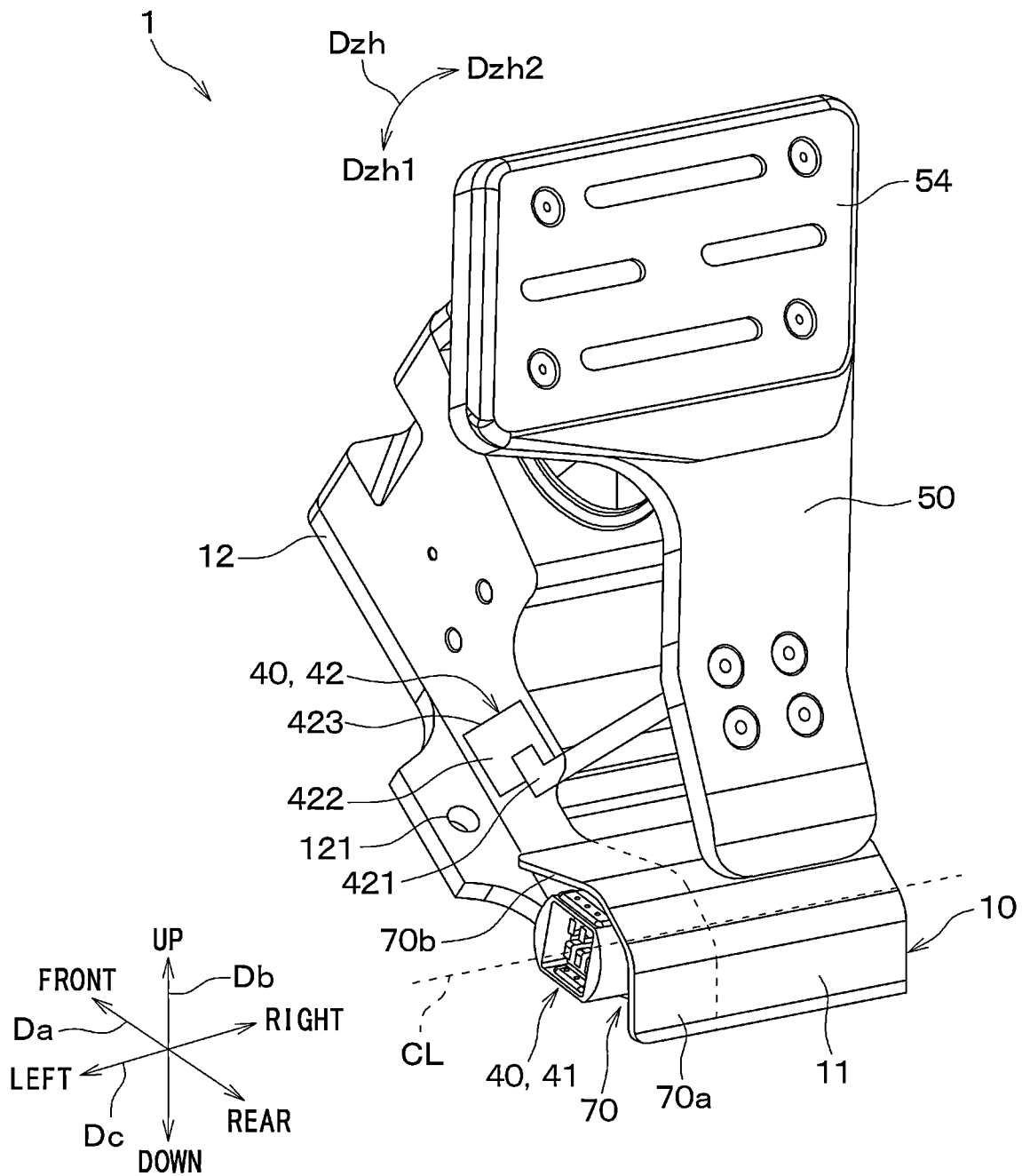
FIG. 2 is a perspective view of a brake pedal device according to the first embodiment.

Here, in order to explain the brake pedal device 1 below, as shown in FIG. 2 and the like, a longitudinal direction of the vehicle is defined as a vehicle longitudinal direction Da. The up-down direction (that is, a vertical direction) of the vehicle is defined as a vehicle vertical direction Db. The left-right direction of the vehicle (that is, a vehicle width direction) is defined as a vehicle left-right direction Dc. A front side in the vehicle longitudinal direction Da is described as a vehicle front. A rear side in the vehicle longitudinal direction Da is described as a vehicle rear. An upper part in the vehicle vertical direction Db is described as an upper part of the vehicle. A lower part in the vehicle vertical direction Db is described as a lower part of the vehicle. A left side in the vehicle left-right direction Dc is described as a vehicle left. A right side in the vehicle left-right direction Dc is described as a vehicle right.

The brake pedal device 1 of the present embodiment is an organ-type pedal device. Here, the organ-type pedal device means a configuration in which a part of a brake pedal 50 of the brake pedal device 1, which will be described later, that is stepped on by the driver is arranged in an upper part of the vehicle (that is, upward in the vertical direction) with respect to a center of rotation of the brake pedal 50.

In the organ-type brake pedal device 1, a posture of the brake pedal 50 changes according to a brake operation by using a foot of the driver. Specifically, in the organ-type brake pedal device 1, when the driver steps on the brake pedal 50 during a brake operation, a part of the brake pedal 50 in an upper part of the vehicle than the center of rotation rotates from a reference position toward a floor 2 or toward a dash panel (not shown) in a vehicle compartment. When a brake operation is performed which increases the driver's stepping force applied to the brake pedal 50 and an amount of stepping of the brake pedal 50 increases, a part of the brake pedal 50 in an upper part of the vehicle than the center of rotation rotates toward the floor 2 or closer to the dash panel.

Further, when a brake operation is performed which reduces the driver's stepping force applied to the brake pedal 50 and the amount of stepping of the brake pedal 50 decreases, a part of the brake pedal 50 in an upper part of the vehicle than the center of rotation rotates away from the floor 2 or away from the dash panel. Further, in the organ-type brake pedal device 1, when the driver performs a brake release operation to release the brake pedal 50, the brake pedal 50 is restored to the reference position before being stepped on.

Hereinafter, the center of rotation of the brake pedal 50 may also be referred to as a rotation axis CL, a circumferential direction of the rotation axis CL may also be referred to as a rotation axis circumferential direction Dzh, and a radial direction of the rotation axis CL may also be referred to as a rotation axis radial direction Dra. Further, among one of two directions along the rotation axis circumferential direction Dzh, a direction in which the brake pedal 50 rotates when the driver performs a brake operation by stepping on the brake pedal 50 may be called as a first circumferential direction Dzh1, and a direction opposite to the first circumferential direction Dzh1 may be called as a second circumferential direction Dzh2. The second circumferential direction Dzh2 is a direction in which the brake pedal 50 rotates when the driver releases a brake operation in a state in which the brake pedal 50 is being stepped on. The first circumferential direction Dzh1 corresponds to a brake operation direction.

The brake pedal device 1 includes a housing 10, a rotary plate 20, a shaft 30, a sensor unit 40, the brake pedal 50, a reaction force generating mechanism 60, and a sensor protection plate 70, as shown in FIGS. 2 to 6. The brake pedal device 1 also includes a connecting rod 80, a rod connecting screw 85, and a covering member 88.

The housing 10 includes a first housing 11, a second housing 12, and a breathing hole 13.

Figure 7:
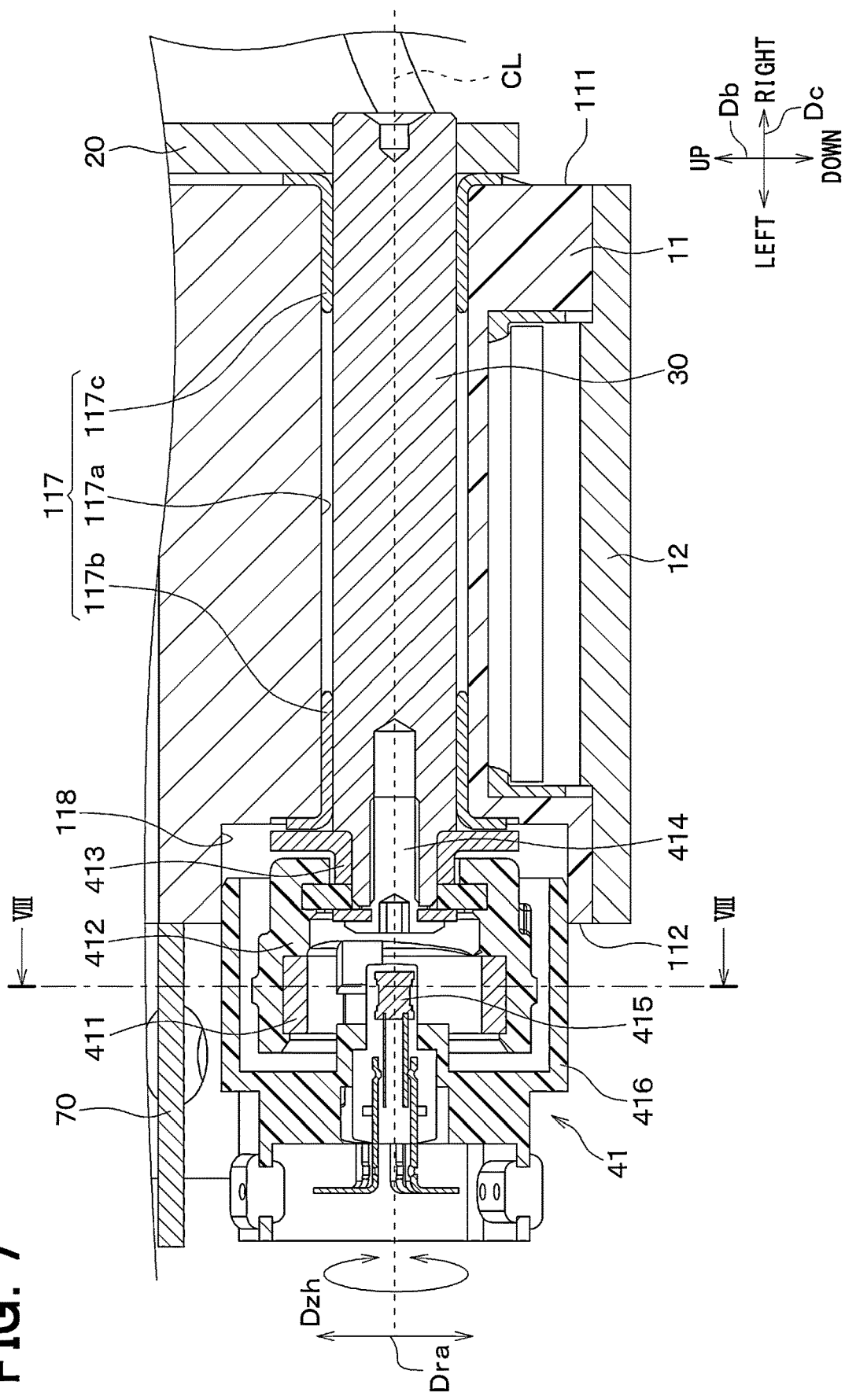
FIG. 7 is a cross-sectional view taken along a VII-VII line of FIG. 5.

The first housing 11 has a box shape, and is made of metal, for example. The first housing 11 of the present embodiment is made of metal, i.e., is formed of an aluminum member having a relatively small mass per unit volume. However, the material of the first housing 11 is not limited, and the first housing 11 may be formed of a metal different from the aluminum member, or may also be formed of a material different from the metal (for example, resin). The first housing 11 includes an upper wall 111, a left side wall 112, a right side wall 113, a front wall 114, a housing space 115, and a housing opening 116. The first housing 11 also includes a shaft supporter 117 and a magnetic sensor supporter 118, as shown in FIG. 7.

Figure 4:
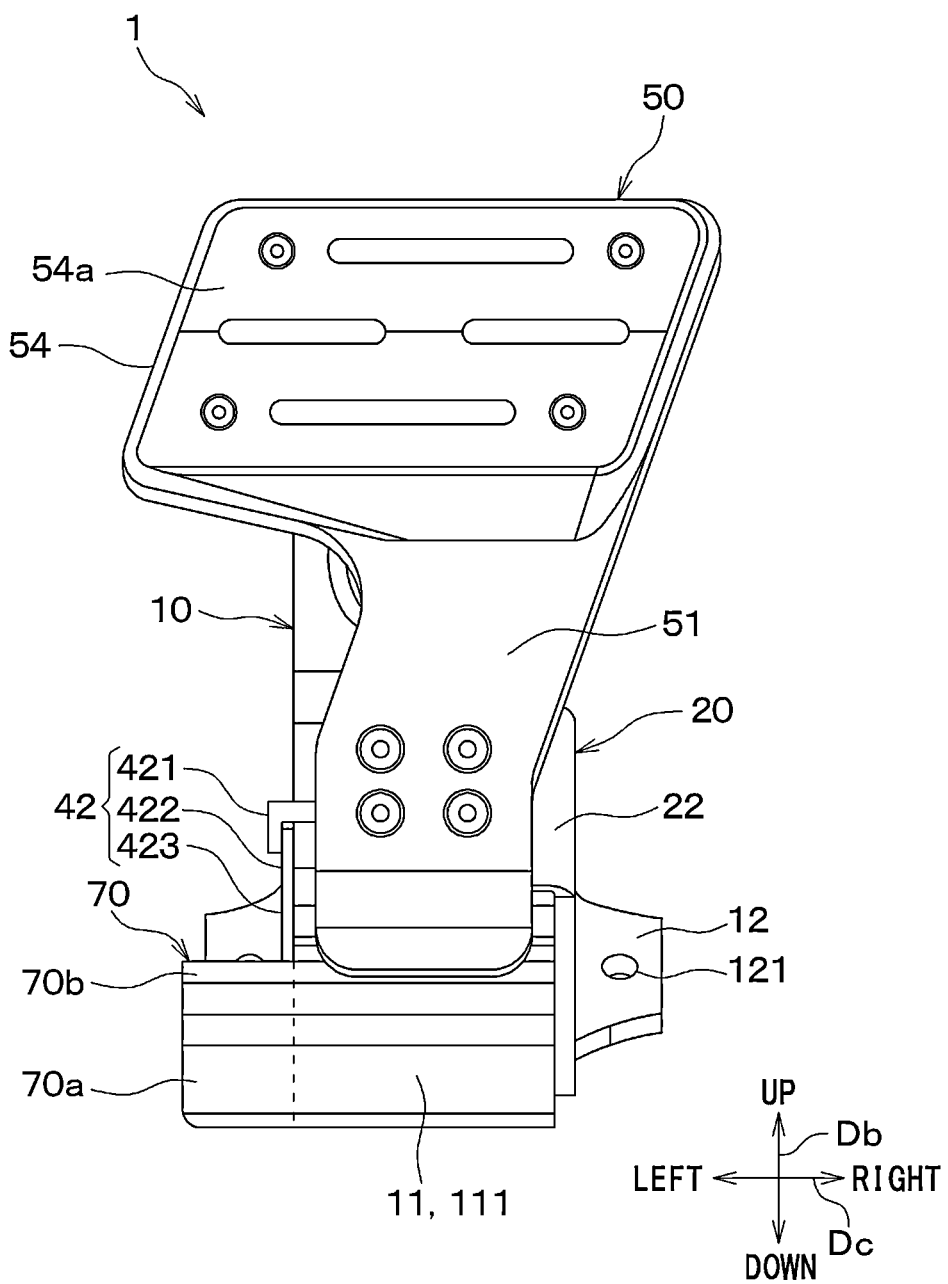
FIG. 4 is a front view of the brake pedal device according to the first embodiment.
Figure 6:
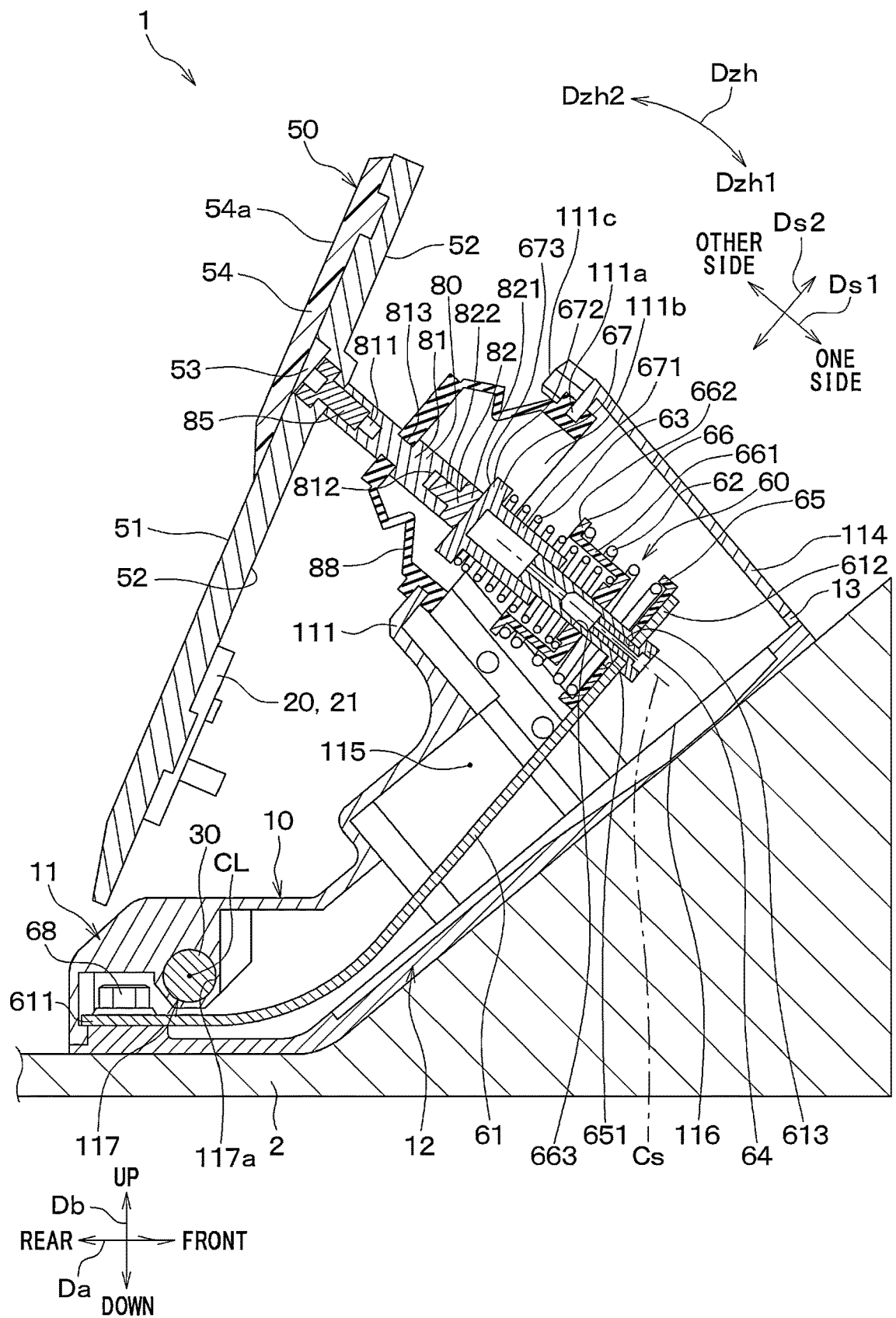
FIG. 6 is a cross-sectional view of the brake pedal device according to the first embodiment.

The upper wall 111 is a wall of the first housing 11 on a vehicle upper side, as shown in FIGS. 4 and 6. Further, the upper wall 111 includes a housing end 111a, a housing hole 111b, and a pedal stopper 111c. The housing end 111a defines the housing hole 111b. The reaction force generating mechanism 60 is inserted into the housing hole 111b. The pedal stopper 111c is provided at a part of the upper wall 111 that is positioned further in a vehicle front than the rotation axis CL. Specifically, the pedal stopper 111c is provided at an upper end of the upper wall 111.

Figure 3:
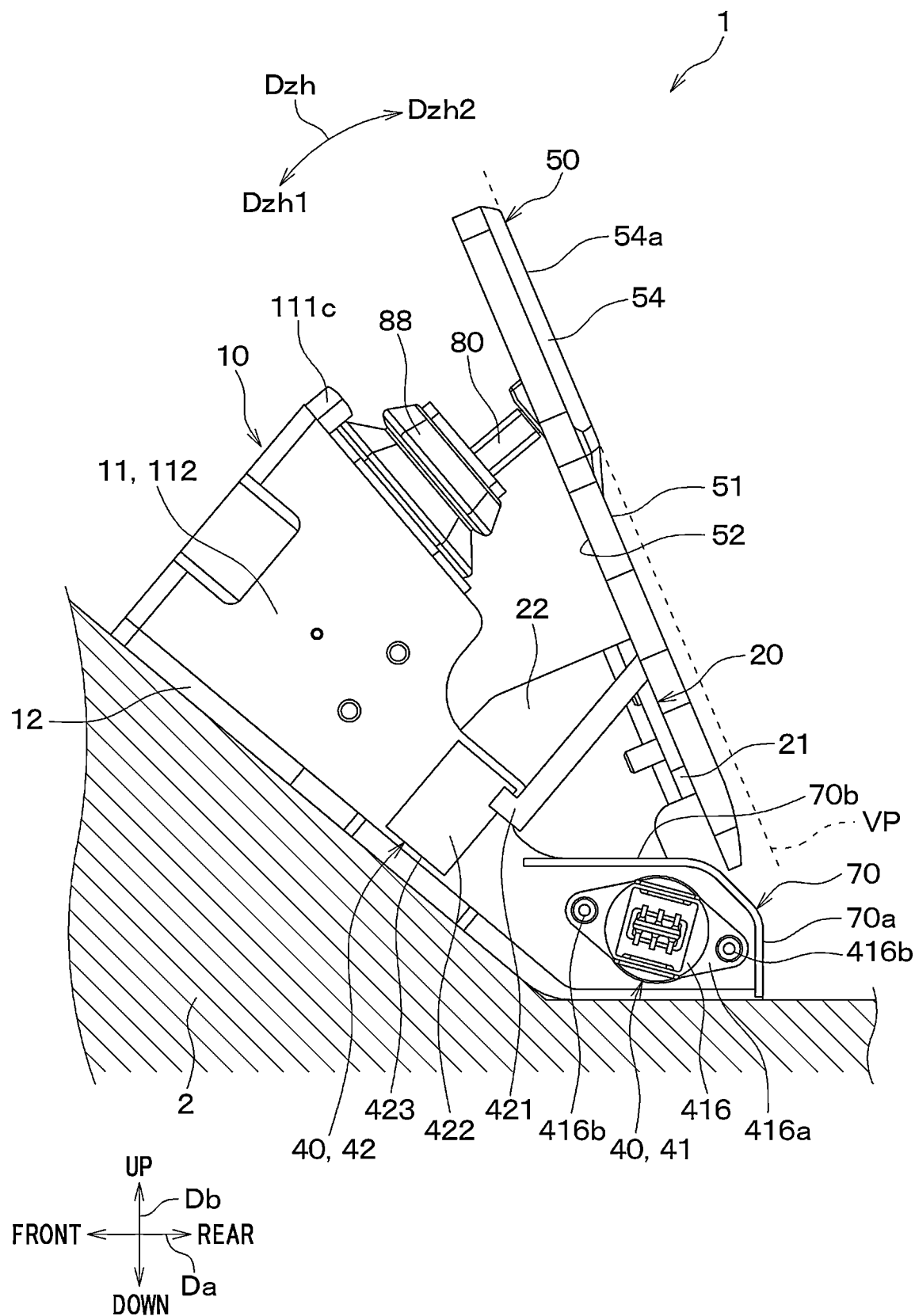
FIG. 3 is a left side view of the brake pedal device according to the first embodiment.
Figure 5:
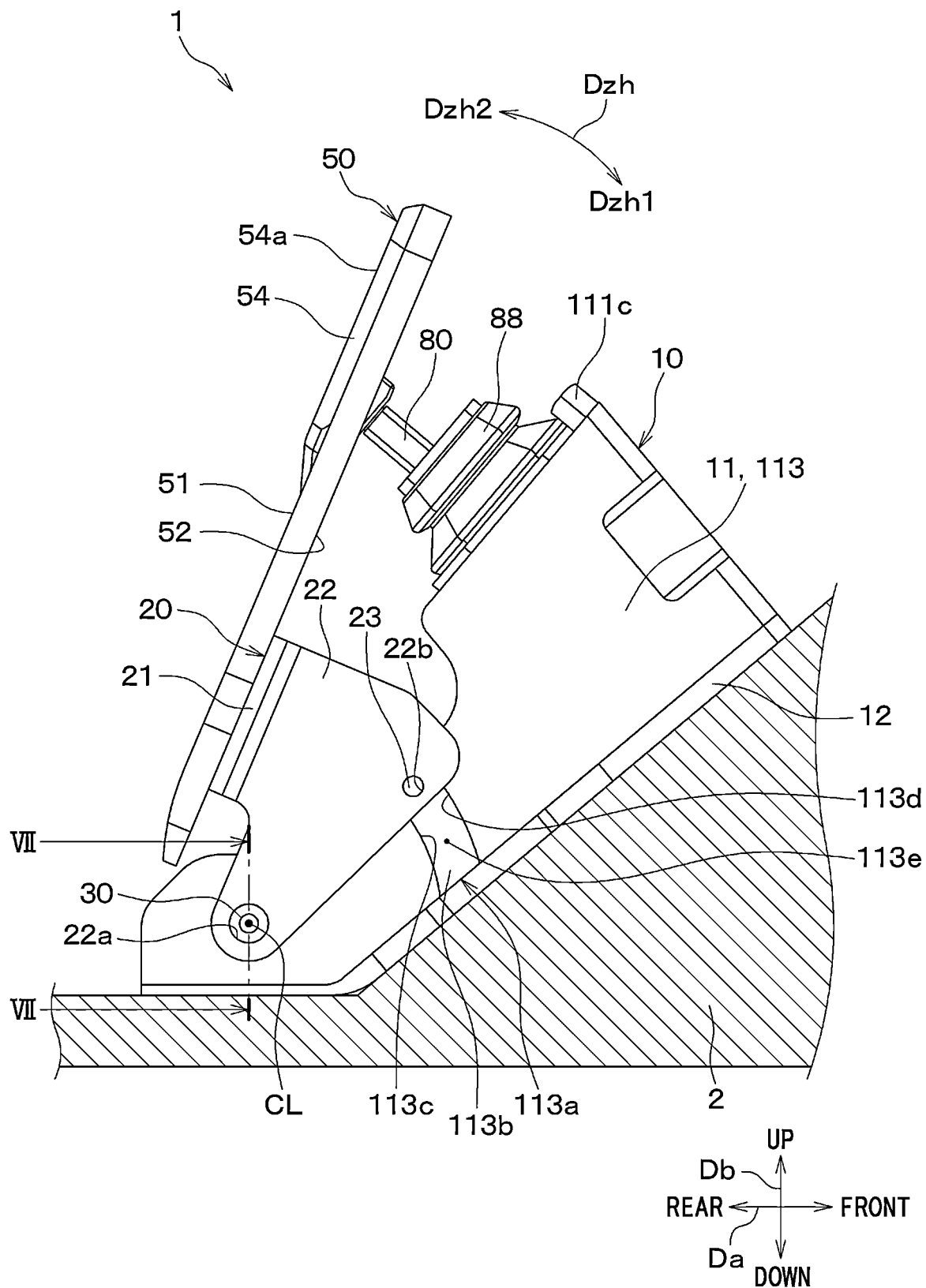
FIG. 5 is a right side view of the brake pedal device according to the first embodiment.

The left side wall 112 is a wall on the vehicle left side of the first housing 11, as shown in FIG. 3. The right side wall 113 is a wall on the vehicle right side of the first housing 11, as shown in FIG. 5. Further, the right side wall 113 includes a wall recess 113a.

The wall recess 113a is recessed from an outer surface of the right side wall 113 toward the vehicle left side. Further, the wall recess 113a includes a wall bottom surface 113b, a wall first side surface 113c, a wall second side surface 113d, and a wall space 113e.

The wall bottom surface 113b is a surface facing to the vehicle right. Further, the wall bottom surface 113b is formed in a circular arc planar shape centered on the rotation axis CL.

The wall first side surface 113c is connected to the vehicle rear side of the wall bottom surface 113b. Further, the wall first side surface 113c is formed in a shape of a side surface of an arcuate column centered on the rotation axis CL.

The wall second side surface 113d is connected to the vehicle front side of the wall bottom surface 113b. Further, the wall second side surface 113d is formed in a shape of a side surface of an arcuate column centered on the rotation axis CL.

The wall space 113e is a space formed by the wall bottom surface 113b, the wall first side surface 113c, and the wall second side surface 113d. Further, the wall space 113e is formed in an arc shape centered on the rotation axis CL, which is defined by the wall bottom surface 113b, the wall first side surface 113c, and the wall second side surface 113d. An opening stopper 23 of the rotary plate 20, which will be described later, is inserted into the wall space 113e.

The front wall 114 is a wall on the vehicle front side of the first housing 11, as shown in FIG. 6. The housing space 115 is a space formed by the upper wall 111, the left side wall 112, the right side wall 113, and the front wall 114. The reaction force generating mechanism 60 is accommodated in the housing space 115.

The housing opening 116 is, as shown in FIG. 6, an opening space defined by the ends of the upper wall 111, the left side wall 112, the right side wall 113, and the front wall 114 respectively on the vehicle lower side in the housing space 115. The housing opening 116 is closed by the second housing 12.

The shaft supporter 117 is a part that supports the shaft 30. The shaft supporter 117 is provided on the lower side of the vehicle than the housing hole 111*b* and on the vehicle rear side than the housing hole 111*b*. The shaft supporter 117 includes, as shown in FIG. 7, a shaft hole 117*a*, a left bearing 117*b*, and a right bearing 117*c*.

The shaft hole 117*a* is a space into which the shaft 30 is inserted. The shaft hole 117*a* is formed in a column shape extending along the vehicle left-right direction Dc centering on the rotation axis CL. The shaft hole 117*a* is formed to penetrate the first housing 11 from the right side of the vehicle toward the vehicle left side. The shaft 30 is inserted into the shaft hole 117*a*.

The left bearing 117*b* and the right bearing 117*c* that rotatably support the shaft 30 inserted into the shaft hole 117*a* are provided on the vehicle left side and the vehicle right side of the shaft hole 117*a*. The left bearing 117*b* rotatably supports the shaft 30 on the vehicle left side. The right bearing 117*c* rotatably supports the shaft 30 on the vehicle right side.

The magnetic sensor supporter 118 is a space into which a magnetic sensor 41, which will be described later, is inserted. The magnetic sensor supporter 118 is formed in a column shape extending in the vehicle left-right direction Dc with the rotation axis CL as the center. Further, the magnetic sensor supporter 118 is formed to extend from the vehicle left side of the first housing 11 toward the vehicle right side to reach the shaft hole 117*a*. The magnetic sensor supporter 118 is formed to have a larger diameter than the shaft hole 117*a*. The magnetic sensor supporter 118 communicates with the shaft hole 117*a* on the right side of the vehicle. The magnetic sensor 41 is inserted into the magnetic sensor supporter 118 from the left side of the vehicle.

Returning to FIGS. 2 to 6, the second housing 12 is formed in a plate shape, and is connected, in the first housing 11, to one end of the upper wall 111 on the vehicle lower side, one end of the left side wall 112 on the vehicle lower side, one end of the front wall 113 on the vehicle lower side and one end of the front wall 114 on the vehicle lower side. That is, the second housing 12 extends continuously from a part of the first housing 11 on the vehicle front side to a part of the first housing 11 on the vehicle rear side. Further, the second housing 12 is provided on an opposite side of the first housing 11, i.e., on one side opposite to the one where the brake pedal 50 is provided. Thereby, the second housing 12 closes the housing opening 116.

Further, the second housing 12 is made of metal. Specifically, the second housing 12 of the present embodiment is made of a metal (for example, iron) that has a larger mass per unit volume than the first housing 11. However, the material of the second housing 12 is not limited, and the second housing 12 may be made of a metal (for example, aluminum) whose mass per unit volume is smaller than iron, or a material different from metal (for example, resin).

Further, the second housing 12 is fixed to the floor 2 by inserting housing bolts (not shown) into bolt holes 121 and holes on the floor 2 corresponding to the bolt holes 121. Thereby, the brake pedal device 1 is fixed to the floor 2. That is, the first housing 11 and the second housing 12 are non-rotating members that are fixed to a vehicle body and do not rotate. The housing 10 including the first housing 11 and the second housing 12 functions as a casing that supports the brake pedal 50, the reaction force generating mechanism 60, and the like. Here, the floor 2 constitutes a floor of the vehicle compartment.

The breathing hole 13 is a space formed at a position between the first housing 11 and the second housing 12, as shown in FIG. 6. Therefore, the breathing hole 13 communicates with the housing space 115 and a space outside the housing 10. Further, the breathing hole 13 is positioned between, for example, (i) one end of a part of the front wall 114 of the first housing 11 on the vehicle front side and on the vehicle lower side and (ii) a part of the second housing 12 on the vehicle front side and on the vehicle upper side.

As shown in FIGS. 4 and 5, the rotary plate 20 is made of metal and has an L-shape. Further, the rotary plate 20 has a back plate part 21, a side plate part 22, and the opening stopper 23. The rotary plate 20 is provided on a surface of the brake pedal 50 that is opposite to another surface that receives a stepping force from the driver. Further, the back plate part 21 of the rotary plate 20 is fixed to the surface of the brake pedal 50 opposite to the surface receiving the stepping force from the driver, for example, by screwing or the like. Therefore, the rotary plate 20 rotates together with the brake pedal 50 about the rotation axis CL.

The side plate part 22 is vertically connected to the vehicle right side of the back plate part 21. Further, the side plate part 22 is arranged on the vehicle right side of the first housing 11. The side plate part 22 includes a shaft hole 22*a* and a stopper hole 22*b*.

The side plate part 22 is connected to the shaft 30 by being inserted into the shaft hole 22*a*. Thereby, the rotary plate 20 rotates together with the shaft 30 about the rotation axis CL.

The stopper hole 22*b* is formed at a position closer to the front of the vehicle than the shaft hole 22*a*. Further, the stopper hole 22*b* is formed at a position overlapping the wall space 113*e* in the vehicle left-right direction Dc. Further, the opening stopper 23 is inserted into the stopper hole 22*b*.

The opening stopper 23 is a shaft fixed to the stopper hole 22*b*, protrudes from the side plate part 22 toward the first housing 11 along the vehicle left-right direction Dc, and enters the wall space 113*e*. Therefore, the opening stopper 23 moves inside the wall space 113*e* about the rotation axis CL when the rotary plate 20 rotates together with the brake pedal 50 and the shaft 30 in the rotation axis circumferential direction Dzh.

When the driver is not performing a brake operation, the opening stopper 23 abuts against the first housing 11 at one end of the wall space 113*e* on a second circumferential direction Dzh2 side, thereby restricting the rotary plate 20 to rotate in the second circumferential direction Dzh2.

The shaft 30 is a rotating part that rotates together with the brake pedal 50. The shaft 30 is made of metal, and has a column shape. The shaft 30 is inserted into the shaft hole 117*a* so that the rotation axis CL coincides with the vehicle left-right direction Dc. The shaft 30 is rotatably supported by the right bearing 117*c* on the vehicle right side, and rotatably supported by the left bearing part 117*b* on the vehicle left side. Thereby, the shaft 30 is rotatably attached to the housing 10, i.e., to be rotatable both in the first circumferential direction Dzh1 and in the second circumferential direction Dzh2. Further, the vehicle right side of the shaft 30 has the rotary plate 20 connected thereto. Further, the magnetic sensor 41 is provided on the vehicle left side of the shaft 30.

The brake pedal 50 is formed in a plate shape, and is made of metal, for example. Specifically, the brake pedal 50 of the present embodiment is made of the same iron as the second housing 12. However, the material of the brake pedal 50 is not limited, and the brake pedal 50 may be made of a metal different from iron (for example, aluminum) or a material different from metal (for example, resin).

The brake pedal 50 is rotatably attached to the rotary plate 20 via the shaft 30 about the rotation axis CL. Specifically, a part of the brake pedal 50 on the vehicle lower side is fixed to the shaft 30 via the rotary plate 20, and is attached to the housing 10 via the shaft 30. Further, the brake pedal 50 is configured such that when the brake pedal 50 is positioned at the reference position, one end of the brake pedal 50 on the vehicle front side is positioned further on the vehicle rear side than one end of the housing 10 on the vehicle front side.

The brake pedal 50 includes a pedal surface 51, a pedal back surface 52, a rod fixing hole 53, and a pad 54, as shown in FIG. 6. The pedal surface 51 is a surface of the brake pedal 50 that faces the driver. The pedal back surface 52 is a surface of the brake pedal 50 that is opposite to the pedal surface 51.

The rod fixing hole 53 is formed to penetrate the brake pedal 50 from the pedal surface 51 to the pedal back surface 52. The rod fixing hole 53 has the rod connecting screw 85 inserted thereinto, which is inserted into the connecting rod 80 to be described later. Thus, the brake pedal 50 is supported by the reaction force generating mechanism 60 via the connecting rod 80.

The pad 54 is an operation part that is stepped on by a foot of the vehicle driver. The pad 54 has an operation surface 54a that is pressed by the driver's foot, and is made of, for example, rubber. The operation surface 54a is a plane substantially parallel to the plate surface of the brake pedal 50. Further, the pad 54 is connected to a part of the pedal surface 51 on the vehicle upper side. The pad 54 covers a pedal surface 51 side of the rod fixing hole 53. Thereby, the rod fixing hole 53 is not visible to the driver of the vehicle.

The pad 54 is provided at a position that is on the vehicle front side and on the vehicle upper side of the shaft 30 at any rotational position of the brake pedal 50 when it rotates about the rotation axis CL. In other words, the position of the shaft 30 is on the vehicle rear side and on the vehicle lower side with respect to the position of the pad 54 in a configuration in which the brake pedal 50 rotates about the rotation axis CL.

The brake pedal 50 configured as described above is arranged diagonally with respect to the vehicle longitudinal direction Da and the vehicle vertical direction Db by the reaction force generating mechanism 60 in a released state of the brake operation in which the driver is not stepping on the brake pedal. Specifically, in the released state of the brake operation, the brake pedal 50 is arranged diagonally so that an upper end of the brake pedal 50 is put, relative to the lower end the brake pedal 50, on the vehicle front side and on the vehicle upper side, and is supported by the reaction force generating mechanism 60.

Further, the brake pedal 50 is configured to be rotatable in the first circumferential direction Dzh1 about the rotation axis CL when the driver performs a brake operation by stepping on the brake pedal 50. That is, the brake pedal 50 rotates from the reference position in the first circumferential direction Dzh1 together with the shaft 30 and the rotary plate 20 as the driver performs the brake operation by stepping on the brake pedal 50.

On the other hand, when the brake pedal 50 is operated such that the driver's stepping force applied to the brake pedal 50 is reduced, an upper end of the brake pedal 50 rotates in the second circumferential direction Dzh2, to move toward the vehicle rear side and toward the vehicle upper side due to the action of the reaction force generating mechanism 60. That is, the brake pedal 50 rotates closer to the reference position as the driver's stepping force decreases. Then, when the driver's brake operation is released, the brake pedal 50 is restored to the reference position by the action of the reaction force generating mechanism 60.

The reaction force generating mechanism 60 generates a reaction force for a load being put via the brake pedal 50 when the driver performs a brake operation. That is, the reaction force generating mechanism 60 generates a reaction force for the driver's stepping force. For example, as shown in FIG. 6, the reaction force generating mechanism 60 includes a leaf spring 61, a large-diameter coil spring 62, and a small-diameter coil spring 63, which are elastically deformed when the brake pedal 50 rotates in the first circumferential direction Dzh1. Further, the reaction force generating mechanism 60 also includes (i) a fastening member 64 for connecting the leaf spring 61, the large-diameter coil spring 62, and the small-diameter coil spring 63, (ii) a lower holder 65, (iii) a spring seat 66, and (iv) an upper holder 67.

The leaf spring 61, the large-diameter coil spring 62, and the small-diameter coil spring 63 are spring members made of a steel material. The above-described leaf springs 61, the large-diameter coil spring 62, and the small-diameter coil spring 63 generate elastic force by being elastically deformed by the driver's stepping force applied via the brake pedal 50. Thereby, the reaction force generating mechanism 60 applies a reaction force for the brake pedal 50 in response to the driver's stepping force.

Further, when the driver's brake operation is released, the reaction force generating mechanism 60 restores the brake pedal 50 back to the reference position, due to restoration of the shapes of the leaf spring 61, the large-diameter coil spring 62, and the small-diameter coil spring 63, which have been elastically deformed. In the present embodiment, the leaf spring 61, the large-diameter coil spring 62, and the small-diameter coil spring 63 function as a reaction force generating unit.

The leaf spring 61 has a curved surface in a convex shape toward the floor 2 in a state where it is not receiving a load. Further, one plate end 611 that is one of two end parts of the leaf spring 61 is connected to the vehicle rear side of the second housing 12. Specifically, the leaf spring 61 is fixed to the second housing 12 with a housing bolt 68. Thereby, the reaction force generating mechanism 60 is supported by the second housing 12. Further, a lower holder 65 is connected to an other plate end 612 of the leaf spring 61 by the fastening member 64.

The fastening member 64 is a columnar, rod-shaped member extending in a predetermined axial direction, and penetrates a fastening hole 613 provided near the other plate end 612 of the leaf spring 61. Hereinafter, as shown in FIG. 6, a predetermined axis of the fastening member 64 may also be referred to as a coil axis Cs, the axial direction of the coil axis Cs may also be referred to as a coil axis direction Ds1, and the radial direction of the coil axis Cs may also be referred to as a coil radial direction Ds2.

The lower holder 65 is a member that supports the large-diameter coil spring 62. Specifically, the lower holder 65 supports one end of the large-diameter coil spring 62 in a direction in which the large-diameter coil spring 62 is elastically deformed. The lower holder 65 has a plate shape with a thickness direction aligned in the coil axis direction Ds1, and has a lower holder hole 651 penetrating in the coil axis direction Ds1 formed substantially at the center of the lower holder 65. The lower holder 65 is connected to the leaf spring 61 by inserting the fastening member 64 into the lower holder hole 651.

The large-diameter coil spring 62 is a compression coil spring whose axis is the coil axis Cs. That is, the large-diameter coil spring 62 is formed by being wound around the coil axis Cs. The large-diameter coil spring 62 is elastically deformed in the coil axis direction Ds1 by the driver's stepping force applied to the brake pedal 50, thereby generating an elastic force.

The large-diameter coil spring 62 has one end in the coil axis direction Ds1 connected to the lower holder 65 on one of two sides, i.e., one side opposite to a side to which the leaf spring 61 is connected. Further, the large-diameter coil spring 62 is connected to the spring seat 66 on an other end in the coil axis direction Ds1. The large-diameter coil spring 62 is arranged in a compressed state at a position between the lower holder 65 and the spring seat 66.

The spring seat 66 is a member that supports the large-diameter coil spring 62 and the small-diameter coil spring 63. Specifically, the spring seat 66 supports the other end of the large-diameter coil spring 62 in the coil axis direction Ds1, and supports one end of the small-diameter coil spring 63 in the coil axis direction Ds1. The spring seat 66 has a spring seat small-diameter part 661 and a spring seat large-diameter part 662.

The spring seat small-diameter part 661 is formed in a bottomed-cylinder shape having a bottom on one end in the coil axis direction Ds1. Further, an outer diameter of the spring seat small-diameter part 661 is formed to be slightly smaller than an inner diameter of the large-diameter coil spring 62. The spring seat small-diameter part 661 is arranged in a space inside the large-diameter coil spring 62. Further, the size of the spring seat small-diameter part 661 along the coil axis direction Ds1 is smaller than the size of the large-diameter coil spring 62 along the coil axis direction Ds1.

A spring seat hole 663 is formed on a bottom of the spring seat small-diameter part 661 approximately at the center thereof, and penetrates the bottom in the coil axis direction Ds1. The spring seat 66 is connected to the fastening member 64 by inserting the fastening member 64 into the spring seat hole 663.

The spring seat large-diameter part 662 is connected to one end of the spring seat small-diameter part 661 opposite to the bottom thereof, and extends from other end of the spring seat small-diameter part 661 in the coil axis direction Ds1 toward a radial outside in the coil radial direction Ds2 in a thin plate shape. That is, the spring seat large-diameter part 662 is connected to the other end of the spring seat small-diameter part 661 in the coil axis direction Ds1. An outer diameter of the spring seat large-diameter part 662 is larger than an outer diameter of the spring seat small-diameter part 661.

Further, an outer diameter of the spring seat large-diameter part 662 is larger than an outer diameter of the large-diameter coil spring 62. One surface of the spring seat large-diameter part 662 in the coil axis direction Ds1 supports other end of the large-diameter coil spring 62 in the coil axis direction Ds1. Thereby, the spring seat 66 and the large-diameter coil spring 62 are connected.

Further, the spring seat 66 accommodates therein a part of the small-diameter coil spring 63. The small-diameter coil spring 63 is connected to the bottom side of the spring seat small-diameter part 661.

The small-diameter coil spring 63 is a compression coil spring whose axis is the coil axis Cs. That is, the small-diameter coil spring 63 is arranged coaxially with the large-diameter coil spring 62, and is formed by being wound around the coil axis Cs. The small-diameter coil spring 63 is elastically deformed in the coil axis direction Ds1 by the driver's stepping force applied to the brake pedal 50, thereby generating an elastic force.

The small-diameter coil spring 63 has one end connected to the bottom of the spring seat small-diameter part 661 in the coil axis direction Ds1, and other end connected to the upper holder 67. Further, a part of the small-diameter coil spring 63 accommodated in the spring seat small-diameter part 661 overlaps, in the coil radial direction Ds2, a part of the large-diameter coil spring 62 that accommodates the spring seat small-diameter part 661. The small-diameter coil spring 63 is arranged in a compressed state at a position between the spring seat 66 and the upper holder 67.

The upper holder 67 is a member that supports the small-diameter coil spring 63. Specifically, the upper holder 67 has a holder small-diameter part 671 and a holder large-diameter part 672. The holder small-diameter part 671 is formed in a column shape. Further, an outer diameter of the holder small-diameter part 671 is smaller than an inner diameter of the small-diameter coil spring 63. The holder small-diameter part 671 is arranged in a space inside the small-diameter coil spring 63.

Further, the size of the holder small-diameter part 671 in the coil axis direction Ds1 is smaller than the size of the small-diameter coil spring 63 in the coil axis direction Ds1. Further, the holder small-diameter part 671 has an inner space into which the fastening member 64 is inserted. Thereby, the leaf spring 61, the lower holder 65, the spring seat 66, and the upper holder 67 are connected to each other by way of the fastening member 64.

Further, the leaf spring 61, the large-diameter coil spring 62, and the small-diameter coil spring 63 are connected in this order from one side to the other side in the coil axis direction Ds1 at a position between the brake pedal 50 and the second housing 12. Further, the leaf spring 61, the large-diameter coil spring 62, and the small-diameter coil spring 63 are mutually supported by elastic force generated by each of themselves, and generate a reaction force for the driver's stepping force applied to the brake pedal 50. That is, the leaf spring 61, the large-diameter coil spring 62, and the small-diameter coil spring 63 are connected in series along the coil axis direction Ds1.

Further, the fastening member 64 is formed to be slidable on an inner circumferential surface of the lower holder hole 651, on an inner circumferential surface of the spring seat hole 663, and on an inner circumferential surface of the holder small-diameter part 671, when the large-diameter coil spring 62 and the small-diameter coil spring 63 are elastically deformed in the coil axis direction Ds1 by the driver's stepping force.

The holder large-diameter part 672 is connected to other side of the holder small-diameter part 671 in the coil axis direction Ds1, and is formed in a thin plate disc shape that closes the holder small-diameter part 671. Further, an outer diameter of the holder large-diameter part 672 is larger than an outer diameter of the holder small-diameter part 671.

Further, an outer diameter of the holder large-diameter part 672 is larger than an outer diameter of the small-diameter coil spring 63. Further, a surface of the holder large-diameter part 672 on one side in the coil axis direction Ds1 supports other end of the small-diameter coil spring 63 in the coil axis direction Ds1. In such manner, the upper holder 67 and the small-diameter coil spring 63 are connected.

Further, the holder large-diameter part 672 has a contact surface 673 on other side in the coil axis direction Ds1 which comes into contact with the connecting rod 80, which will be described later. The contact surface 673 is a surface of the holder large-diameter part 672 that is opposite to the surface that supports the small-diameter coil spring 63, and is formed in a planar shape extending along the coil radial direction Ds2.

The reaction force generating mechanism 60 configured in the above-described manner generates a reaction force that restores the brake pedal 50 to the reference position by elastic force generated by elastic deformation of the leaf spring 61, the large-diameter coil spring 62, and the small-diameter coil spring 63.

The connecting rod 80 is provided at a position between the brake pedal 50 and the upper holder 67, and connects the brake pedal 50 and the upper holder 67. The connecting rod 80 transmits the stepping force of the driver to the upper holder 67 as the brake pedal 50 rotates in the first circumferential direction Dzh1 when the driver's stepping force is applied to the brake pedal 50. The connecting rod 80 is made of metal, and has a rod shape. Further, the connecting rod 80 is provided on a pedal back surface 52 side of the brake pedal 50 to protrude from the brake pedal 50. As shown in FIG. 6, the connecting rod 80 has an arm part 81 connected to the pedal back surface 52 and a pressing part 82 that presses the upper holder 67.

The arm part 81 includes an arm hole 811, an arm recess 812, and a covering recess 813. The arm hole 811 is a hole corresponding to the rod fixing hole 53. The arm part 81 is fixed to the pedal back surface 52 by inserting the rod connecting screw 85 into the arm hole 811 and the rod fixing hole 53.

The arm recess 812 is provided on one end of the arm part 81 opposite to an end that is fixed to the pedal back surface 52. The arm recess 812 is formed by recessing, in the axial direction of the connecting rod 80, the one end of the arm part 81 opposite to the one fixed to the pedal back surface 52.

The covering recess 813 is provided on a side surface of the arm part 81. The covering recess 813 is formed by recessing the side surface of the arm part 81 in a direction perpendicular to the axial direction of the connecting rod 80.

The pressing part 82 includes a contact part 821 and a pressing protrusion 822. The contact part 821 is in contact with the contact surface 673 of the upper holder 67 in the reaction force generating mechanism 60. The pressing protrusion 822 protrudes from a part of the contact part 821 opposite to the contact surface 673 in the axial direction of the connecting rod 80. Further, the pressing protrusion 822 is inserted in and fixed to the arm recess 812 by, for example, press fitting. Thereby, the arm part 81 and the pressing part 82 are connected.

The covering member 88 is called as a dust boot, and is formed in a cylindrical and bellows-like shape using elastically deformable rubber or the like. The covering member 88 is fitted into the covering recess 813 of the arm part 81, and expands and contracts in the axial direction of the connecting rod 80 as the connecting rod 80 moves according to the rotation of the brake pedal 50. Further, the covering member 88 covers the housing hole 111b, and prevents foreign matter from entering into an inside of the housing space 115 from the housing hole 111b.

The sensor unit 40 is an angle detection unit that detects a rotation angle of the brake pedal 50. Specifically, as shown in FIGS. 2 and 3, the sensor unit 40 includes the magnetic sensor 41 and an inductive sensor 42, and these two sensors detect the rotation angle of the brake pedal 50 independently from each other. The magnetic sensor 41 and the inductive sensor 42 detect the rotation angle of the brake pedal 50 using different detection methods. That is, the detection methods of the magnetic sensor 41 and the inductive sensor 42 are different from each other.

The magnetic sensor 41 is an angle sensor that detects the rotation angle of the brake pedal 50, which rotates together with the shaft 30, by detecting the rotation angle of the shaft 30. The magnetic sensor 41 detects the rotation angle of the shaft 30 in a non-contact manner by detecting changes in the magnetic field that it generates when the shaft 30 rotates.

The magnetic sensor 41 is arranged on the vehicle left side of the magnetic sensor supporter 118, as shown in FIGS. 3 and 7. Specifically, the magnetic sensor 41 is fitted into the magnetic sensor supporter 118, and protrudes from the housing 10 to an outside thereof. In such manner, the magnetic sensor 41, similar to the shaft 30, is arranged on the vehicle rear side and on the lower side in the vertical direction than the position of the pad 54 when the brake pedal 50 rotates about the rotation axis CL.

Here, in order to explain the specific arrangement of the magnetic sensor 41, a virtual operation plane VP is defined as a virtual plane perpendicular to the first circumferential direction Dzh1 with reference to the pad 54 when the brake pedal 50 shown in FIG. 3 is put at the reference position. The virtual operation plane VP is a virtual plane extending in a direction in which the operation surface 54a extends when the brake pedal 50 is positioned at the reference position.

The magnetic sensor 41 is provided on a first circumferential direction Dzh1 side in the rotation axis circumferential direction Dzh relative to the virtual operation plane VP. That is, the magnetic sensor 41 is provided on a movable range side of the brake pedal 50 than the virtual operation plane VP. In other words, the magnetic sensor 41 is provided at a position farther away in the first circumferential direction Dzh1 than the pad 54 when the brake pedal 50 is positioned at the reference position. Further, as shown in FIG. 7, the magnetic sensor 41 includes a magnetic field generating part 411, a magnet holding part 412, a shaft connecting part 413, a shaft bolt 414, a magnetic detecting part 415, and a detector holding part 416.

The magnet holding part 412 is a member that holds the magnetic field generating part 411. The magnet holding part 412 is formed in a hollow cylinder shape, and is made of resin, for example. The magnet holding part 412 is arranged coaxially with the shaft hole 117a and the magnetic sensor supporter 118. That is, the magnet holding part 412 is arranged to extend along the vehicle left-right direction Dc having the rotation axis CL serving as an axis thereof. The magnetic field generating part 411 is insert-molded inside the magnet holding part 412. Further, the magnet holding part 412 is connected to the shaft 30 via the shaft connecting part 413.

The shaft connecting part 413 is used for connecting the shaft 30 and the magnet holding part 412. The shaft connecting part 413 is fixed to the shaft 30 at one end thereof on the vehicle left side, for example, with the shaft bolt 414 or the like. Further, the magnet holding part 412 is connected to an outer peripheral part of the shaft connecting part 413. Thereby, the magnet holding part 412 and the magnetic field generating part 411 are configured to be rotatable together with the shaft 30.

Figure 8:
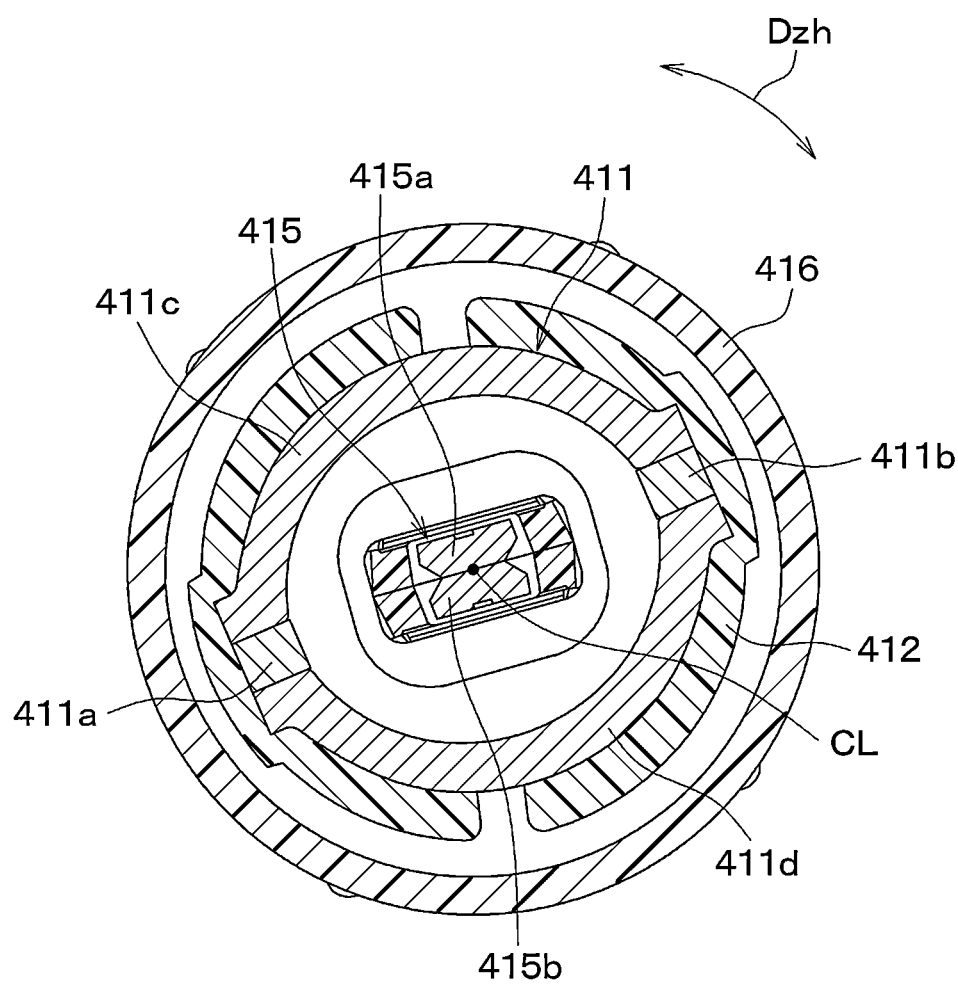
FIG. 8 is a cross-sectional view taken along a VIII-VIII line in FIG. 7.

As shown in FIG. 8, the magnetic field generating part 411 is formed in a cylinder shape by a first magnet 411a, a second magnet 411b, an arc-shaped first yoke 411c, and an arc-shaped second yoke 411d, and is provided around the rotation axis CL of the shaft 30. Specifically, the magnetic field generating part 411 is provided so that its axial center coincides with the rotation axis CL. The magnetic field generating part 411 constitutes a closed magnetic circuit. For example, the closed magnetic circuit is a circuit of magnetic flux in which the first magnet 411a and the second magnet 411b made of permanent magnets and in contact with the first yoke 411c and the second yoke 411d constitute a loop of magnetic path through which magnetic flux flows.

The first magnet 411a and the second magnet 411b are arranged on one side and the other side in the rotation axis radial direction Dra with the rotation axis CL interposed therebetween.

The first yoke 411c has one end in the rotation axis circumferential direction Dzh connected to an N pole of the first magnet 411a, and has other end in the rotation axis circumferential direction Dzh connected to an N pole of the second magnet 411b. The second yoke 411d has the other end in the rotation axis circumferential direction Dzh connected to an S pole of the first magnet 411a, and has the one end in the rotation axis radial direction Dra connected to an S pole of the second magnet 411b.

With the magnetic field generating part 411 formed in such manner, a magnetic field is formed in an inside of the magnetic field generating part 411 in the rotation axis radial direction Dra, where the magnetic flux flies in a direction intersecting with the rotating axis CL from the first yoke 411c toward the second yoke 411d. When the magnetic field generating part 411 rotates about the rotation axis CL together with the shaft 30, the direction of the magnetic field formed in the inside of the magnetic field generating part 411 in the rotation axis radial direction Dra changes. The magnetic detecting part 415 is provided in a region inside the magnetic field generating part 411 in the rotation axis radial direction Dra.

The magnetic detecting part 415 is a detection unit that detects a change in the magnetic field generated by the magnetic field generating part 411. Specifically, as shown in FIG. 8, the magnetic detecting part 415 includes two Hall elements 415a, 415b that (i) detect changes in the magnetic field generated by the magnetic field generating part 411, and (ii) output a signal according to the magnetic field of the magnetic field generating part 411. Each of the Hall elements 415a and 415b is an element that outputs a Hall voltage according to an intensity of the magnetic field perpendicular to a magnetically-sensitive surface provided thereon.

The two Hall elements 415a and 415b are arranged side by side along the rotation axis radial direction Dra. The two Hall elements 415a and 415b are held by the detector holding part 416.

The two Hall elements 415a and 415b may be configured using magneto-resistive elements whose electrical resistance value changes according to an angle of the magnetic field in the horizontal direction with respect to the magnetically-sensitive surface.

The detector holding part 416 is a part that holds the two Hall elements 415a and 415b. The detector holding part 416 is formed in a hollow cylinder shape, and is made of resin, for example. The detector holding part 416 is formed to have a larger inner diameter and a larger outer diameter than the magnet holding part 412, and is fitted into the magnetic sensor supporter 118 to be coaxial with the magnet holding part 412. The magnet holding part 412 holds the two Hall elements 415a and 415b at positions where they overlap the first magnet 411a and the second magnet 411b in the vehicle left-right direction Dc. When the detector holding part 416 is fitted into the magnetic sensor supporter 118, it protrudes from the left side wall 112 toward the vehicle left side.

Further, the detector holding part 416 has a sensor fixing part 416a to which a sensor fixing screw 416b for fixing the detector holding part 416 to the first housing 11 is attached, as shown in FIG. 3. The detector holding part 416 is fixed to the first housing 11 by attaching the two sensor fixing screws 416b to the sensor fixing part 416a. Thereby, the two Hall elements 415a and 415b held by the detector holding part 416 are fixed to the first housing 11. The magnetic sensor 41 configured as described above is protected by the sensor protection plate 70 so that the driver's foot does not come into contact with the magnetic sensor 41.

The inductive sensor 42, similar to the magnetic sensor 41, is an angle sensor that detects the rotation angle of the brake pedal 50. However, unlike the magnetic sensor 41, the inductive sensor 42 directly detects the rotation angle of the brake pedal 50 without detecting the rotation angle of the shaft 30. Further, the inductive sensor 42 is different from the magnetic sensor 41 in the detection method of the rotation angle of the brake pedal 50. Specifically, the inductive sensor 42 is a non-contact angle sensor that detects the rotation angle of the brake pedal 50 in a non-contact manner by detecting a change in the electric current flowing therethrough when the brake pedal 50 rotates.

As shown in FIGS. 2 to 4, the inductive sensor 42 is provided outside the housing 10. The inductive sensor 42 includes a target metal 421 that operates together with the brake pedal 50, a coil part 422 that detects the operation of the target metal 421, and a circuit board 423 that applies an electric current to the coil part 422.

The target metal 421 has a thin plate shape, and is connected to the brake pedal 50 to be rotatable together with the brake pedal 50. An upper end of the target metal 421 is fixed to a part of the brake pedal 50 on the vehicle left side, and extends toward the floor 2 of the vehicle. Specifically, the target metal 421 extends from the vehicle left side of the lower half of the brake pedal 50 toward the vehicle lower side and the vehicle front side, in the upper and lower halves of the brake pedal 50 when dividing the brake pedal 50 into two in the vehicle vertical direction Db.

An end part of the target metal 421 on the vehicle lower side is arranged at a position facing the coil part 422 provided on the left side wall 112 of the first housing 11. The target metal 421 moves in parallel with the left side wall 112 as the brake pedal 50 rotates.

The coil part 422 generates a magnetic field in a detection area using an electric current applied from the circuit board 423. The coil part 422 is implemented on the circuit board 423 and is provided near a rotation area of the target metal 421 that rotates together with the brake pedal 50. Specifically, the coil part 422 is provided on the left side wall 112. The coil part 422 generates a magnetic field in the rotation area of the target metal 421 on the left side wall 112 when an electric current is applied from the circuit board 423.

The circuit board 423 is a detection unit that applies a high-frequency electric current to the coil part 422 and detects the rotation angle of the brake pedal 50 by detecting a change in impedance of the coil part 422. The circuit board 423 includes (i) an oscillation circuit (not shown) that applies a high-frequency electric current to the coil part 422 and (ii) a detection circuit (not shown) that detects a change in impedance of the coil part 422 by detecting a change in the electric current flowing through the coil part 422. The circuit board 423 of the present embodiment functions as an impedance detection unit.

In the inductive sensor 42 configured in such manner, when the target metal 421 is positioned in the area of the magnetic field generated by the coil part 422, an induced current is generated in the target metal 421, thereby changing an impedance value of the coil part 422. Further, the amount of change in the impedance value of the coil part 422 changes according to the rotational position of the target metal 421. The circuit board 423 detects the position of the target metal 421 by detecting the amount of change in the impedance value of the coil part 422. The circuit board 423 detects the rotation angle of the brake pedal 50 by detecting the position of the target metal 421, and outputs a signal corresponding to the rotation angle of the brake pedal 50.

Further, the inductive sensor 42 configured as described above is provided at a position farther away in the first circumferential direction Dzh1 than the virtual operation plane VP when the brake pedal 50 is positioned at the reference position.

The sensor protection plate 70 is a cover member for preventing the magnetic sensor 41 in the sensor unit 40 from being kicked by the driver's foot. The sensor protection plate 70 is formed in a plate shape, and covers a part of the magnetic sensor 41, as shown in FIGS. 2 to 4. Further, the sensor protection plate 70 is provided on a second circumferential direction Dzh2 side of the rotation axis circumferential direction Dzh relative to the magnetic sensor 41 in the sensor unit 40 with reference to the operation surface 54a. That is, the sensor protection plate 70 covers the second circumferential direction Dzh2 side of the magnetic sensor 41.

Further, the sensor protection plate 70 of the present embodiment is made of the same material as the first housing 11, and is formed integrally with the first housing 11. That is, the sensor protection plate 70 of the present embodiment is made of the same metal as the first housing 11, and is formed as an aluminum member having a relatively small mass per unit volume. The sensor protection plate 70 made of aluminum has a smaller mass per unit volume than the second housing 12 made of iron. The sensor protection plate 70 may be formed, for example, by a processing method such as casting, pressing or the like. In FIGS. 2 and 4, the boundary between the sensor protection plate 70 and the first housing 11 is shown by a broken line for the ease of distinction of the sensor protection plate 70.

The sensor protection plate 70 includes a rear plate part 70a that covers the vehicle rear side of the magnetic sensor 41, and an upper plate part 70b that covers the vehicle upper side of the magnetic sensor 41. The rear plate part 70a is connected to a part of the upper wall 111 of the first housing 11 on the vehicle left side and at the most rearward side of the vehicle, and is formed in a flat plate shape extending in the vehicle vertical direction Db and the vehicle left-right direction Dc. Further, the size of the rear plate part 70a in the vehicle left-right direction Dc is approximately the same as the size of a part of the detector holding part 416 that protrudes from the left side wall 112 toward the vehicle left side. Further, the upper plate part 70b is connected to one end of the rear plate part 70a on the vehicle upper side.

The upper plate part 70b is connected to a part of the upper wall 111 of the first housing 11 on the vehicle left side and on the vehicle upper side, and curvingly extends towards the vehicle front side from a part that is connected to the rear plate part 70a along the shape of the upper wall 111. Further, the size of the upper plate part 70b in the vehicle left-right direction Dc is the same as the size of the rear plate part 70a in the vehicle left-right direction Dc. That is, the size of the upper plate part 70b in the vehicle left-right direction Dc is approximately the same as a part of the detector holding part 416 that protrudes from the left side wall 112 toward the vehicle left side. Further, the size of the upper plate part 70b in the vehicle longitudinal direction Da is greater than the size of the detector holding part 416 in the vehicle longitudinal direction Da.

In such manner, the magnetic sensor 41 is covered on the vehicle rear side part and on the vehicle upper side part with the sensor protection plate 70. On the other hand, the magnetic sensor 41 is not covered on the vehicle left side part, on the vehicle front side part, and on the vehicle lower side part by the sensor protection plate 70. That is, the sensor protection plate 70 is provided to cover a part of the magnetic sensor 41 extending from the vehicle rear side to the vehicle upper side. Thus, as shown in FIGS. 2 and 3, the magnetic sensor 41 is exposed to the vehicle compartment space on the vehicle left side, on the vehicle front side, and on the vehicle lower side.

Further, the sensor protection plate 70 is provided on an away side in the rotation axis circumferential direction Dzh than the pad 54 of the brake pedal 50 when the brake pedal 50 is positioned at the reference position according to the operation by the driver. That is, the sensor protection plate 70 is provided on a first circumferential direction Dzh1 side of the rotation axis circumferential direction Dzh relative to the virtual operation plane VP. In other words, the sensor protection plate 70 is provided on a movable range side of the brake pedal 50 than the virtual operation plane VP. The sensor protection plate 70 of the present embodiment is put at an away position on the first circumferential direction Dzh1 side in the rotation axis circumferential direction Dzh than the virtual operation plane VP in any state where the brake pedal 50 is positioned arbitrarily at a position in the movable range. The sensor protection plate 70 of the present embodiment functions as a sensor protector.

The brake-by-wire system 90 is configured as described above. Next, the operation of the brake pedal device 1 will be explained.

When the brake pedal 50 is not stepped on by the driver in the released state of a brake operation, the large-diameter coil spring 62 and the small-diameter coil spring 63 of the reaction force generating mechanism 60 are compressed. At this time, the reaction forces of the large-diameter coil spring 62 and the small-diameter coil spring 63 are transmitted to the brake pedal 50 via the connecting rod 80 connected to the upper holder 67 of the reaction force generating mechanism 60. The above-described reaction force causes the brake pedal 50 to rotate in the second circumferential direction Dzh2. Further, the release stopper 23 connected to the brake pedal 50 via the rotary plate 20 abuts against the first housing 11 at one end of the wall space 113e on the second circumferential direction Dzh2 side. Thereby, when the brake operation is in the released state, the brake pedal 50 is positioned at the reference position.

Then, the driver performs a brake operation by stepping on the brake pedal 50, the brake pedal 50 rotates in the first circumferential direction Dzh1 together with the shaft 30 and the rotary plate 20 about the rotation axis CL. In such manner, the brake pedal 50 rotates from the reference position in the first circumferential direction Dzh1, and rotates in a direction that brings itself closer to the first housing 11.

Then, the magnetic sensor 41 detects the rotation angle of the brake pedal 50 by detecting the rotation angle of the shaft 30 that rotates together with the brake pedal 50. Further, the inductive sensor 42 detects the rotation angle of the brake pedal 50 independently of the magnetic sensor 41. The magnetic sensor 41 and the inductive sensor 42 output signals corresponding to the detected rotation angle of the brake pedal 50 to the first ECU 951 and the second ECU 952.

The first ECU 951 rotates the motor 961$b$ by, for example, supplying electric power to the motor 961$b$. The gear mechanism 961$c$ is driven according to the above, thereby moving the master piston 961$e$. Therefore, the hydraulic pressure of the brake fluid supplied from the reservoir 961$a$ to the master cylinder 961$d$ increases. The increased hydraulic pressure is supplied to the second brake circuit 962.

Further, the second ECU 952 supplies electric power to a solenoid valve (not shown) of the second brake circuit 962, for example. The solenoid valve of the second brake circuit 962 opens according to the above. Therefore, the brake fluid supplied to the second brake circuit 962 is further supplied to each of the wheel cylinders 91 to 94. Therefore, the brake pads attached to the wheel cylinders 91 to 94 rub against the corresponding brake discs. Therefore, each of the wheels is braked, thereby decelerates the vehicle. For example, the second ECU 952 may perform ABS control, VSC control, collision avoidance control, regeneration coordination control, and the like based on the signal from the sensor unit 40 and the signals from other electronic control devices (not shown). Here, ABS is an abbreviation for Anti-lock Braking System, and VSC is an abbreviation for Vehicle Stability Control.

Further, the connecting rod 80 connected to the brake pedal 50 rotates together with the brake pedal 50 about the rotation axis CL. Therefore, the connecting rod 80 is inserted into the housing space 115 from the housing hole 111$b$. In such manner, the bellows-shaped covering member 88 is compressed.

Further, the pressing part 82 of the connecting rod 80 presses the upper holder 67 of the reaction force generating mechanism 60, so that the stepping force applied to the brake pedal 50 is transmitted to the upper holder 67. In such manner, the small-diameter coil spring 63 and the large-diameter coil spring 62 are compressed in the coil axis direction Ds1. Further, the leaf spring 61 is bent in the coil axis direction Ds1. The compressed small-diameter coil spring 63 and large-diameter coil spring 62 generate a reaction force corresponding to the stepping force applied to the brake pedal 50. Further, the bent leaf spring 61 exerts a reaction force according to the stepping force applied to the brake pedal 50.

Thereby, the reaction force generating mechanism 60 generates a reaction force corresponding to the driver's stepping force applied to the brake pedal 50 by the reaction forces respectively generated by the leaf spring 61, the large-diameter coil spring 62, and the small-diameter coil spring 63.

Further, when the brake pedal 50 rotates from the reference position in the first circumferential direction Dzh1, the release stopper 23 connected to the brake pedal 50 via the rotary plate 20 rotates in the first circumferential direction Dzh1 about the rotation axis CL, by moving inside the wall space 113$e$. Then, due to an increase of the driver's stepping force and an increase of the rotation angle of the brake pedal 50, when the upper end of the pedal back surface 52 or its vicinity comes into contact with the pedal stopper 111$c$, rotation of the brake pedal 50 in the first circumferential direction Dzh1 is restricted. That is, the rotation angle of the brake pedal 50 when the pedal stopper 111$c$ contacts the pedal back surface 52 is the maximum rotation angle in the movable range of the brake pedal 50.

Further, when a brake operation is released from a state in which the brake pedal 50 has been rotated from the reference position in the first circumferential direction Dzh1, the brake pedal 50 rotates in the second circumferential direction Dzh2 due to the reaction force of the reaction force generating mechanism 60. Further, as the brake pedal 50 rotates in the second circumferential direction Dzh2, the release stopper 23 rotates together with the brake pedal 50 in the second circumferential direction Dzh2.

Then, the release stopper 23, which rotates together with the brake pedal 50, rotates about the rotation axis CL in the second circumferential direction Dzh2, moves in the wall space 113$e$, and comes into contact with the first housing 11 at the end of the wall space 113$e$ in the second circumferential direction Dzh2. In such manner, the brake pedal 50 is positioned at the reference position due to the restriction of its rotation from the reference position in the second circumferential direction Dzh2.

As described above, the brake pedal device 1 of the present embodiment includes the sensor protection plate 70 that covers a part of the magnetic sensor 41. The sensor protection plate 70 is provided in the housing 10 away from the brake pedal 50.

According to the above, the mass of the brake pedal 50 is reducible compared to a configuration in which the brake pedal 50 is provided with the sensor protection plate 70. Therefore, the reaction force generated by the reaction force generating mechanism 60 for restoring the brake pedal 50 to the reference position when the driver's brake operation is released is reducible. Therefore, it is possible for the housing 10 (i) to suppress the increase in size thereof, to withstand the reaction force generated by the reaction force generating mechanism 60, and (ii) to provide protection for the magnetic sensor 41 provided outside the housing 10 by using the sensor protection plate 70.

Further, according to the embodiment described above, it is possible to achieve the following effects.

(1) In the embodiment described above, the sensor protection plate 70 is provided on the second circumferential direction Dzh2 side of the rotation axis circumferential direction Dzh, which is on the near side of the magnetic sensor 41 in the sensor unit 40. Further, the sensor protection plate 70 is provided on the first circumferential direction Dzh1 side that is on an away side in the rotation axis circumferential direction Dzh than the virtual operation plane VP when the brake pedal 50 is positioned at the reference position.

Figure 9:
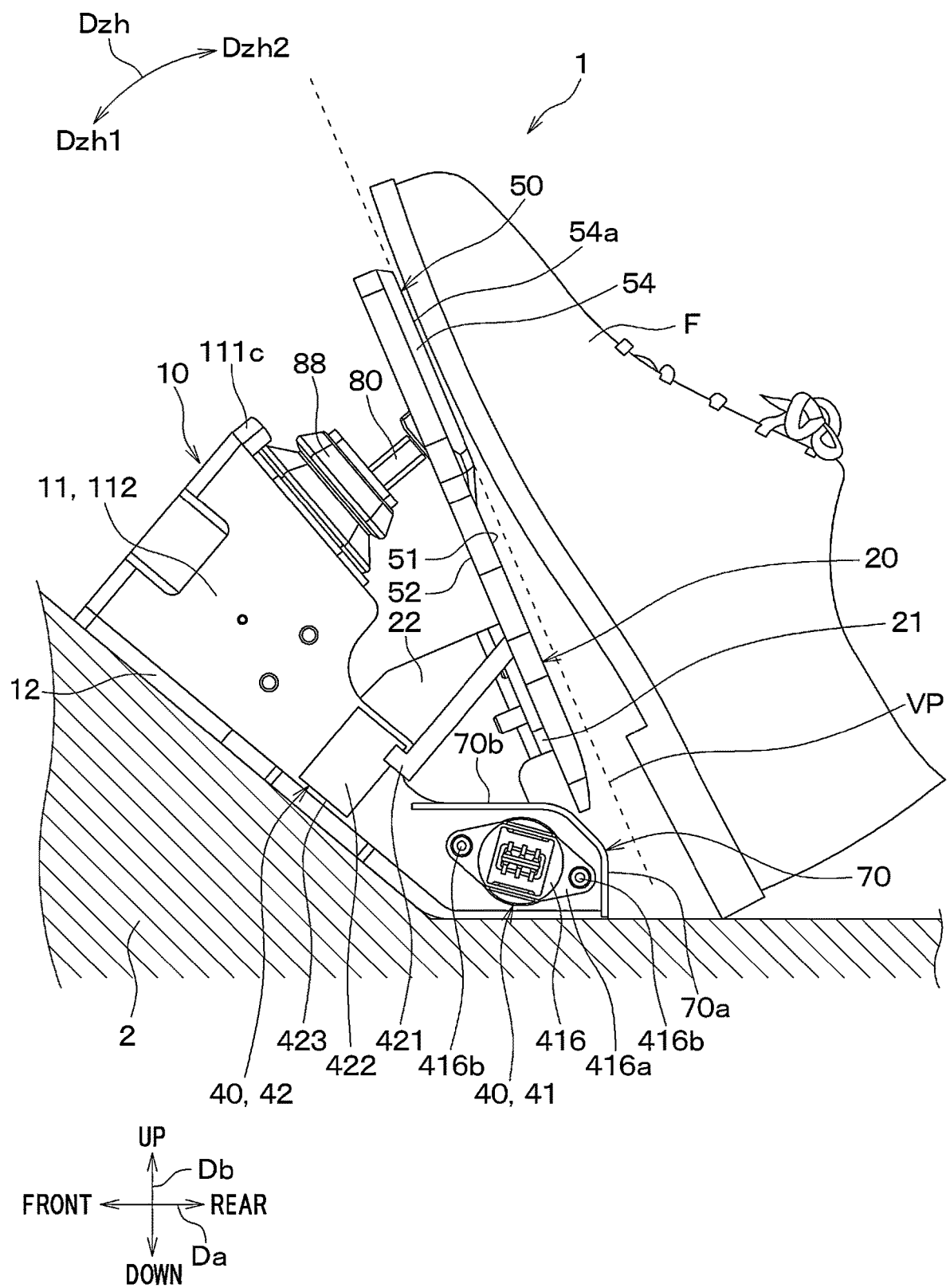
FIG. 9 is a diagram of a positional relationship between a sensor protection plate and a driver's foot according to the first embodiment.
Figure 10:
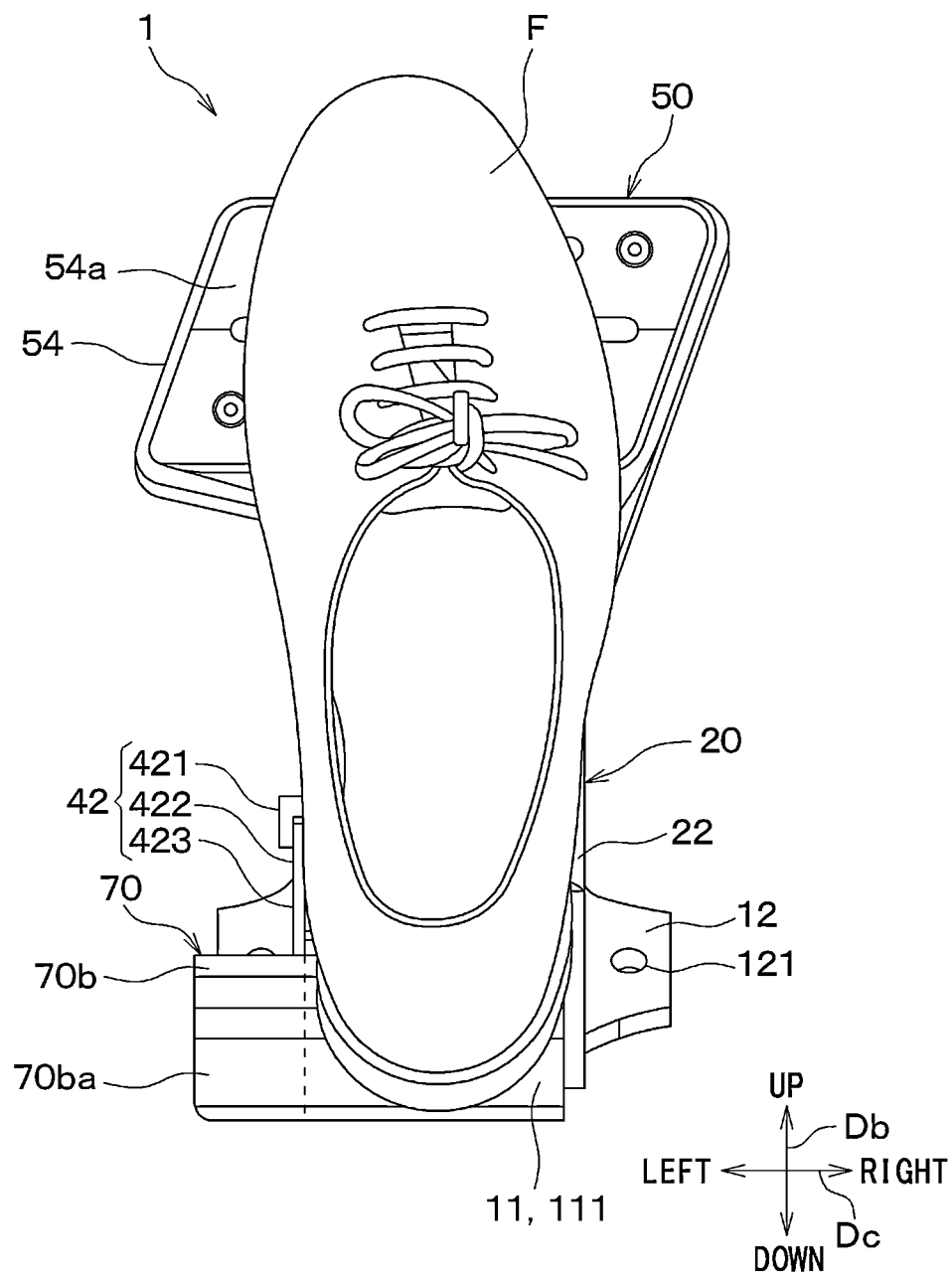
FIG. 10 is another diagram of a positional relationship between the sensor protection plate and the driver's foot according to the first embodiment.

According to the above, as shown in FIGS. 9 and 10, in a state in which the brake pedal 50 is positioned at the reference position, the sensor protection plate 70 is positioned at a position on an away side in the first circumferential direction Dzh1 than the operation surface 54$a$. Therefore, when the brake pedal 50 is operated by a driver's foot F, the sensor protection plate 70 is prevented from interfering with the driver's brake operation.

Further, even when the driver's foot F is positioned on an away side in the first circumferential direction Dzh1 than the pad 54 due to an operational error by the driver, the sensor protection plate 70 can prevent the driver's foot F from coming into contact with the magnetic sensor 41.

(2) In the embodiment described above, the sensor protection plate 70 is formed integrally with the first housing 11.

According to the above, the sensor protection plate 70 can be formed at the same time as the first housing 11 is manufactured, and a manufacturing process for attaching the sensor protection plate 70 to the first housing 11 can be made unnecessary.

(3) In the embodiment described above, the brake pedal device 1 includes (i) the shaft 30 that rotates about a predetermined rotation axis CL together with the brake pedal 50 according to the brake operation, and (ii) the pad 54 that is stepped on by the driver's foot F. The shaft 30 is arranged vertically below the pad 54.

According to the above, compared to a configuration in which the shaft 30 is arranged vertically above the pad 54, the position of a heel of the driver when stepping on the operation part can be brought closer to the shaft 30. Therefore, the operability of the brake pedal 50 is improvable compared to a configuration in which the shaft 30 is arranged vertically above the pad 54.

(4) In the embodiment described above, the sensor unit 40 includes the magnetic sensor 41 and the inductive sensor 42 that detect the rotation angle of the brake pedal 50 using different detection methods.

According to the above, even when one of the magnetic sensor 41 and the inductive sensor 42 cannot detect the rotation angle of the brake pedal 50 due to an external environment or the like, for example, the rotation angle of the brake pedal 50 is detectable by using the other sensor.

(5) In the embodiment described above, the magnetic sensor 41 includes the magnetic field generating part 411 that generates a magnetic field using its own magnetism, and the magnetic detecting part 415 that detects changes in the magnetic field generated by the magnetic field generating part 411, in which the changes in the magnetic field is caused according to the rotation angle of the brake pedal 50.

According to the above, the sensor unit 40 can detect the rotation angle of the brake pedal 50 in a non-contact manner using the magnetic sensor 41. Therefore, it is possible to avoid deterioration of the sensor unit 40 due to wear thereof compared to the case where the sensor unit 40 is configured to use only a contact-type detection method.

(6) In the embodiment described above, the magnetic sensor 41 includes the two Hall elements 415*a* and 415*b* for detecting magnetism.

According to the above, even when there is a situation where one of the two Hall elements 415*a* and 415*b* breaks down, the magnetic sensor 41 can detect the rotation angle of the brake pedal 50 using the other Hall element.

(7) In the embodiment described above, the inductive sensor 42 includes the coil part 422 to which an electric current is applied to generate a magnetic field, and the circuit board 423 that detects a change in impedance of the coil part 422 that changes according to the rotation angle of the brake pedal 50.

According to the above, the sensor unit 40 can detect the rotation angle of the brake pedal 50 in a non-contact manner using the inductive sensor 42. Therefore, it is possible to avoid deterioration of the sensor unit 40 due to wear hereof compared to the case where the sensor unit 40 is configured to use only a contact-type detection method. Further, by generating a magnetic field without using magnetism, an influence of magnetism from an outside of the sensor unit 40 is avoidable.

(8) In the embodiment described above, the reaction force generating mechanism 60 applies a reaction force for the brake pedal 50 in response to the load put to the brake pedal 50. Further, the reaction force generating mechanism 60 also includes the leaf spring 61, the large-diameter coil spring 62, and the small-diameter coil spring 63, which are elastically deformed when the rotation angle of the brake pedal 50 changes due to a brake operation.

The reason for providing the above-described configuration is that, in the brake pedal device 1 used for a brake operation, the reaction force generating mechanism 60 needs to generate a relatively-large reaction force for the brake operation. For example, the reaction force generating mechanism 60 used in the brake pedal device 1 needs to generate a greater reaction force than a reaction force generating mechanism 60 used in a pedal device for performing an acceleration operation. Further, in order to obtain the relatively-large reaction force using only one spring, the size of the one spring tends to be large. Further, by configuring the reaction force generating mechanism 60 to include one spring having a large size, there is a possibility that the size of the reaction force generating mechanism 60 becomes large.

On the other hand, according to the present embodiment in which the reaction force generating mechanism 60 includes three springs: the leaf spring 61, the large-diameter coil spring 62, and the small-diameter coil spring 63, it is possible to avoid an increase in the size of the reaction force generating mechanism 60 while generating a relatively-large reaction force.

First Modification of the First Embodiment

Figure 11:
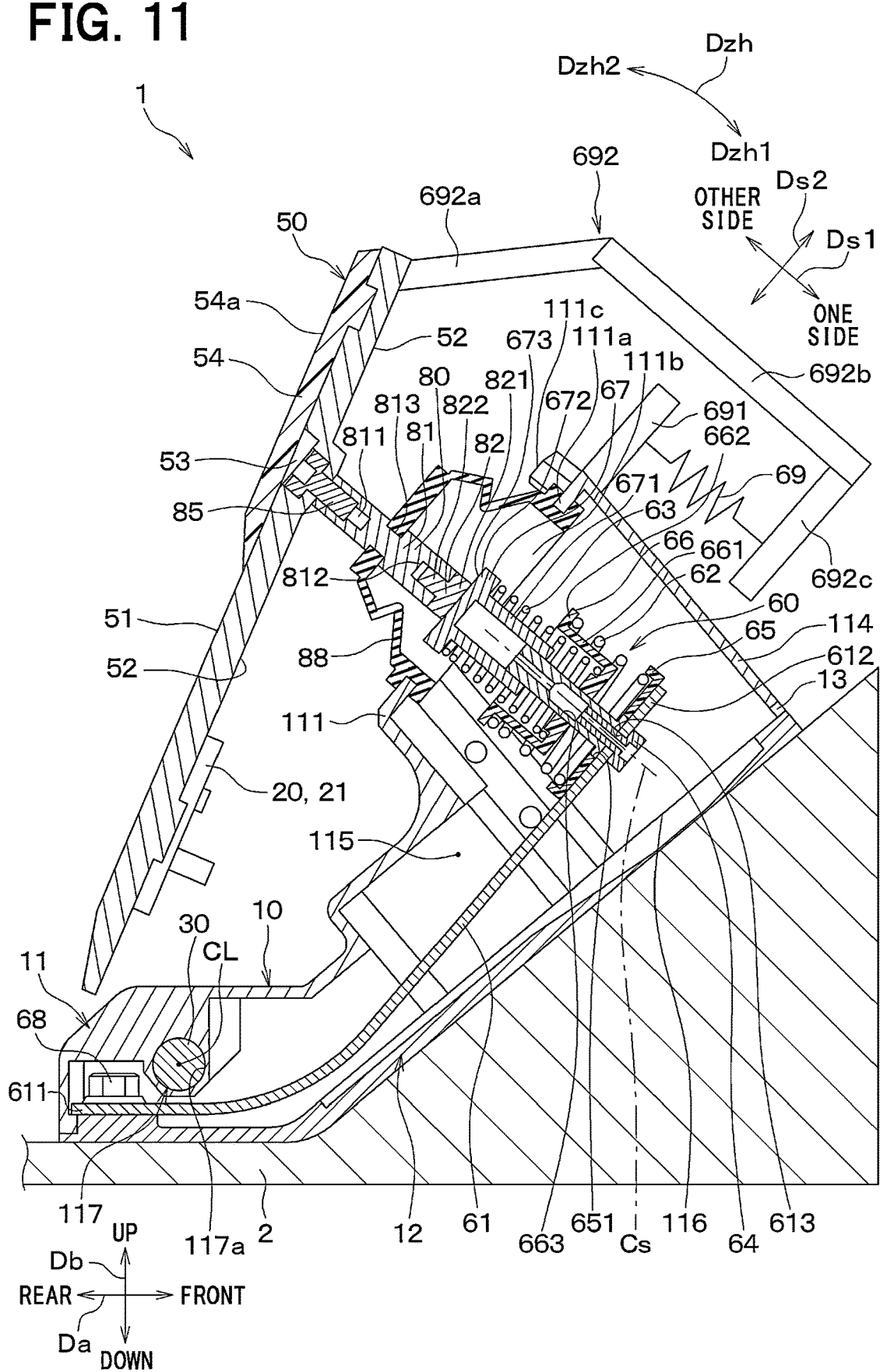
FIG. 11 is a diagram of a first modification of the brake pedal device according to the first embodiment.

In the first embodiment described above, an example has been described in which the reaction force generating mechanism 60 includes the leaf spring 61, the large-diameter coil spring 62, and the small-diameter coil spring 63. However, the present disclosure is not limited to the above. For example, as shown in FIG. 11, the reaction force generating mechanism 60 may include a tension coil spring 69 provided outside the housing 10 in addition to the leaf spring 61, the large-diameter coil spring 62, and the small-diameter coil spring 63.

Specifically, the reaction force generating mechanism 60 may include the tension coil spring 69 provided at a position where a coil axis thereof overlaps with the coil axis direction Ds1. In such case, the reaction force generating mechanism 60 includes a first coil supporter 691 that supports other end of the tension coil spring 69 in the coil axis direction Ds1, and a second coil supporter 692 that supports one end of the tension coil spring 69 in the coil axis direction Ds1.

The first coil supporter 691 has a plate shape, and is fixed to one end of the front wall 114 on the vehicle upper side. The first coil supporter 691 is a non-rotating member that does not rotate together with the brake pedal 50 when the driver operates the brake pedal 50. Further, the other end of the tension coil spring 69 in the coil axis direction Ds1 is fixed to a plate surface of the first coil supporter 691 on the vehicle lower side.

The second coil supporter 692 includes (i) a first plate part 692*a* connected to one end of the brake pedal 50 on the vehicle upper side, and (ii) a second plate part 692*b* connected to an opposite side of the first plate part 692*a* opposite to the side connected to the brake pedal 50. Further, the second coil supporter 692 includes a third plate part 692*c* connected to an opposite side of the second plate part 692*b*, which is opposite to the side thereof connected to the first plate part 692*a*. Each of the first plate part 692*a*, the second plate part 692*b*, and the third plate part 692*c* has a plate shape. The first plate part 692*a* extends toward the vehicle front side. The second plate part 692*b* extends toward the vehicle front side and the vehicle lower side. The third plate part 692c has a plate shape, and extends toward the vehicle rear side and the vehicle lower side. Further, the one end of the tension coil spring 69 in the coil axis direction Ds1 is fixed to a plate surface of the third plate part 692c on the vehicle upper side.

The second coil supporter 692 configured in the above-described manner moves toward the other side in the coil axis direction Ds1 when the brake pedal 50 is rotated by the driver's brake operation.

The tension coil spring 69 is a coil spring having an axis directed in the coil axis direction Ds1. The tension coil spring 69 is arranged at a position between the first coil supporter 691 and the third plate part 692c in a stretched state. Further, the tension coil spring 69 is connected in parallel with the leaf spring 61, the large-diameter coil spring 62, and the small-diameter coil spring 63. When the brake pedal 50 is stepped on by the driver and the third plate part 692c moves toward the other side in the coil axis direction Ds1, the tension coil spring 69 is elastically deformed in the coil axis direction Ds1, and generates an elastic force.

Here, the tension coil spring 69 being connected in parallel with the leaf spring 61, the large-diameter coil spring 62, and the small-diameter coil spring 63 means that the tension coil spring 69 generates the elastic force along a force transmission path that is different from the path along which the leaf spring 61, the large-diameter coil spring 62, and the small-diameter coil spring 63 transmits the elastic force.

The reaction force generating mechanism 60 configured in the above-described manner generates the reaction force corresponding to the driver's stepping force applied to the brake pedal 50, by the reaction forces respectively generated by the leaf spring 61, the large-diameter coil spring 62, the small-diameter coil spring 63, and the tension coil spring 69.

According to the above, by providing the tension coil spring 69 which is a part of the reaction force generating mechanism 60 outside the housing 10, the leaf spring 61, the large-diameter coil spring 62, and the small-diameter coil spring 63 which are provided inside the housing 10 can respectively be made smaller.

Second Modification of the First Embodiment

Figure 12:
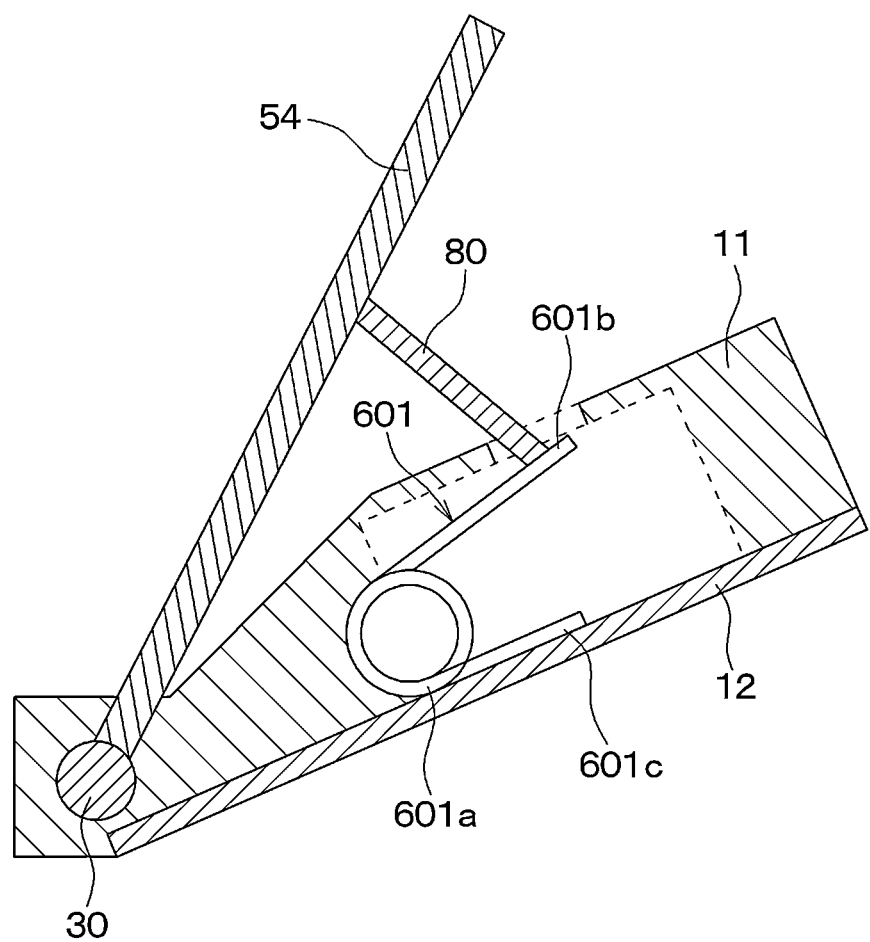
FIG. 12 is a diagram of a second modification of the brake pedal device according to the first embodiment.

In the first embodiment described above, an example has been described in which the reaction force generating mechanism 60 includes the leaf spring 61, the large-diameter coil spring 62, and the small-diameter coil spring 63. However, the present disclosure is not limited to the above. For example, the reaction force generating mechanism 60 may have a configuration in which the leaf spring 61, the large-diameter coil spring 62, and the small-diameter coil spring 63 are replaced with a single torsion coil spring 601, as shown in FIG. 12.

Specifically, the reaction force generating mechanism 60 may include the torsion coil spring 601 whose axial direction is a direction along which the rotation axis CL extends (that is, the vehicle left-right direction Dc). In such case, the torsion coil spring 601 includes a coil body 601a wound around the axis, and one end 601b and other end 601c continuous to the coil body 601a, as shown in FIG. 12.

The torsion coil spring 601 has the one end 601b supported by the connecting rod 80 fixed to the pedal back surface 52 of the brake pedal 50, and the other end 601c supported by the second housing 12. The torsion coil spring 601 is arranged in a twisted state between the connecting rod 80 and the second housing 12. The coil body 601a, the one end 601b, and the other end 601c are configured as an integrally-formed component. Further, in FIG. 12, various components constituting the brake pedal device 1 are simplified as appropriate.

In the reaction force generating mechanism 60 configured as described above, when the connecting rod 80 presses the one end 601b of the torsion coil spring 601, the stepping force applied to the brake pedal 50 is transmitted to the torsion coil spring 601, and the torsion coil spring 601 is twisted. In such manner, the torsion coil spring 601 generates a reaction force corresponding to the driver's stepping force applied to the brake pedal 50 by the elastic force generated by elastic deformation.

According to the above, by configuring the reaction force generating mechanism 60 to have the single torsion coil spring 601, the configuration of the reaction force generating mechanism 60 can be simplified.

Second Embodiment

Next, the second embodiment will be described with reference to FIGS. 13 and 14. The present embodiment is different from the first embodiment in that the inductive sensor 42 is eliminated and a sensor protection plate 70 is formed separately from a first housing 11. The other configurations are the same as those of the first embodiment. Therefore, in the present embodiment, components that are different from the first embodiment will be mainly described, and descriptions of components similar to the first embodiment may be omitted.

Figure 13:
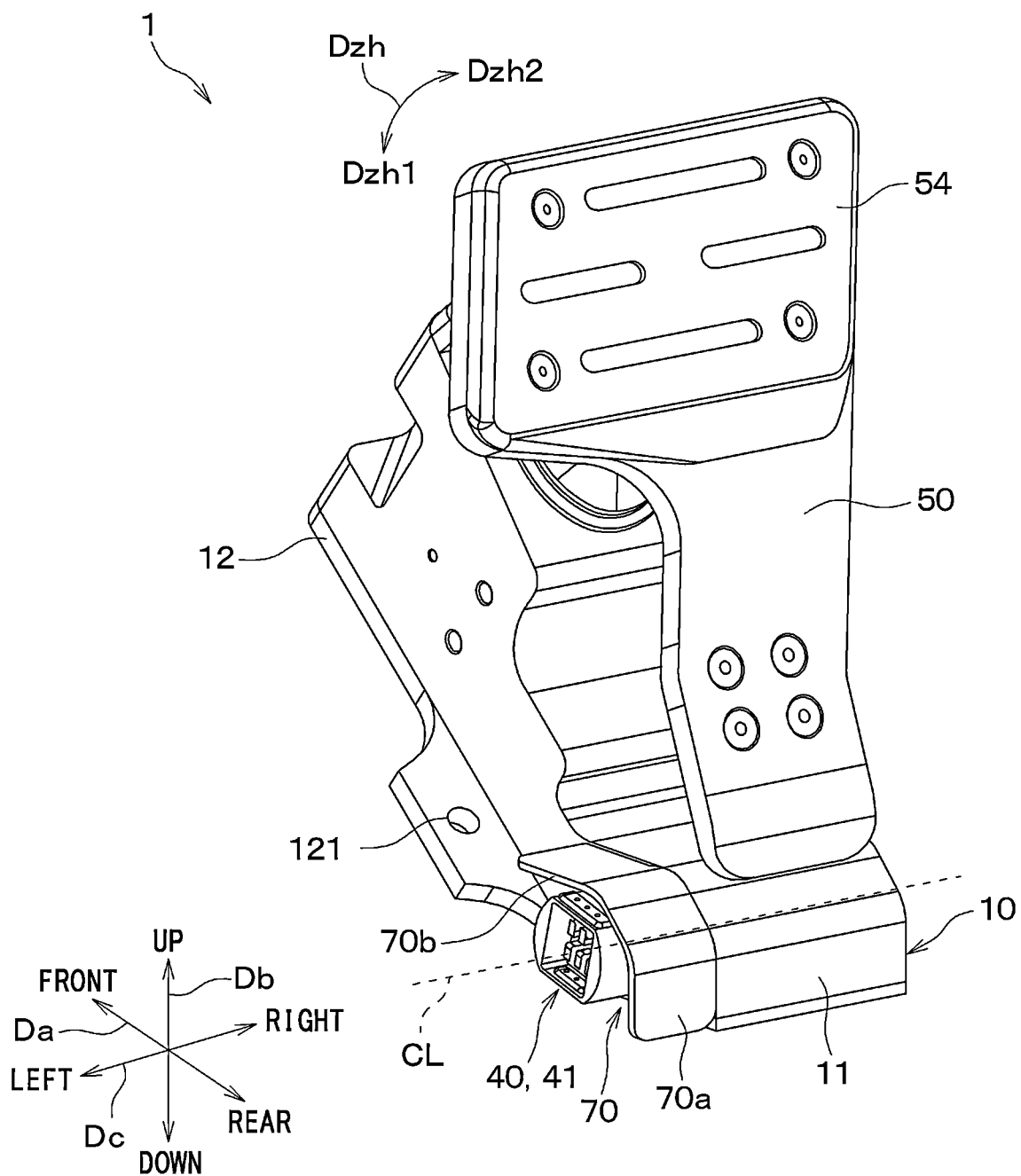
FIG. 13 is a perspective view of a brake pedal device according to a second embodiment.

As shown in FIG. 13, the shape of the sensor protection plate 70 is similar to the sensor protection plate 70 in the first embodiment. However, the sensor protection plate 70 of the present embodiment is separate from the first housing 11 and is formed of a different material from the first housing 11. Specifically, the sensor protection plate 70 of the present embodiment is made of a material that has a larger mass per unit volume than the first housing 11 which is made of aluminum, and has a higher rigidity than the first housing 11.

As a specific material for the sensor protection plate 70, for example, iron, which has a smaller mass per unit volume and higher rigidity than aluminum, may be used. However, the material of the sensor protection plate 70 is not limited, and the sensor protection plate 70 may be made of a metal other than iron as long as the material has a mass per unit volume greater than aluminum and higher rigidity. Alternatively, it may be made of a material different from metal. Here, high rigidity means that at least one of axial rigidity, bending rigidity, shear rigidity, and torsional rigidity is high. Note that the same meaning applies to the description of rigidity in the following.

In such manner, a part of the housing 10 in the present embodiment forming the first housing 11 has a smaller mass per unit volume than the sensor protection plate 70. Further, the sensor protection plate 70 of the present embodiment has higher rigidity than the first housing 11 in the housing 10.

Figure 14:
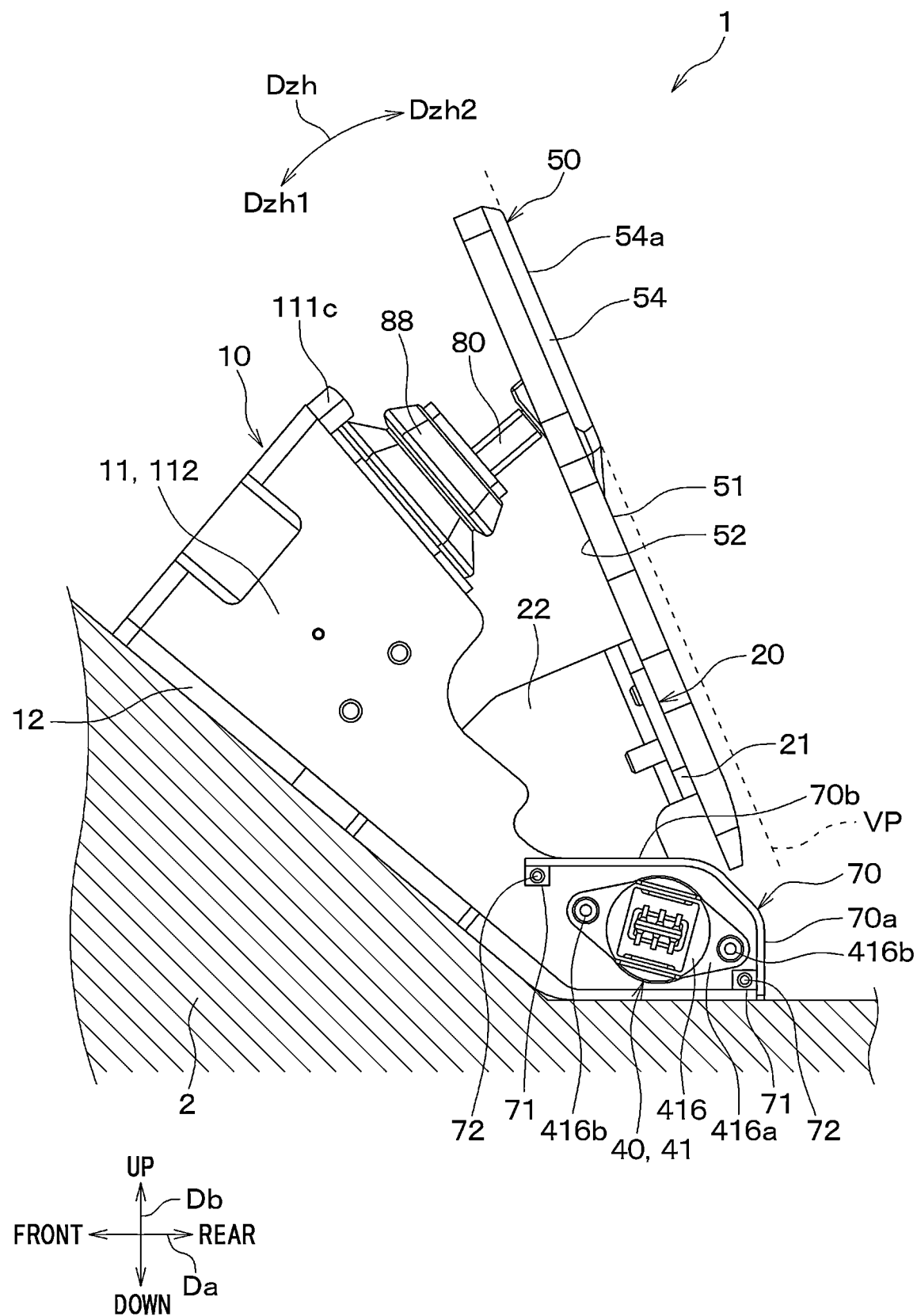
FIG. 14 is a left side view of the brake pedal device according to the second embodiment.

Further, as shown in FIG. 14, the sensor protection plate 70 has a protection fixing part 71 for fixing the sensor protection plate 70 to the first housing 11. The protection fixing part 71 is a part on which an attachment member 72 for an attachment of the sensor protection plate 70 to the first housing 11 is mounted.

The protection fixing parts 71 are provided respectively at an end part of a rear plate part 70a of the sensor protection plate 70 on the vehicle lower side, and an end part of an upper plate part 70b on the vehicle front side. The sensor protection plate 70 is attached to the first housing 11 by attaching the attachment member 72 to the protection fixing part 71. The attachment member 72 for attaching the sensor protection plate 70 to the first housing 11 may be, for example, a screw for fastening the protection fixing part 71 to the first housing 11.

The sensor protection plate 70 attached to the first housing 11 by the attachment member 72 in the above-described manner is not directly connected to the magnetic sensor 41, and is separated from the magnetic sensor 41. Specifically, the sensor protection plate 70 is fixed to the first housing 11 by the attachment member 72 that is different from a sensor fixing screw 416b for fixing a detector holding part 416 of the magnetic sensor 41 to the first housing 11.

The attachment member 72 may be a member other than a screw. For example, the attachment member 72 may be an adhesive. Further, the sensor protection plate 70 may be configured to be attached to the first housing 11 without using the attachment member 72. For example, the sensor protection plate 70 may be attached to the first housing 11 by being press-fitted into a fitting groove formed on the first housing 11.

As described above, in a brake pedal device 1 of the present embodiment, the housing 10 and the sensor protection plate 70 are configured separately from each other. The first housing 11 in the housing 10 is made of a material having a smaller mass per unit volume than the sensor protection plate 70. The sensor protection plate 70 is made of a material that has higher rigidity than the first housing 11 in the housing 10.

The reason for having the configuration described above is that the sensor protection plate 70 that protects the magnetic sensor 41 may be desirably made of a member with as higher rigidity as possible in order to prevent damage caused by a contact of the driver's foot with the sensor protection plate 70. Therefore, the sensor protection plate 70 of the present embodiment is made of iron, which is a material having a relatively high rigidity.

However, materials with a relatively high rigidity tend to have a large mass per unit volume. Therefore, when the first housing 11 and the sensor protection plate 70 are integrated as in the first embodiment while ensuring the rigidity of the sensor protection plate 70, the mass of the entire housing 10 will be increased more than necessary.

However, according to the present embodiment, compared to the configuration where the first housing 11 and the sensor protection plate 70 are integrated and made of the same material, the rigidity of the sensor protection plate 70 is ensured while the mass of the entire housing 10 is reduced, thereby preventing the mass thereof from increasing more than necessary.

Further, according to the embodiment described above, it is possible to achieve the following effects.

(1) In the embodiment described above, the magnetic sensor 41 and the sensor protection plate 70 are attached to the first housing 11 to be spaced from each other.

According to the above, even when the driver's foot contacts the sensor protection plate 70 and a contact load is put to the sensor protection plate 70, the contact load is prevented from being transferred to the magnetic sensor 41 via the sensor protection plate 70. Therefore, damage to the magnetic sensor 41 due to the load is preventable.

First Modification of the Second Embodiment

Figure 15:
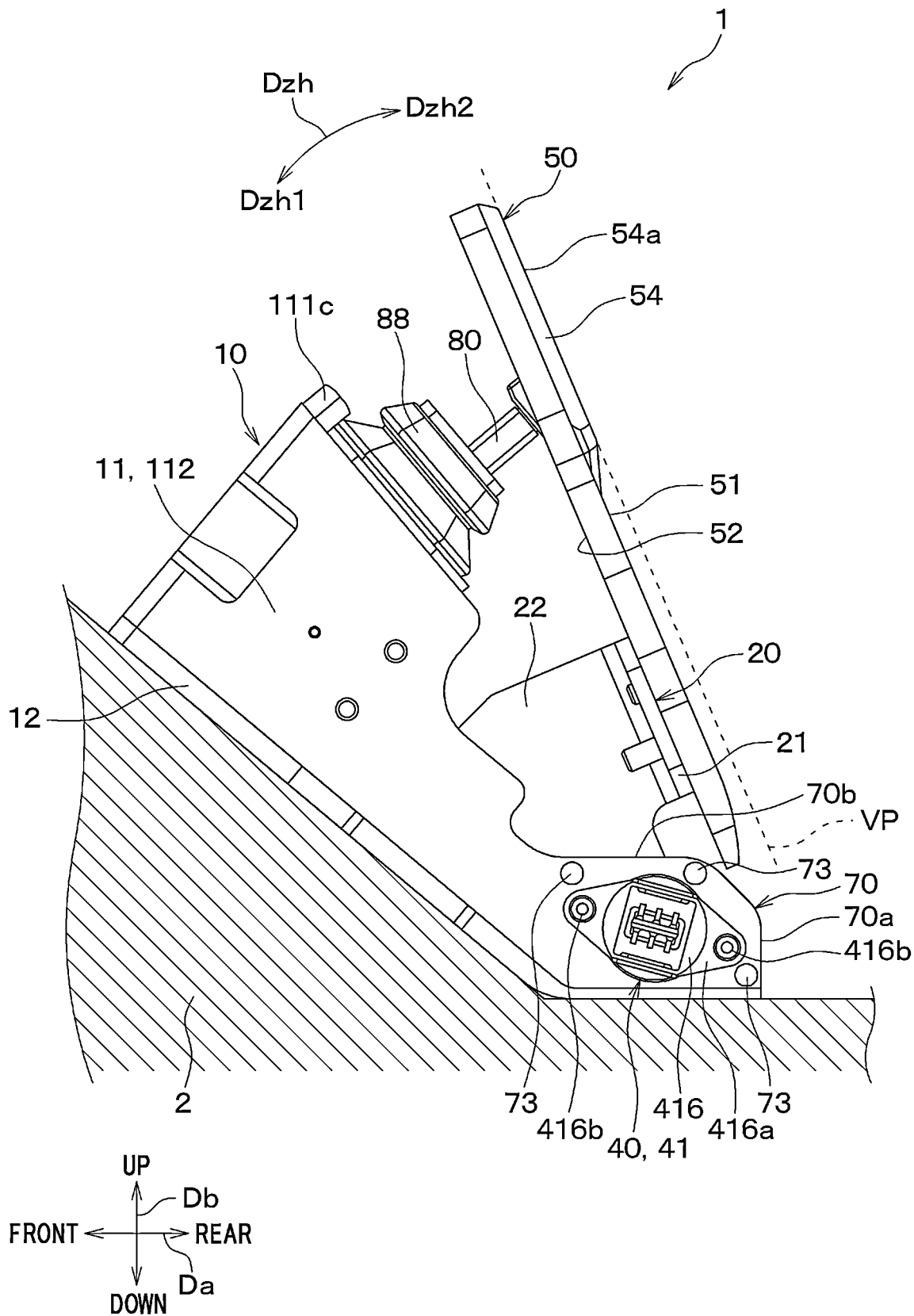
FIG. 15 is a left side view of a first modification of the brake pedal device according to the second embodiment.
Figure 16:
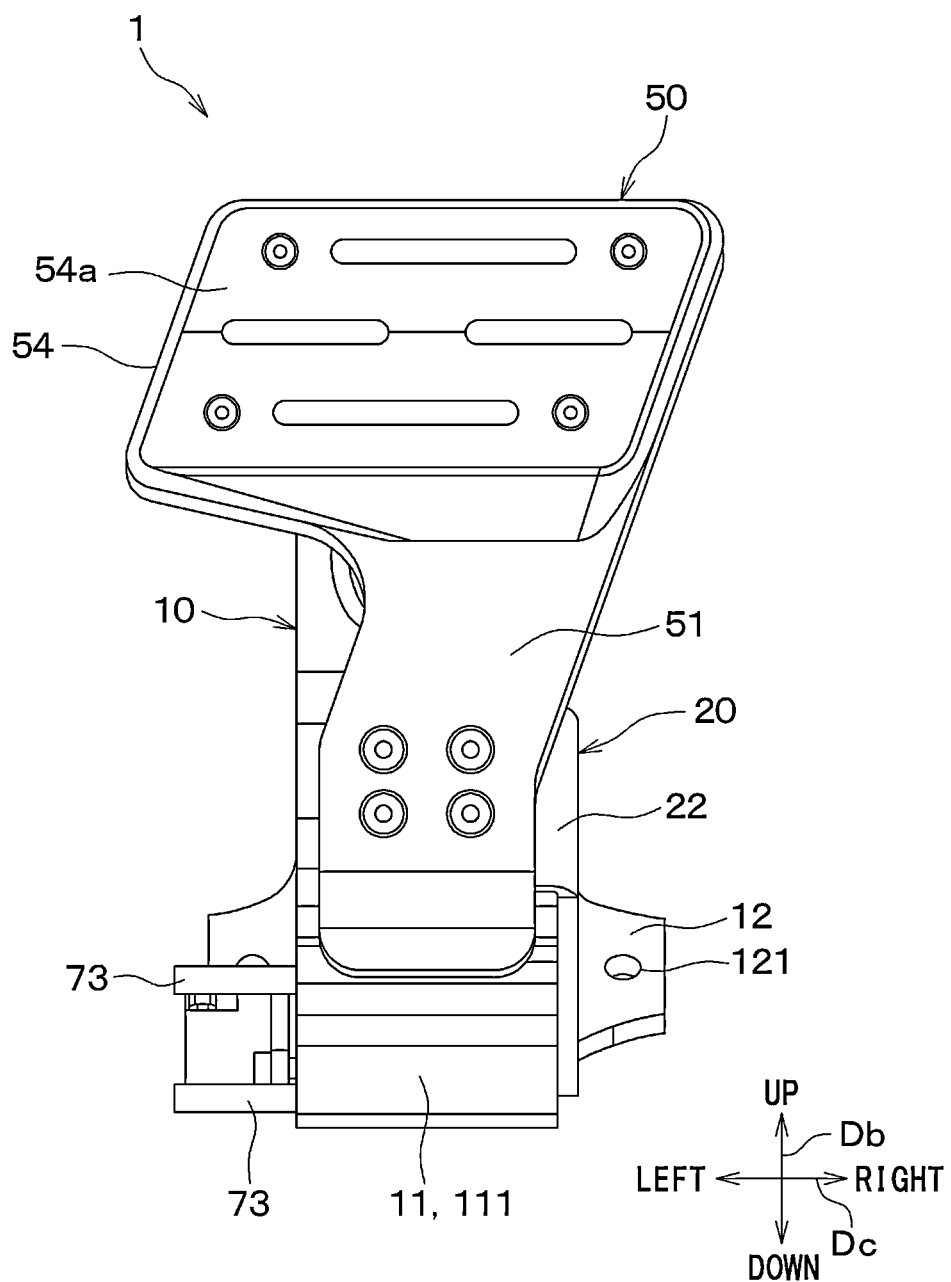
FIG. 16 is a front view of the first modification of the brake pedal device according to the second embodiment.
Figure 17:
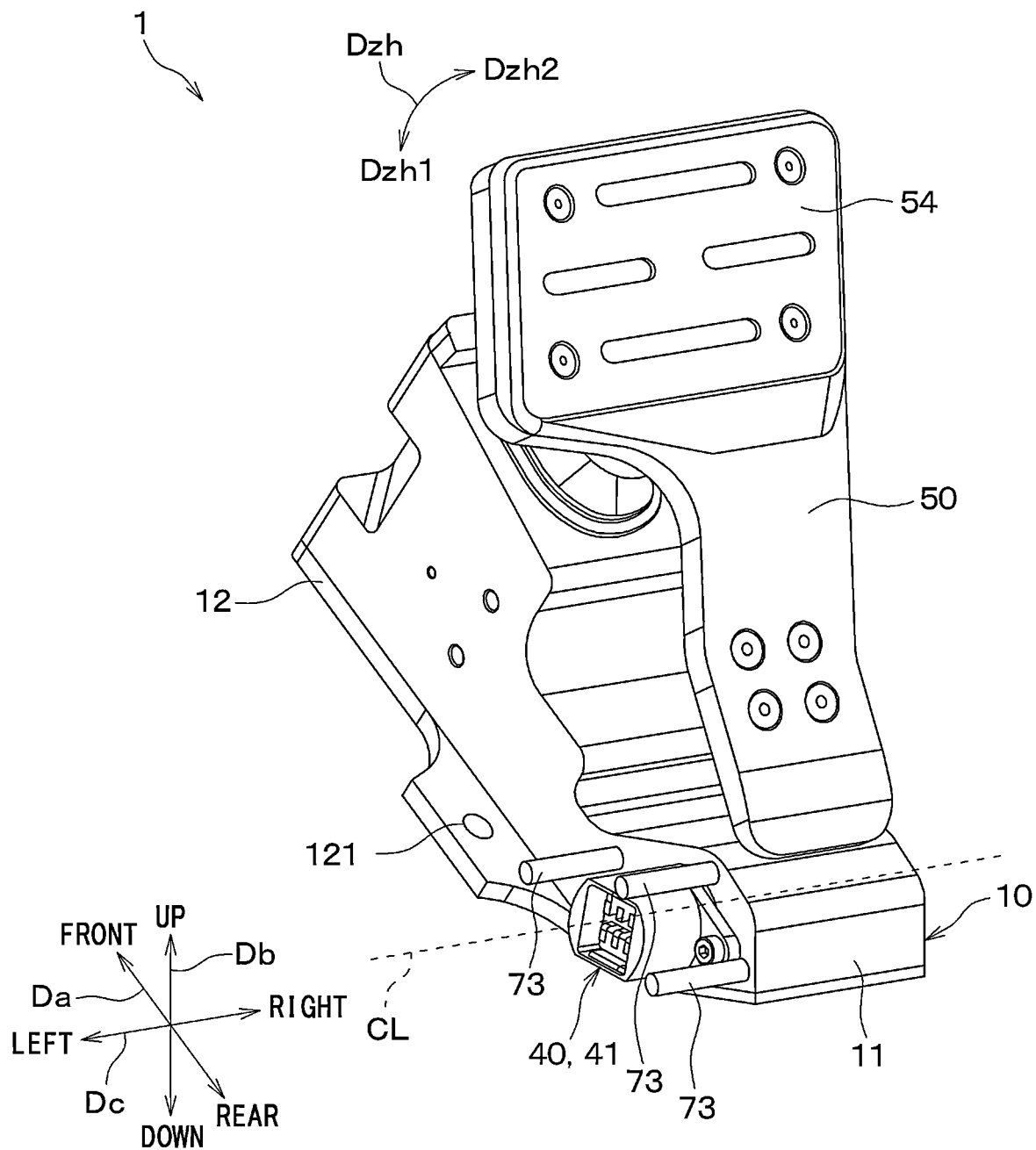
FIG. 17 is a perspective view of the first modification of the brake pedal device according to the second embodiment.

In the second embodiment described above, an example has been described in which the shape of the member that protects the magnetic sensor 41 is similar to the sensor protection plate 70 of the first embodiment. However, the present disclosure is not limited thereto. For example, a member that protects the magnetic sensor 41 may have a different shape from the sensor protection plate 70 of the first embodiment, as shown in FIGS. 15 to 17.

Specifically, the member that protects the magnetic sensor 41 may include three protection rods 73 provided around the magnetic sensor 41. Each of the three protection rods 73 is provided on the left side wall 112 of the housing 10. Further, each of the three protection rods 73 has a columnar shape, and extends from the left side wall 112 toward the vehicle left side. The three protection rods 73 are arranged side by side at a predetermined interval along the shape of the detector holding part 416 in the magnetic sensor 41. The predetermined interval is set so that the driver's foot does not intrude in between any of the three protection rods 73. The three protection rods 73 of the present embodiment function as a sensor protector. Further, the three protection rods 73 configured in the above-described manner are not directly connected to the magnetic sensor 41 and are separated from the magnetic sensor 41.

According to the above, by configuring a member that protects the magnetic sensor 41 as the three columnar protection rods 73, compared to the case where a member that protects the magnetic sensor 41 is formed in a shape that follows the shape of the upper wall 111, it has a shape more easily formable.

Second Modification of the Second Embodiment

In the second embodiment described above, an example has been described in which the shape of the member that protects the magnetic sensor 41 follows the shape of the upper wall 111 in the first housing 11, similar to the sensor protection plate 70 of the first embodiment. However, the present disclosure is not limited to the above. For example, as shown in FIGS. 18 to 20, the shape of the member that protects the magnetic sensor 41 may be different from that of the sensor protection plate 70 of the first embodiment, and the sensor protection plate 70 may be configured to have an integral body with the second housing 12.

Figure 18:
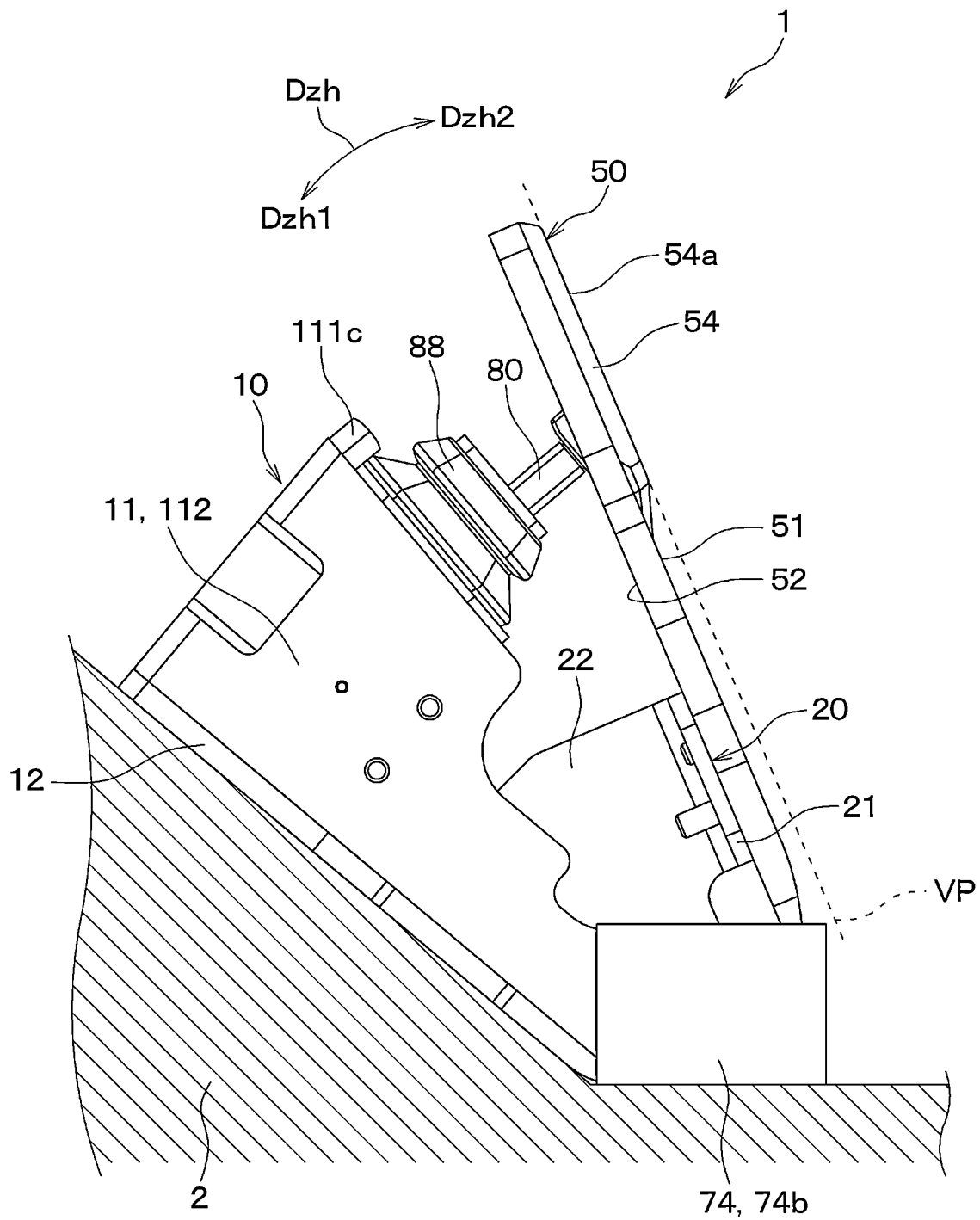
FIG. 18 is a left side view of a second modification of the brake pedal device according to the second embodiment.
Figure 19:
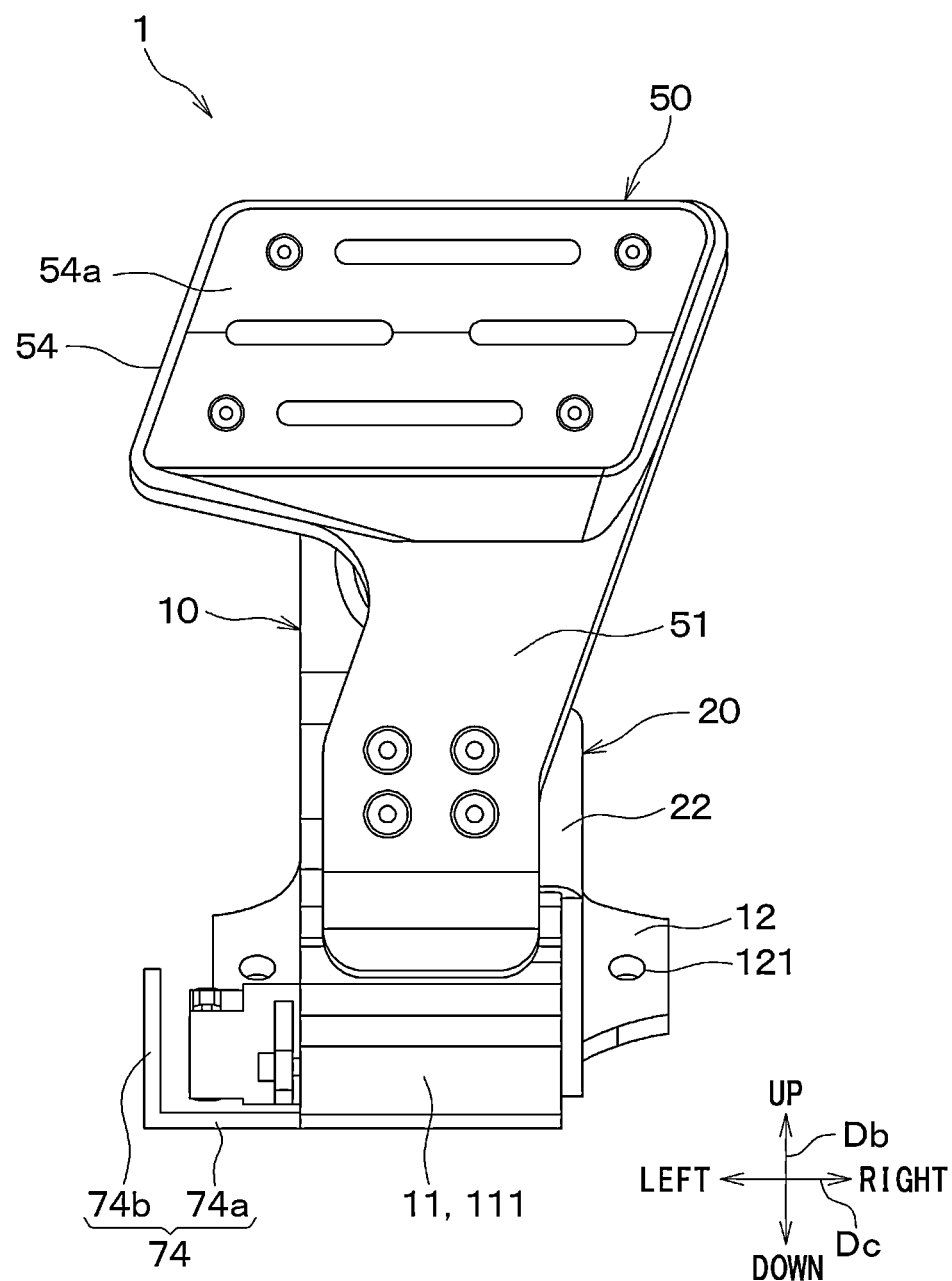
FIG. 19 is a front view of the second modification of the brake pedal device according to the second embodiment.
Figure 20:
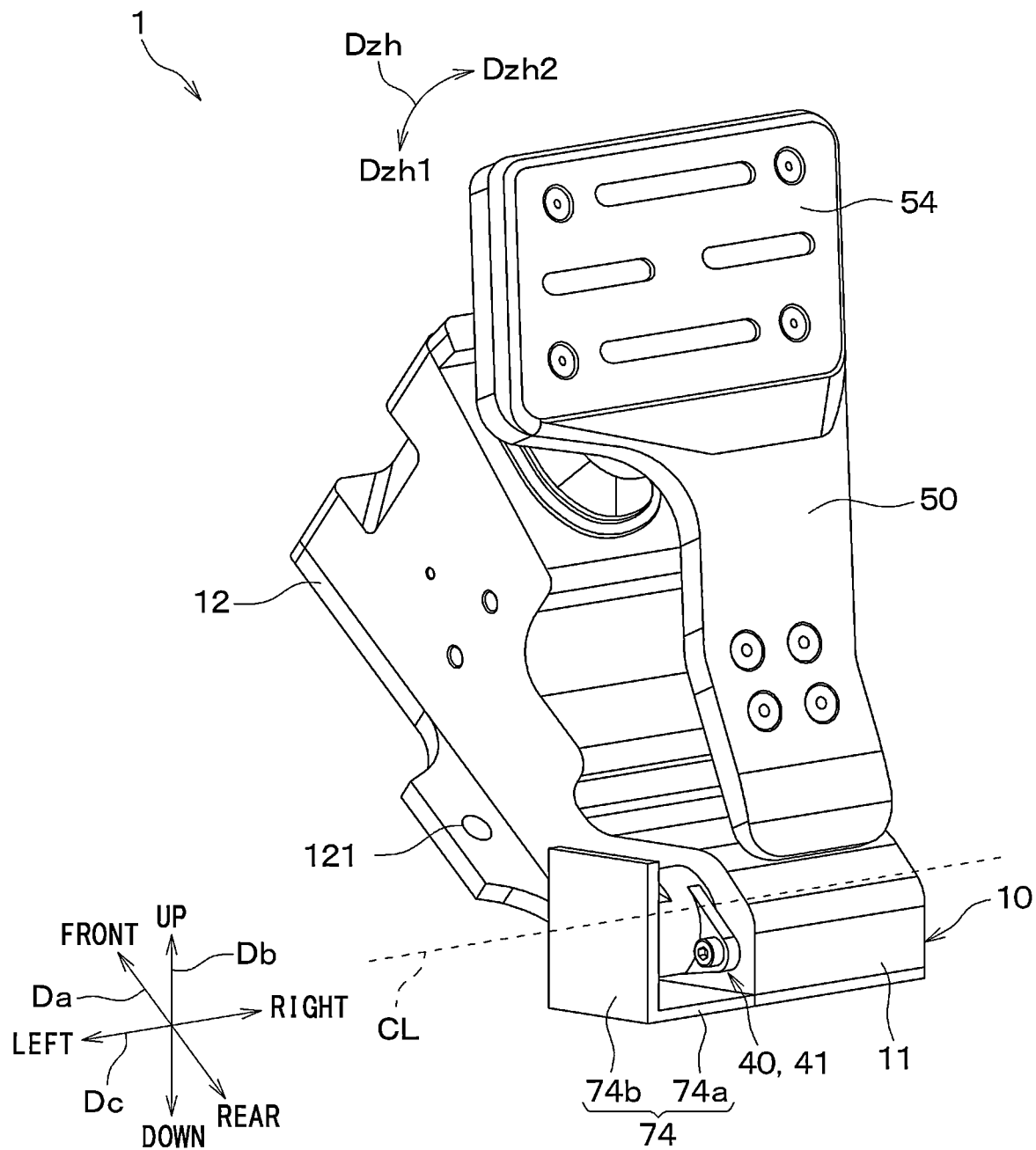
FIG. 20 is a perspective view of the second modification of the brake pedal device according to the second embodiment.

Specifically, the member that protects the magnetic sensor 41 may be constituted by an L-shaped protective bent part 74 provided at one end of the second housing 12 on the vehicle lower side, as shown in FIGS. 18 to 20. The protective bent part 74 includes a lower protection part 74a extending toward the vehicle left side from the end of the second housing 12 on the vehicle lower side, and a left protection part 74b extending toward the vehicle upper side from an end of the lower protection part 74a on the vehicle left side. The lower protection part 74a is formed so that the size of the plate surface is larger than the outer diameter of the detector holding part 416 of the magnetic sensor 41. Further, the left protection part 74b is formed so that the size of the plate surface is larger than the outer diameter of the detector holding part 416 of the magnetic sensor 41. In such manner, the left side of the magnetic sensor 41 in the vehicle is covered by the protective bent part 74. The protective bent part 74 of the present embodiment functions as a sensor protector. The protective bent part 74 configured in the above-described manner is not directly connected to the magnetic sensor 41 and is separated from the magnetic sensor 41.

According to the above, by configuring the sensor protection plate 70 as the L-shaped protective bent part 74, the sensor protection plate 70 has a shape easily formed. Further, by configuring the protective bent part 74 integrally with the second housing 12, the protective bent part 74 can be formed at the same time when manufacturing the second housing 12, and the manufacturing process for attaching the sensor protection plate 70 to the second housing 12 is dispensable.

Third Modification of the Second Embodiment

In the second embodiment described above, an example has been described in which the first housing 11 is made of a material having a smaller mass per unit volume than the sensor protection plate 70. However, the present disclosure is not limited thereto. Further, in the second embodiment described above, an example has been described in which the sensor protection plate 70 is made of a material having higher rigidity than the first housing 11. However, the present disclosure is not limited to the above. For example, the first housing 11 may be formed of a material whose mass per unit volume is equal to or greater than the mass per unit volume of the sensor protection plate 70. Further, the sensor protection plate 70 may be formed of a material having equal or lower rigidity than that of the first housing 11.

Third Embodiment

Figure 21:
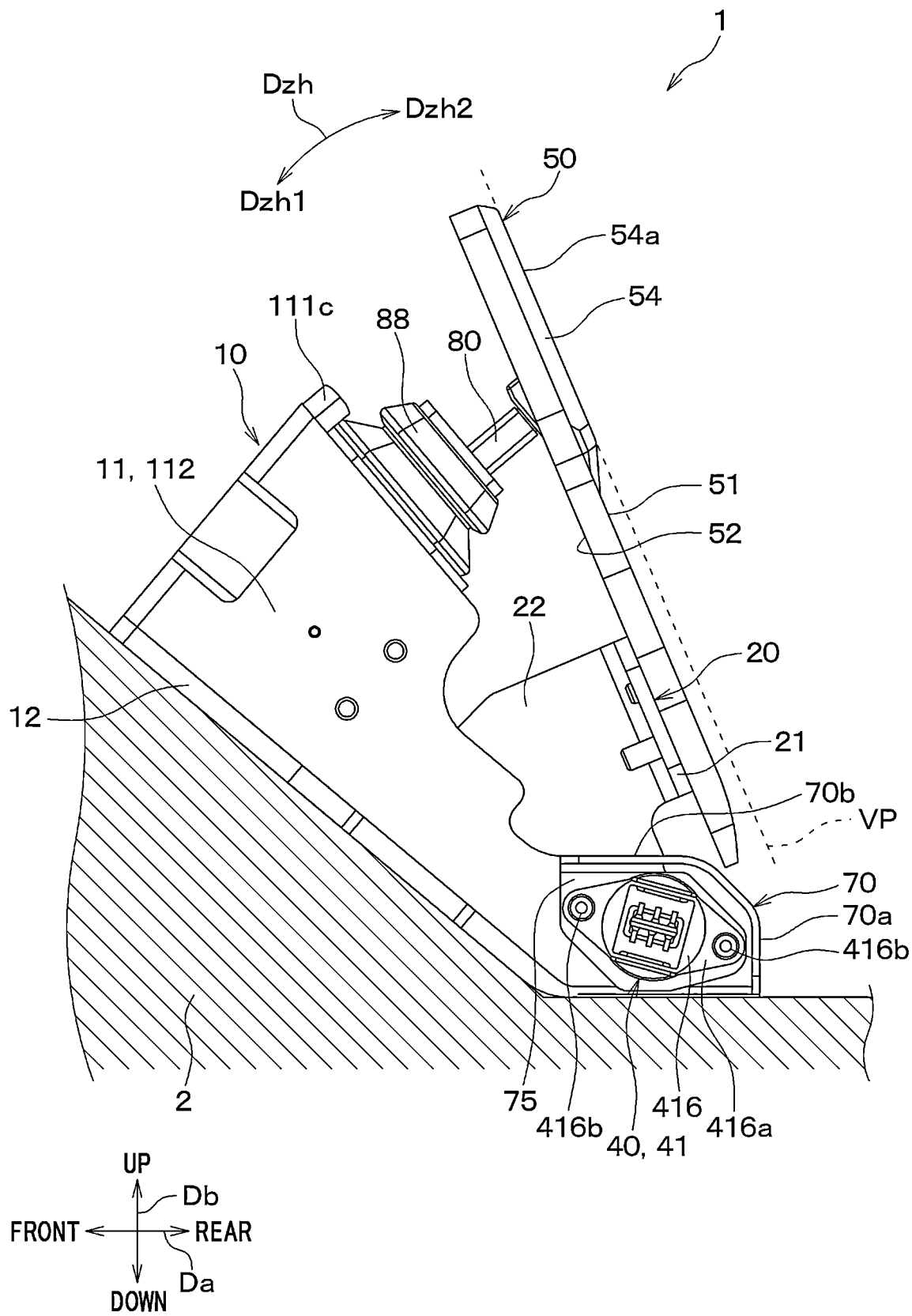
FIG. 21 is a left side view of a brake pedal device according to a third embodiment.

Next, the third embodiment will be described with reference to FIG. 21. The present embodiment is different from the second embodiment in that a protective fixing part 71 for fixing a sensor protection plate 70 to a first housing 11 is replaced with a protective attachment plate 75, as shown in FIG. 21. Further, the present embodiment is different from the second embodiment in that the sensor protection plate 70 is fixed to the first housing 11 by a sensor fixing screw 416*b* for fixing a detector holding part 416 of a magnetic sensor 41. Other than the above, the present embodiment is the same as the second embodiment. Therefore, in the present embodiment, components that are different from the second embodiment will be mainly described, and descriptions of components similar to the second embodiment may be omitted.

The protective attachment plate 75 is a thin plate having a plate surface in the vehicle left-right direction Dc, and extends toward the vehicle lower side along a left side wall 112 from a vehicle lower side surface of an upper plate part 70*b*. Further, the protective attachment plate 75 is formed in a size that covers the entire range of the detector holding part 416 of the magnetic sensor 41 when viewed from the vehicle left side.

The protective attachment plate 75 is provided with a through hole (not shown) corresponding to the outer diameter of the detector holding part 416 and a screw hole (not shown) into which the sensor fixing screw 416*b* for fixing the detector holding part 416 is inserted. Further, the sensor protection plate 70 is fixed to the first housing 11 by inserting the detector holding part 416 into the through hole and fitting the sensor fixing screw 416*b* into the screw hole. That is, the sensor protection plate 70 is attached to the first housing 11 by the sensor fixing screw 416*b* for attaching the magnetic sensor 41. In other words, the magnetic sensor 41 and the sensor protection plate 70 are both attached to the first housing 11 by the common sensor fixing screw 416*b*. Thereby, the sensor protection plate 70 of the present embodiment is fixed to the first housing 11 in a state in which it is in contact with the magnetic sensor 41.

As described above, in a brake pedal device 1 of the present embodiment, the magnetic sensor 41 and the sensor protection plate 70 are both attached to the first housing 11 by the common sensor fixing screw 416*b*.

According to the above, the sensor protection plate 70 can be easily attached to the first housing 11 compared to a configuration in which the magnetic sensor 41 and the sensor protection plate 70 are attached to the first housing 11 using respectively different members.

Fourth Embodiment

Figure 22:
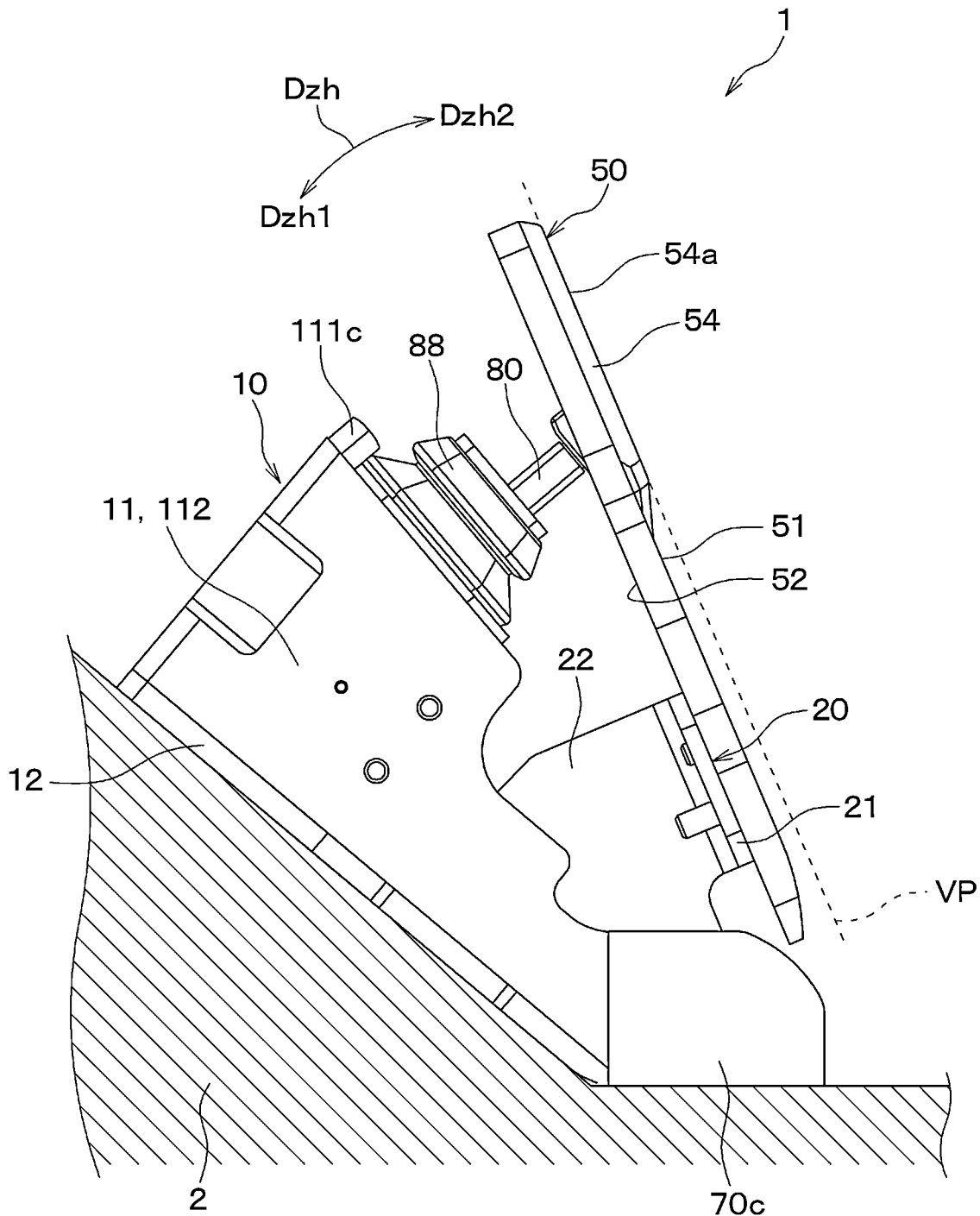
FIG. 22 is a left side view of a brake pedal device according to a fourth embodiment.
Figure 23:
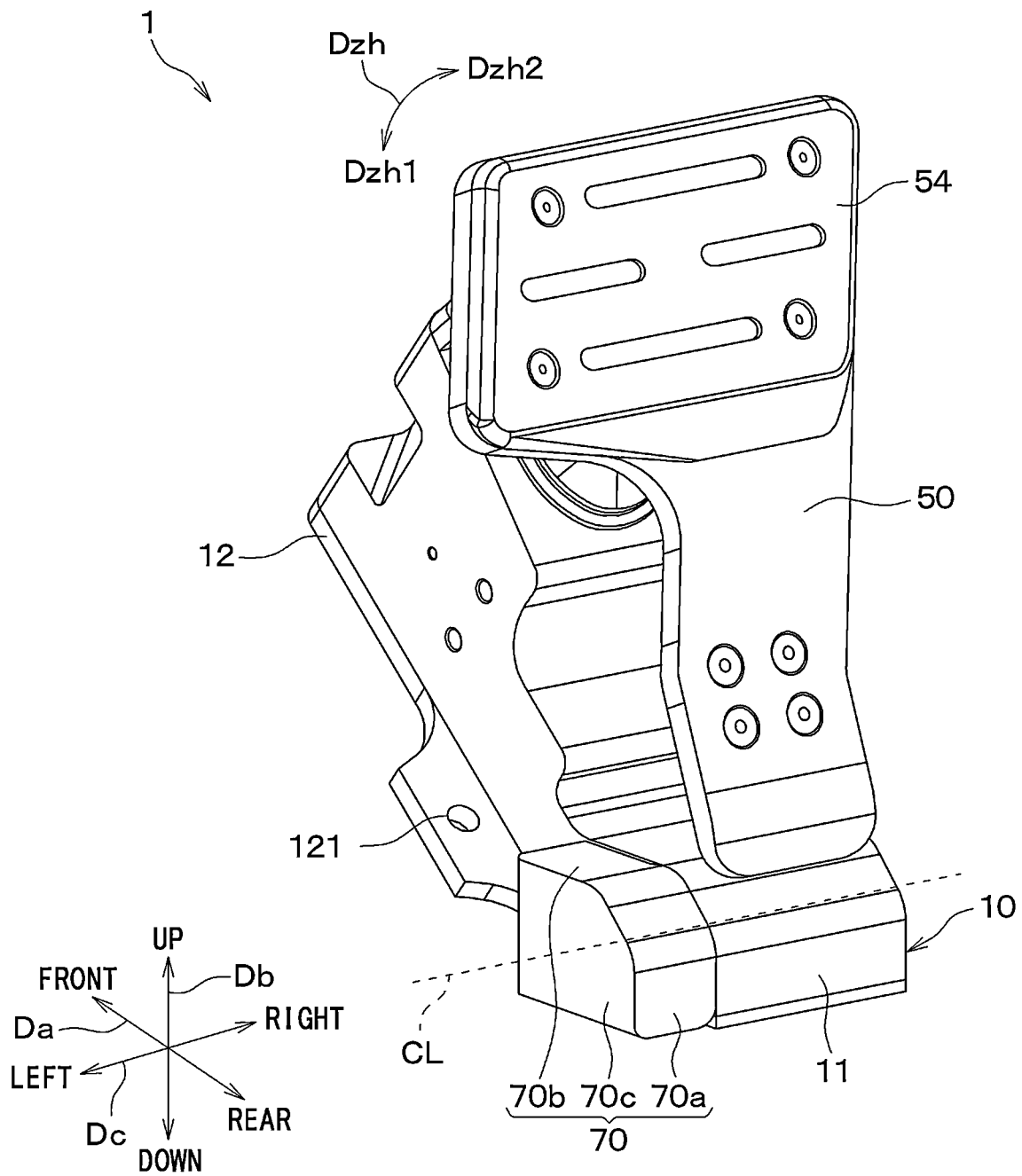
FIG. 23 is a perspective view of a brake pedal device according to the fourth embodiment.

Next, the fourth embodiment will be described with reference to FIGS. 22 and 23. The present embodiment is different from the second embodiment in that a sensor protection plate 70 covers the left side of a magnetic sensor 41 in the vehicle. Other than the above, the present embodiment is the same as the second embodiment. Therefore, in the present embodiment, components that are different from the second embodiment will be mainly described, and descriptions of components similar to the second embodiment may be omitted.

The sensor protection plate 70 of the present embodiment includes a left plate part 70*c* that covers the vehicle left side of the magnetic sensor 41 in addition to a rear plate part 70*a* and an upper plate part 70*b*. The left plate part 70*c* is formed in a thin plate shape having a plate surface in the vehicle left-right direction Dc. Further, the left plate part 70*c* has (i) an end on the vehicle upper side connected to an end of the upper plate part 70*b* on the vehicle left side, and (ii) an end on the vehicle lower side extending in the vehicle vertical direction Db along the left side wall 112 to a position that overlaps with the second housing 12.

Further, the left plate part 70*c* has (c) an end on the vehicle rear side connected to an end of the rear plate part 70*a* on the vehicle left side, and (d) an end on the vehicle front side extending in the vehicle longitudinal direction Da along the left side wall 112 to a position that overlaps with the front end of the upper plate part 70*b*.

In such manner, the magnetic sensor 41 is covered with the sensor protection plate 70 not only on the vehicle upper side and the vehicle rear side, but also on the vehicle left side. However, a part of the magnetic sensor 41 on the vehicle front side is not covered by the sensor protection plate 70 and is open.

As described above, the sensor protection plate 70 of the present embodiment covers a vehicle left side part of the magnetic sensor 41, which is provided on the vehicle left side of the first housing 11, in addition to the parts thereof on the vehicle upper side, and on the vehicle rear side.

According to the above, even in a situation where the driver's foot is placed on the vehicle left side of the magnetic sensor 41, it is possible to avoid the magnetic sensor 41 from coming into contact with the driver's foot with ease. For example, when the vehicle does not have a clutch pedal, the left side of a brake pedal device 1 in the vehicle compartment has a relatively wide space. Therefore, in case that the sensor protection plate 70 is configured not to have the left plate part 70*c*, when the driver performs a brake operation or an accelerator operation and places his or her left foot in such relatively wide space, the left foot may come into contact with the magnetic sensor 41. In contrast, by providing the sensor protection plate 70 of the present embodiment in the brake pedal device 1, even when the brake pedal device 1 has a relatively-large space on the vehicle left side in the vehicle compartment, it is hardly possible for the foot of the driver to come into contact with the magnetic sensor 41.

Modification of Fourth Embodiment

In the fourth embodiment described above, an example has been described in which the sensor protection plate 70 protects the magnetic sensor 41 provided on the vehicle left side of the first housing 11. However, the present disclosure is not limited thereto. For example, when the magnetic sensor 41 is provided on the right side of the first housing 11 in the vehicle, the sensor protection plate 70 may have a configuration in which the sensor protection plate 70 is provided on the right side of the first housing 11 in the vehicle corresponding to the arrangement of the magnetic sensor 41. In such case, the sensor protection plate 70 may have a part that covers a part of the magnetic sensor 41 on the vehicle right side.

Fifth Embodiment

Next, the fifth embodiment will be described with reference to FIGS. 24 and 25. The present embodiment is different from the second embodiment in that a sensor protection plate 70 is connected to a footrest 2a provided in the vehicle. Further, a brake pedal device 1 of the present embodiment is different from the second embodiment in that the brake pedal device 1 and an accelerator pedal device 5 form a part of the components of a pedal module 100. Other than the above, the present embodiment is the same as the second embodiment. Therefore, in the present embodiment, components that are different from the first embodiment will be mainly described, and descriptions of components similar to the second embodiment may be omitted.

First, the accelerator pedal device 5 included in the pedal module 100 will be described. The accelerator pedal device 5 of the present embodiment has an accelerator pedal 6 that is operated by a driver's foot, and is used, for example, in an accelerator-by-wire system (not shown) that controls an accelerator of a vehicle.

The accelerator pedal device 5 includes an accelerator sensor 7 that detects the rotation angle of the accelerator pedal 6, and an accelerator ECU (not shown) that controls an electronic throttle valve mounted on the vehicle based on an electric signal output from the accelerator sensor 7. The accelerator-by-wire system is a system in which an accelerator ECU controls the operation of an electronic throttle valve based on an electric signal output from the accelerator sensor 7 for controlling an amount of intake air of an engine.

In the accelerator pedal device 5, when the driver performs an accelerator operation by stepping on the accelerator pedal 6, the accelerator sensor 7 outputs a signal corresponding to the rotation angle (i.e., an accelerator pedal stroke amount) of the accelerator pedal 6 to the accelerator ECU. The accelerator ECU increases or decreases a valve opening degree of the electronic throttle valve based on the accelerator pedal stroke amount. For example, the accelerator ECU increases the valve opening degree of the electronic throttle valve as the accelerator pedal stroke amount increases. The electronic throttle valve is an electric valve device installed in an air-intake system of the engine. As the valve opening degree of the electronic throttle valve increases, the amount of intake air of the engine increases.

Further, the accelerator pedal device 5 includes an accelerator housing 8, an accelerator shaft (not shown) that rotates the accelerator pedal 6, an accelerator reaction force generating mechanism (not shown), and the like.

The accelerator housing 8 is a member that rotatably supports the accelerator pedal 6 and the accelerator shaft, and to which the accelerator sensor 7 is attached. Further, the accelerator housing 8 accommodates an accelerator reaction force generating mechanism therein. As shown in FIGS. 24 and 25, the accelerator housing 8 of the present embodiment includes a housing body 8a, a housing cover 8b, and a housing base part 8c.

The housing body 8a is formed in a hollow box shape, and has a space provided therein for accommodating the accelerator reaction force generating mechanism. Further, the housing body 8a has an opening on the vehicle right side, and the opening is closed by the housing cover 8b. Further, the housing body 8a is provided on the housing base part 8c.

The housing base part 8c is a part that supports the accelerator pedal device 5. The housing base part 8c is fixed to the floor 2 with, for example, bolts or the like. Thereby, the accelerator pedal device 5 is fixed to the floor 2.

The accelerator pedal device 5 of the present embodiment is provided on the vehicle right side with respect to the brake pedal device 1. The brake pedal 50 in the brake pedal device 1 and the accelerator pedal 6 in the accelerator pedal device 5 are arranged in adjacent positions in the vehicle left-right direction Dc, as shown in FIGS. 24 and 25. Hereinafter, the direction in which the brake pedal 50 and the accelerator pedal 6 are arranged will also be referred to as a pedal arrangement direction. The pedal arrangement direction is a direction along the vehicle left-right direction Dc.

Figure 24:
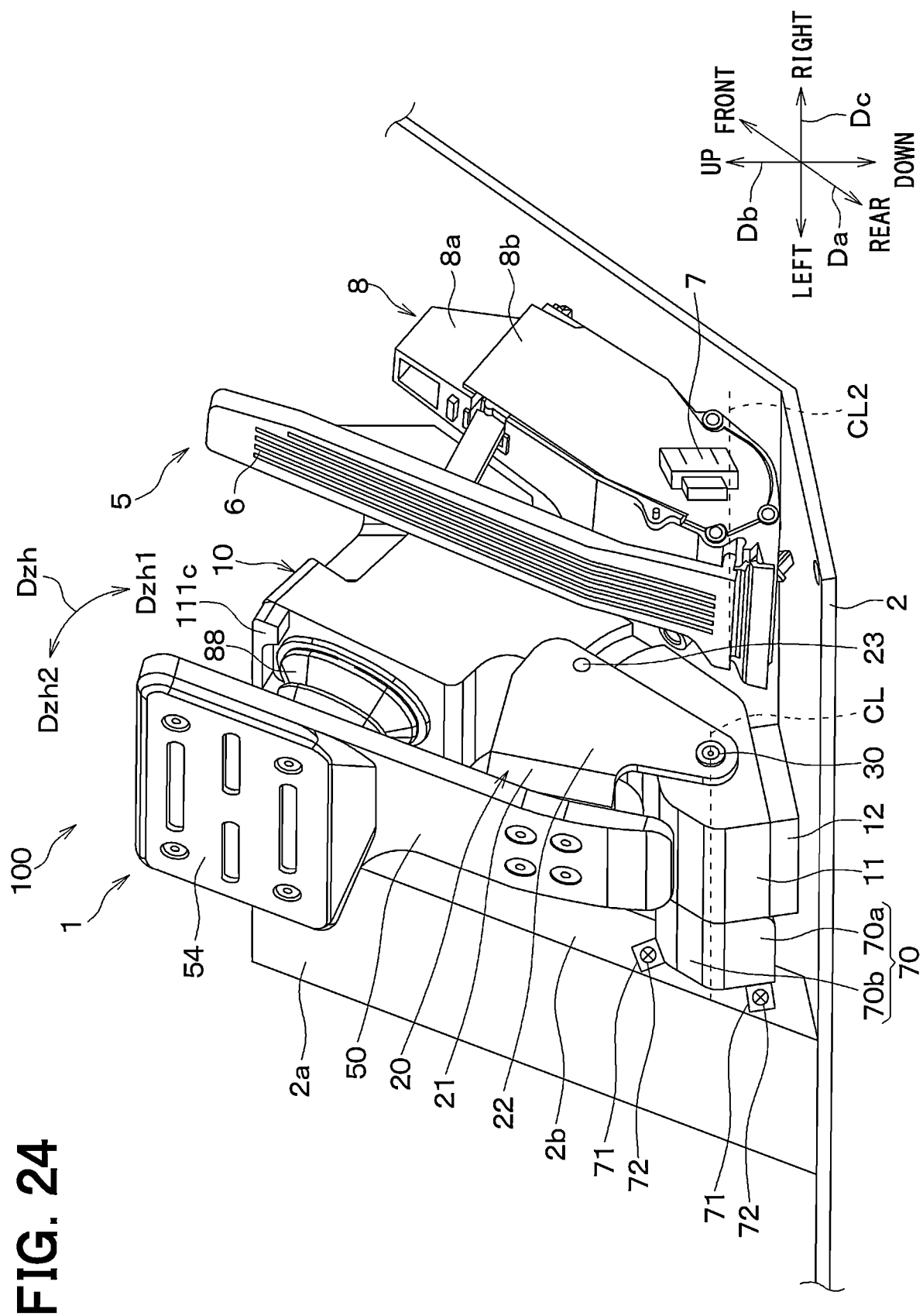
FIG. 24 is a perspective view of a pedal module according to a fifth embodiment.
Figure 25:
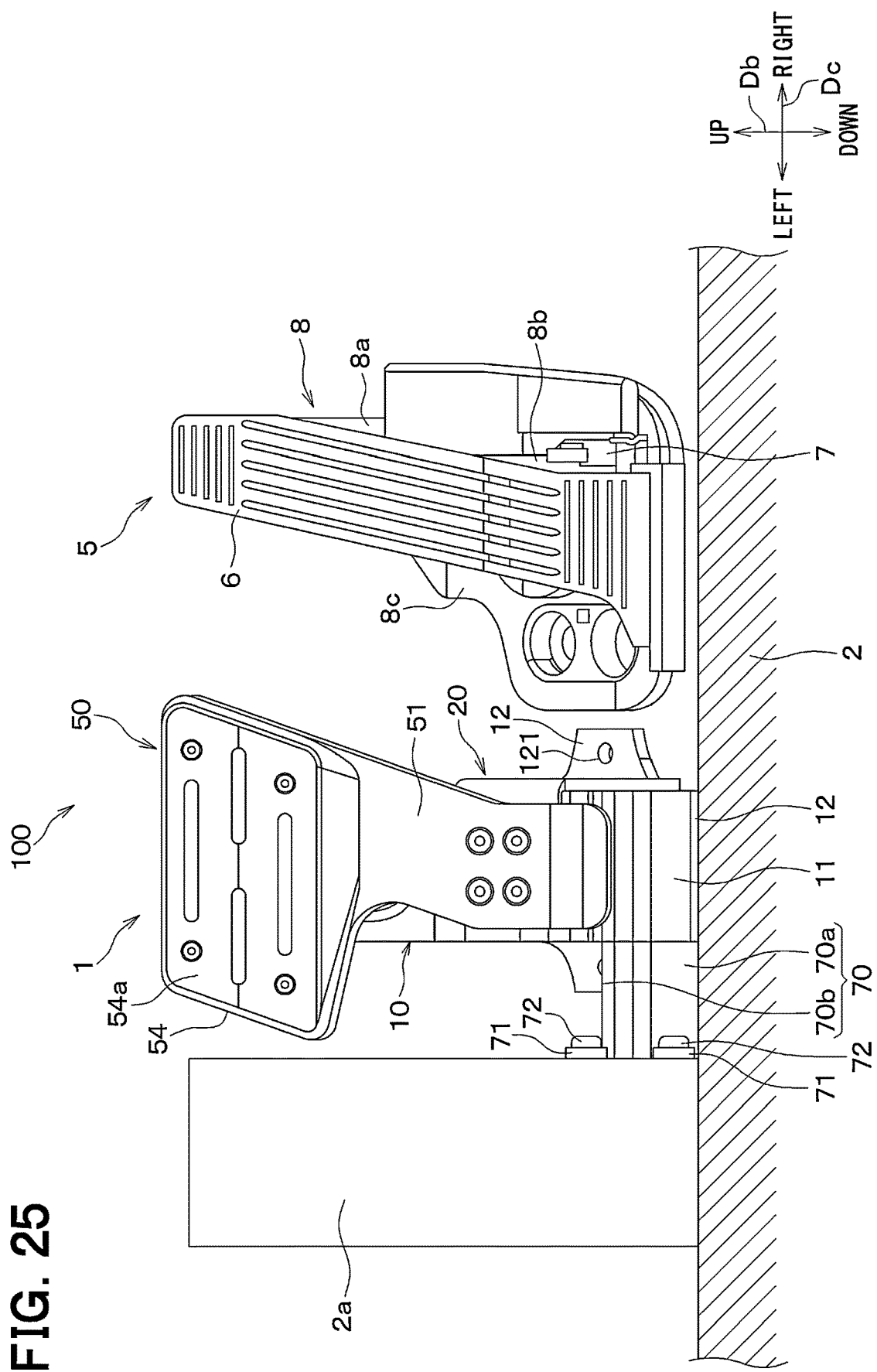
FIG. 25 is a front view of a pedal module according to the fifth embodiment.

As shown in FIGS. 24 and 25, a vehicle equipped with the pedal module 100 of the present embodiment is provided with the footrest 2a on the left side of the brake pedal device 1 in the vehicle. The footrest 2a is, for example, a part on which the driver rests his or her left foot, since the driver typically performs braking and accelerator operations with his/her right foot, and is a part provided on the vehicle lower side of a dashboard (not shown). The footrest 2a extends toward the vehicle front side and toward the vehicle upper side. Further, the footrest 2a includes a pedal-facing surface 2b that faces the brake pedal device 1.

The accelerator pedal 6 is formed in a plate shape using, for example, metal or resin, and is arranged diagonally with respect to the floor 2. Specifically, the accelerator pedal 6 is arranged diagonally so that its upper end is positioned on the vehicle front side and its lower end is positioned on the vehicle rear side. The upper end of the accelerator pedal 6 is arranged in the vehicle upper part with respect to the accelerator shaft that serves as a reference for rotation of the accelerator pedal 6. The accelerator pedal 6 is not limited to the arrangement shown in FIGS. 24 and 25, and may also be arranged substantially perpendicularly to the floor 2, for example. When the accelerator pedal 6 is operated by the driver's foot, the accelerator pedal 6 rotates in the forward and backward directions within a predetermined angular range about an accelerator axis CL2, which is an axis of the accelerator shaft, serving as a reference.

The accelerator reaction force generating mechanism is a mechanism that generates a reaction force for the driver's stepping force applied to the accelerator pedal 6, and is provided inside the accelerator housing 8. The accelerator reaction force generating mechanism includes, for example, a spring that generates a reaction force for the driver's stepping force, and generates a reaction force corresponding to the stepping force applied to the accelerator pedal 6 when the driver operates the accelerator.

The accelerator sensor 7 is an angle sensor that detects the rotation angle of the accelerator pedal 6, which rotates together with the accelerator shaft. As the accelerator sensor 7, it is possible to employ, for example, a non-contact-type sensor circuit using a Hall IC or a magnetoresistive element, a contact-type sensor circuit or the like. The accelerator sensor 7 is provided at a position where it can detect the rotation angle of the accelerator shaft. Further, the accelerator sensor 7 detects the rotation angle of the accelerator pedal 6, which rotates together with the accelerator shaft, by detecting the rotation angle of the accelerator shaft.

In the accelerator pedal device 5, when the driver's stepping force is applied to the accelerator pedal 6, the accelerator pedal 6 rotates about the accelerator axis CL2, and a part of the accelerator pedal 6 in the vehicle upper part with respect to the accelerator axis CL2 moves toward the floor 2 or the dash panel. At this time, the accelerator sensor 7 outputs a signal corresponding to the rotation angle of the accelerator pedal 6 to the accelerator ECU. The accelerator ECU increases or decreases the valve opening degree of the electronic throttle valve based on the accelerator pedal stroke amount.

Next, the sensor protection plate 70 of the present embodiment will be explained. The magnetic sensor 41 and the sensor protection plate 70 of the present embodiment are provided on one side opposite to the side where the accelerator pedal 6 is positioned with respect to the brake pedal 50 in the pedal arrangement direction. That is, the magnetic sensor 41 and the sensor protection plate 70 are provided on the vehicle left side with respect to the brake pedal 50. Further, the sensor protection plate 70 is connected to the footrest 2a, as shown in FIGS. 24 and 25.

Specifically, the sensor protection plate 70 extends along the vehicle left-right direction Dc until the vehicle left sides of the upper plate part 70b and the rear plate part 70a reach the footrest 2a. In other words, the upper plate part 70b and the rear plate part 70a of the sensor protection plate 70 each extend from a left side wall 112 to the pedal-facing surface 2b of the footrest 2a in the pedal arrangement direction. The sensor protection plate 70 is fixed to the pedal-facing surface 2b by fastening screws, which are attachment members 72, to protection fixing parts 71 provided on each of the upper plate part 70b and the rear plate part 70a. In such manner, parts of the magnetic sensor 41 on the vehicle upper side and the vehicle rear side are covered by the sensor protection plate 70, and at the same time, a part of the magnetic sensor 41 on the vehicle left side is covered by the pedal-facing surface 2b of the footrest 2a.

As described above, the brake pedal 50 and the accelerator pedal 6 of the present embodiment are provided side by side in the vehicle left-right direction Dc. Further, the magnetic sensor 41 and the sensor protection plate 70 of the present embodiment are provided on the vehicle left side of the first housing 11. In other words, the magnetic sensor 41 and the sensor protection plate 70 are provided on the opposite side of the brake pedal 50 with respect to the side where the accelerator pedal 6 is positioned.

According to the above, the driver's foot does not move across the magnetic sensor 41 when switching from one operation to the other, i.e., when switching from the brake operation to the accelerator operation and vice versa. Therefore, the configuration described above makes it easy for the driver to prevent a situation in which the driver's foot inadvertently comes into contact with the magnetic sensor 41 and the sensor protection plate 70 due to slip of the foot away from the brake pedal 50 when switching between the brake operation and the accelerator operation.

Further, according to the embodiment described above, it is possible to achieve the following effects.

(1) In the embodiment described above, the sensor protection plate 70 is connected to the footrest 2a provided in the vehicle.

According to the above, even when the driver's foot contacts the sensor protection plate 70 and a load due to such contact is put to the sensor protection plate 70, the load due to such contact is transferred to the footrest 2a, thereby preventing the load from being put to the magnetic sensor 41. Thus, even when the driver's foot comes into contact with the sensor protection plate 70 due to an operational error by the driver, the magnetic sensor 41 is less likely to be damaged.

First Modification of the Fifth Embodiment

In the fifth embodiment described above, an example has been described in which the sensor protection plate 70 is fixed to the pedal-facing surface 2b, but configuration of the sensor protection plate 70 is not limited thereto. For example, the sensor protection plate 70 may be fixed to a part of the footrest 2a on which the foot is placed.

Second Modification of the Fifth Embodiment

In the fifth embodiment described above, an example has been described in which the sensor protection plate 70 is fixed to the footrest 2a, but configuration of the sensor protection plate 70 is not limited thereto. For example, the sensor protection plate 70 may be not fixed to the footrest 2a as long as it is provided on the vehicle left side of the first housing 11.

Third Modification of the Fifth Embodiment

Although in the fifth embodiment described above, the sensor protection plate 70 is formed separately from the first housing 11, configuration of the sensor protection plate 70 is not limited thereto. For example, the sensor protection plate 70 may be formed integrally with the first housing 11 as in the first embodiment.

Sixth Embodiment

Next, the sixth embodiment will be described with reference to FIGS. 26 and 27. The present embodiment is different from the fifth embodiment in that a magnetic sensor 41 is attached to the vehicle right side of a shaft 30. Further, the present embodiment is different from the fifth embodiment in that a sensor protection plate 70 for covering the magnetic sensor 41 attached to the vehicle right side of the shaft 30 is replaced with an accelerator connecting part 76. The other configurations are the same as those of the fifth embodiment. Therefore, in the present embodiment, components that are different from the fifth embodiment will be mainly described, and descriptions of components similar to the fifth embodiment may be omitted.

Figure 26:
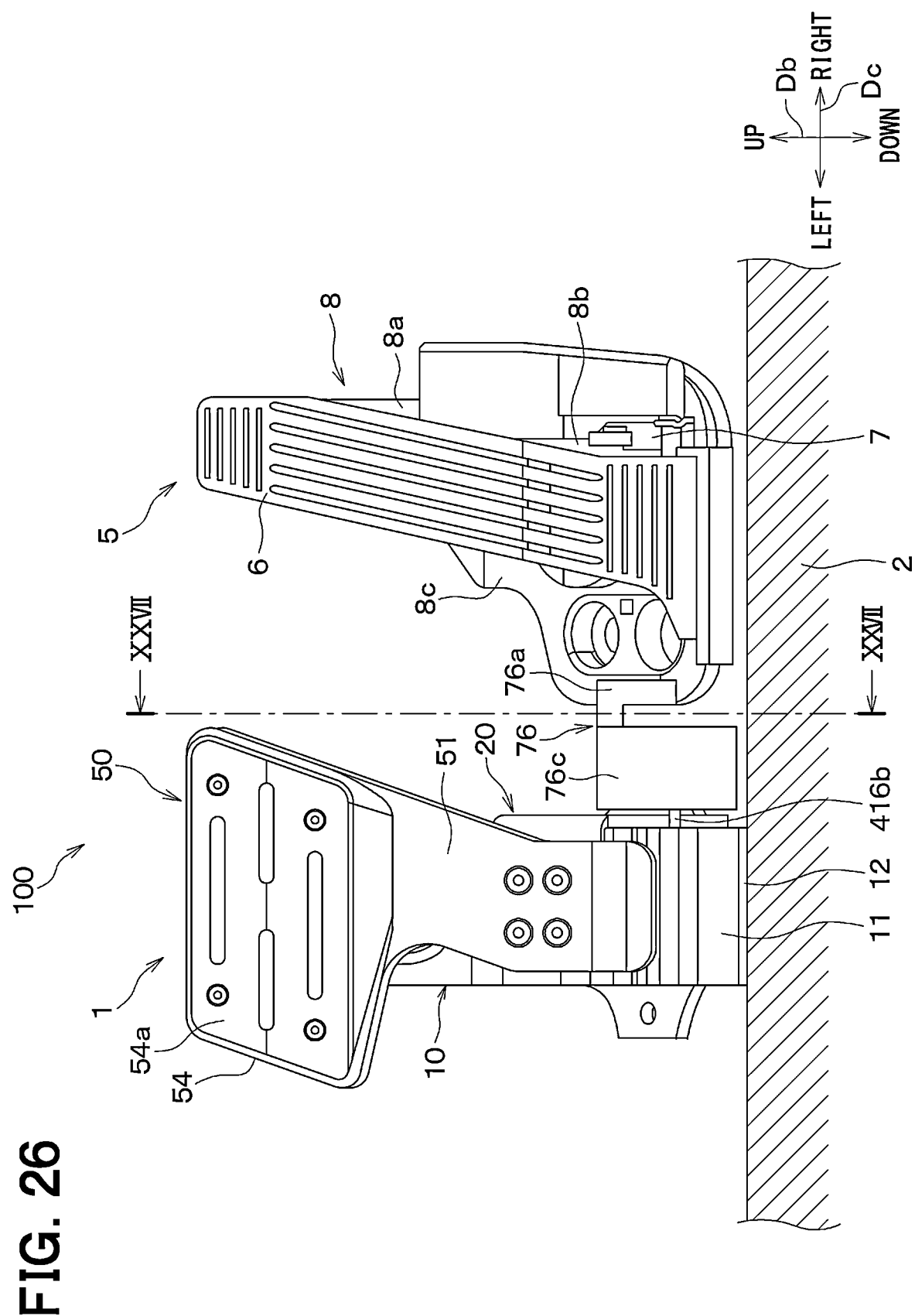
FIG. 26 is a front view of a pedal module according to a sixth embodiment.
Figure 27:
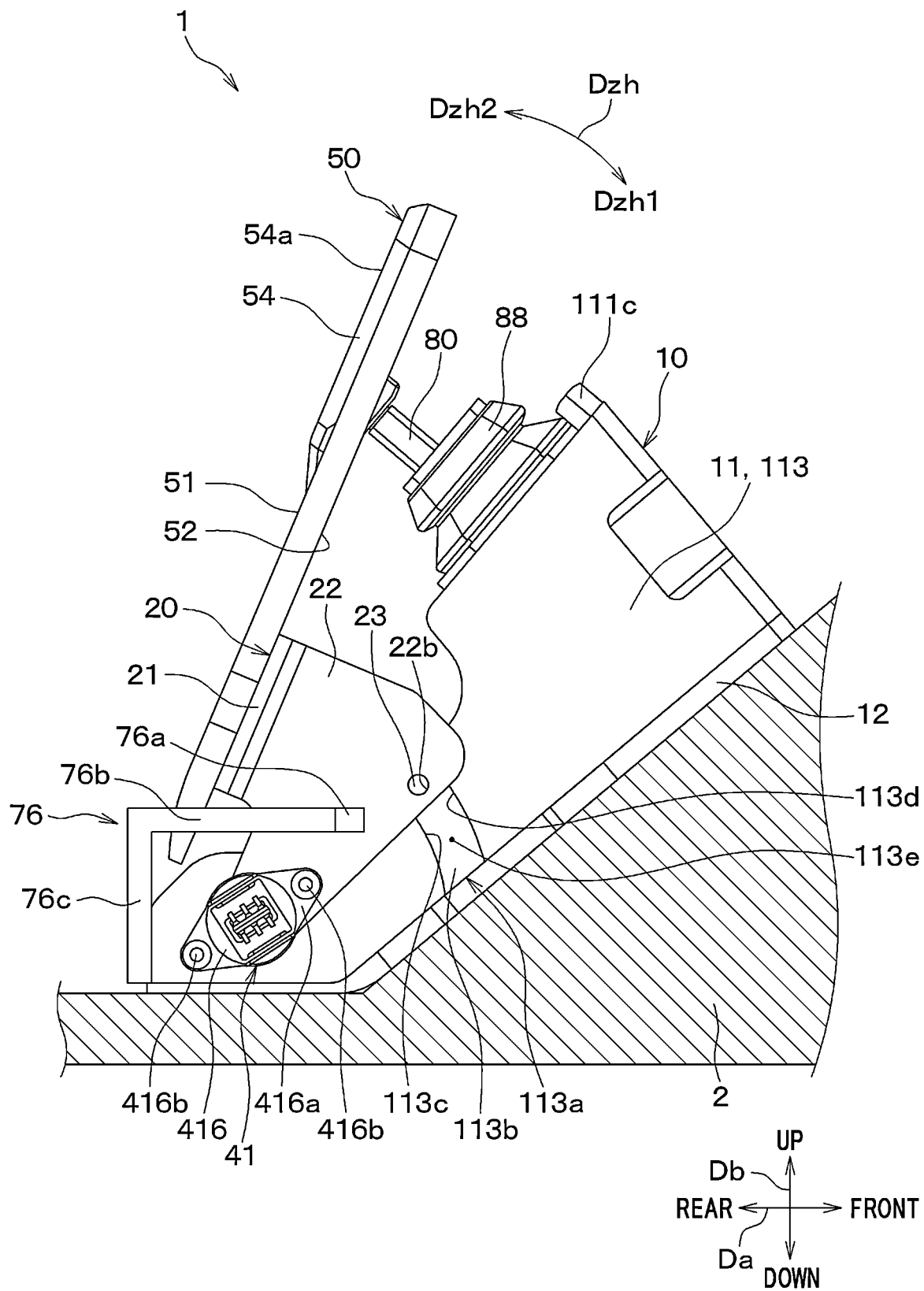
FIG. 27 is a cross-sectional view taken on a XXVII-XXVII line in FIG. 26.

The magnetic sensor 41 of the present embodiment is fixed to a right side wall 113 of a first housing 11 by attaching two sensor fixing screws 416b to a sensor fixing part 416a, as shown in FIGS. 26 and 27. That is, the magnetic sensor 41 of the present embodiment is provided at a position between a brake pedal 50 and an accelerator pedal 6, on the vehicle right side of the first housing 11.

The accelerator connecting part 76 of the present embodiment is provided on the side where the accelerator pedal 6 is positioned with respect to the brake pedal 50 in the pedal arrangement direction. That is, the accelerator connecting part 76 is provided on the vehicle right side with respect to the brake pedal 50 at a position between the brake pedal 50 and the accelerator pedal 6 in the pedal arrangement direction. As shown in FIG. 26, the accelerator connecting part 76 is spaced away from the brake pedal device 1 and connected to the accelerator pedal device 5. Specifically, the accelerator connecting part 76 is connected to a housing base part 8c of an accelerator housing 8.

Further, as shown in FIGS. 26 and 27, the accelerator connecting part 76 includes a connecting plate part 76a connected to the accelerator pedal device 5, a first connecting part 76b that covers the vehicle upper side of the magnetic sensor 41, and a second connecting part 76c that covers the vehicle rear side of the magnetic sensor 41. The connecting plate part 76a has a plate shape, and extends along the vehicle left-right direction Dc. Further, the connecting plate part 76a has its vehicle right side fixed to the housing base part 8c, and has its vehicle left side connected to the first connecting part 76b.

The first connecting part 76b has a plate shape that extends in the vehicle longitudinal direction Da and the vehicle left-right direction Dc, and has a plate surface in the vehicle vertical direction Db, and covers the vehicle upper side of the magnetic sensor 41. Further, the first connecting part 76b is formed so that the vehicle left side thereof does not come into contact with a side plate part 22 of a rotary plate 20. The second connecting part 76c is connected to the vehicle rear side of the first connecting part 76b.

The second connecting part 76c has a plate shape that extends in the vehicle vertical direction Db and the vehicle horizontal direction Dc, has a plate surface in the vehicle longitudinal direction Da, and covers the vehicle rear side of the magnetic sensor 41. Further, the second connecting part 76c is formed so that the vehicle left side thereof does not come into contact with the right side wall 113 of the first housing 11.

The accelerator connecting part 76 formed in such manner covers parts of the magnetic sensor 41 on the vehicle upper and the vehicle rear side, but does not cover the side where the accelerator pedal 6 is positioned in the pedal arrangement direction. That is, the magnetic sensor 41 is covered with the accelerator connecting part 76 on the vehicle upper side and the vehicle rear side. On the other hand, as shown in FIG. 27, the magnetic sensor 41 is exposed to a vehicle compartment space on the vehicle right side, on the vehicle front side, and on the vehicle lower side when viewed from the right side of the vehicle. The accelerator connecting part 76 of the present embodiment functions as a sensor protector.

By the way, in the vehicle compartment space, a distance between the brake pedal 50 and the accelerator pedal 6 is relatively small in the pedal arrangement direction. Therefore, even when the driver makes a mistake in switching from one operation to the other regarding a brake operation and an accelerator operation, the driver's foot is unlikely to enter into a space between the brake pedal 50 and the accelerator pedal 6. Therefore, when the driver's foot is mistakenly stepped on at a position in between the brake pedal 50 and the accelerator pedal 6 due to the driver stepping off the brake pedal 50 or the like, it is unlikely that the driver's foot comes into contact with a vehicle right side part of the magnetic sensor 41. Accordingly, in a configuration in which the magnetic sensor 41 is provided at a position between the brake pedal 50 and the accelerator pedal 6, there is little need to protect a part of the magnetic sensor 41 on the vehicle right side.

Therefore, the configuration of the accelerator connecting part 76 of the present embodiment, which does not cover the part of the magnetic sensor 41 on the vehicle right side, is made simple, while sufficiently protecting the magnetic sensor 41.

Further, according to the embodiment described above, it is possible to achieve the following effects.

(1) In the embodiment described above, the accelerator connecting part 76 is connected to the housing base part 8c of the accelerator housing 8 in the accelerator pedal device 5.

According to the above, even when the driver's foot contacts the accelerator connecting part 76 due to an operational error by the driver, the load due to such contact is transferred to the housing base part 8c of the accelerator pedal device 5, thereby suppressing the transmission of the load to the magnetic sensor 41. Therefore, even when the driver's foot comes into contact with the accelerator connecting part 76 due to an operational error by the driver, the magnetic sensor 41 is less likely to be damaged.

First Modification of the Sixth Embodiment

In the above-described sixth embodiment, an example has been described in which the accelerator connecting part 76 covers the parts of the magnetic sensor 41 on the vehicle upper side and on the vehicle rear side. However, the present disclosure is not limited thereto. The accelerator connecting part 76 may be configured to cover either one of the part on the vehicle upper side or the part on the vehicle rear side of the magnetic sensor 41.

Second Modification of the Sixth Embodiment

In the above-described sixth embodiment, an example in which the accelerator connecting part 76 is connected to the accelerator pedal device 5 has been described. However, the present disclosure is not limited thereto. For example, the accelerator connecting part 76 may be configured not to be connected to the accelerator pedal device 5 as long as it is provided at a position between the brake pedal 50 and the accelerator pedal 6 in the pedal arrangement direction. For example, the accelerator connecting part 76 may be configured to be connected to the first housing 11 of the brake pedal device 1.

Seventh Embodiment

Next, the seventh embodiment will be described with reference to FIG. 28. The present embodiment is different from the first embodiment in that a brake pedal device 1 is attached to the vehicle via a bracket 77, and a magnetic sensor 41 is protected by the bracket 77. In the present embodiment, an inductive sensor 42 and a sensor protection plate 70 are eliminated compared to the first embodiment. The other configurations are the same as those of the first embodiment. Therefore, in the present embodiment, components that are different from the first embodiment will be mainly described, and descriptions of components similar to the first embodiment may be omitted.

The bracket 77 is a support member for fixing the brake pedal device 1 to the vehicle. The bracket 77 has a plate shape having a plate surface in the vehicle vertical direction Db, and is made of iron, which is the same metal as the second housing 12, for example. However, the material of the bracket 77 is not limited, and the bracket 77 may be formed of a metal different from iron, or may be formed of a material different from metal (for example, resin).

Figure 28:
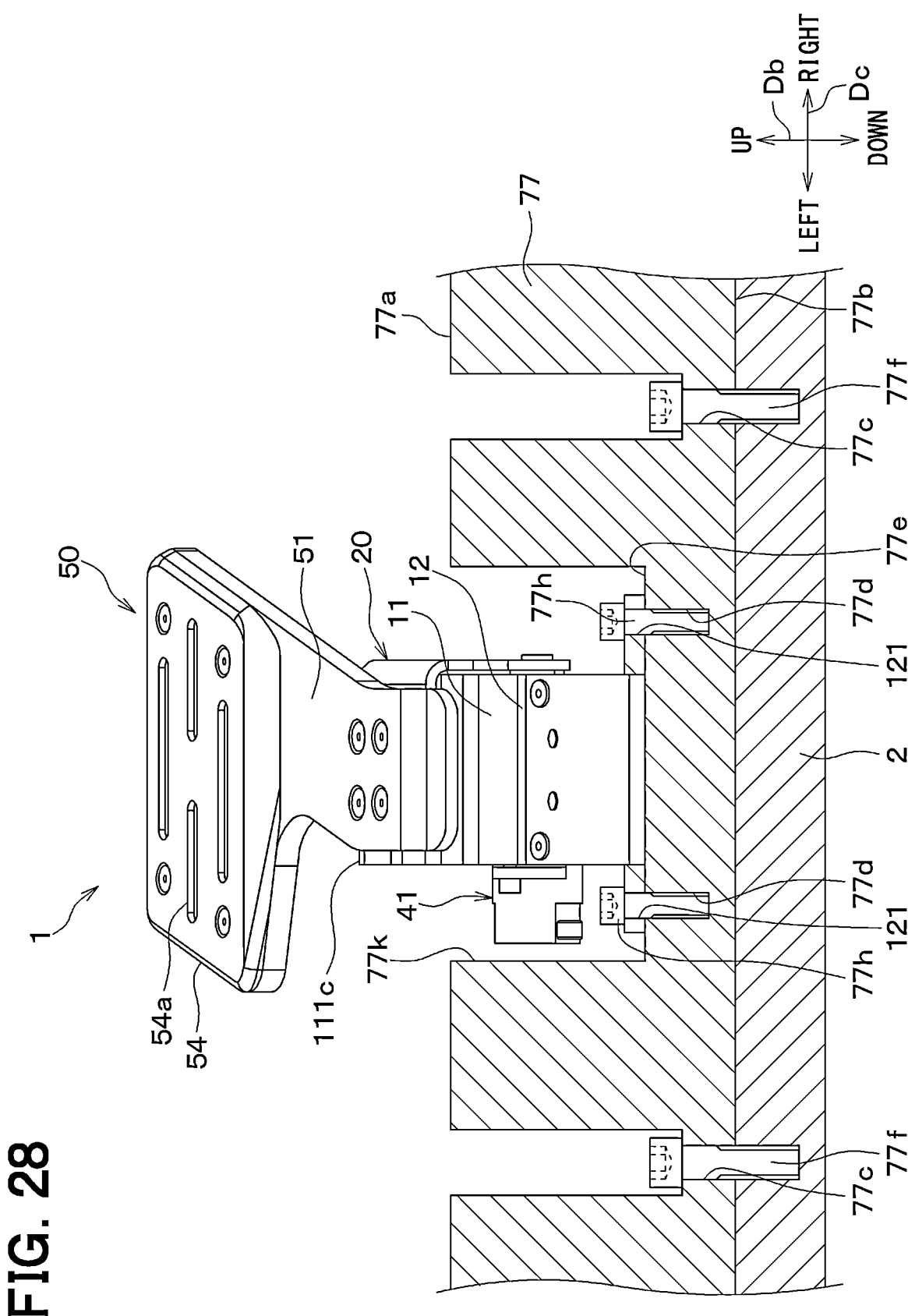
FIG. 28 is a front view of a brake pedal device according to a seventh embodiment.

As shown in FIG. 28, the bracket 77 has a bracket upper surface 77a facing the vehicle compartment space on the vehicle upper side, and a bracket lower surface 77b to be placed on the floor 2 on the vehicle lower side. The bracket 77 is also formed with a plurality of bracket fixing holes 77c that penetrate from the bracket upper surface 77a to the bracket lower surface 77b, and a plurality of pedal fixing holes 77d that do not penetrate from the bracket upper surface 77a to the bracket lower surface 77b. Further, the bracket 77 is formed with a bracket recess 77e into which a part of the brake pedal device 1 is fitted.

The plurality of bracket fixing holes 77c are holes into which bracket fixing screws 77f for fixing the bracket 77 to the floor 2 are inserted, and are formed at positions different from where the bracket recess 77e is formed. The plurality of pedal fixing holes 77d are holes into which pedal fixing screws 77h for fixing the brake pedal device 1 to the bracket 77 are inserted, and are formed from the vehicle upper side toward the vehicle lower side in the bracket recess 77e.

The bracket 77 is fixed to the floor 2 by inserting the bracket fixing screw 77f into the bracket fixing hole 77c and fastening it to the floor 2. Further, the brake pedal device 1 is fixed in a state in which it is fitted into the bracket recess 77e by inserting and fastening the pedal fixing screw 77h into a bolt hole 121 and the pedal fixing hole 77d. Thereby, the brake pedal device 1 is fixed to the floor 2 via the bracket 77.

The bracket recess 77e is recessed from the bracket upper surface 77a toward the bracket lower surface 77b. The bracket recess 77e is configured such that the magnetic sensor 41 can be accommodated inside the bracket recess 77e when the brake pedal device 1 is fixed to the bracket 77. Further, the size of the bracket recess 77e in the vehicle vertical direction Db is set so that the pad 54 is arrangeable outside the bracket recess 77e.

That is, the size of the bracket recess 77e in a depth direction is set such that the magnetic sensor 41 can be accommodated inside the bracket recess 77e. The size of the bracket recess 77e in the depth direction is set so that the bracket upper surface 77a and the pedal back surface 52 of the brake pedal 50 do not interfere with each other when the brake pedal 50 is rotated by the driver's brake operation. Specifically, the size of the bracket recess 77e in the depth direction is set such that a pedal stopper 111c is positioned above the bracket upper surface 77a in the vehicle when the brake pedal device 1 is fixed in the bracket recess 77e.

Further, the bracket recess 77e has a dimension which is configured to reserve a small gap between (i) the vehicle left side of the detector holding part 416 of the magnetic sensor 41 and (ii) an inner wall surface 77k of the bracket recess 77e, when the brake pedal device 1 is fixed to the bracket 77. That is, the bracket recess 77e is formed so that the inner wall surface 77k is near the magnetic sensor 41 and does not come into contact with the magnetic sensor 41 when the brake pedal device 1 is fixed to the bracket 77.

The bracket 77 formed in such manner (i) supports the brake pedal device 1 by being fixed to the floor 2, and (ii) protects the magnetic sensor 41 by covering the vehicle left side of the magnetic sensor 41 when the brake pedal device 1 is fixed to the bracket 77. In other words, the bracket 77 of the present embodiment has a function as a sensor protector.

According to the above, even when the driver's foot contacts the bracket 77 due to an operational error by the driver, the load due to such contact is transferred to the bracket 77, thereby suppressing the load from being transferred to the magnetic sensor 41. Therefore, even when the driver's foot comes into contact with the bracket 77 due to an operational error by the driver, the magnetic sensor 41 is less likely to be damaged. Further, since the magnetic sensor 41 is protectable by the bracket 77 that is used for fixing the brake pedal device 1 to the vehicle, protection of the magnetic sensor 41 is achievable without providing a dedicated member for protecting the magnetic sensor 41.

Eighth Embodiment

Figure 29:
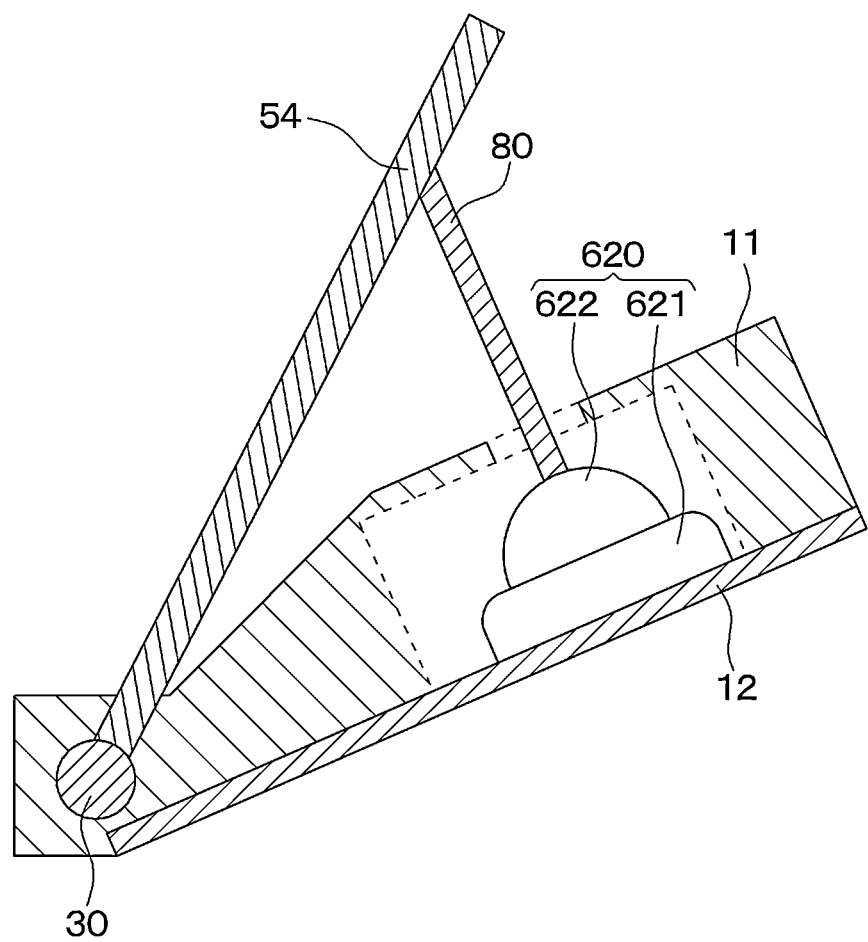
FIG. 29 is a cross-sectional view of a brake pedal device according to an eighth embodiment.

Next, the eighth embodiment will be described with reference to FIG. 29. The present embodiment is different from the first embodiment in that a reaction force generating mechanism 60 is replaced with a rubber elastic part 620. Further, in the present embodiment, an inductive sensor 42 is eliminated compared to the first embodiment. The other configurations are the same as those of the first embodiment. Therefore, in the present embodiment, components that are different from the first embodiment will be mainly described, and descriptions of components similar to the first embodiment may be omitted.

In a brake pedal device 1 of the present embodiment, the reaction force generating mechanism 60 is eliminated compared to the first embodiment. In place of the discontinued reaction force generating mechanism 60, the brake pedal device 1 includes the rubber elastic part 620 made of a rubber material as a member that generates a reaction force for the driver's stepping force. The rubber elastic part 620 applies a reaction force for a brake pedal 50 against the load put on the brake pedal 50 by elastically deforming when the brake pedal 50 is rotated by the driver's brake operation. As shown in FIG. 29, the rubber elastic part 620 includes a rubber supporter 621 and a rubber deformable part 622. The rubber supporter 621 and the rubber deformable part 622 are configured as an integrally-molded product. Further, in FIG. 29, various components constituting the brake pedal device 1 are simplified as appropriate.

The rubber supporter 621 is a part that supports the rubber deformable part 622 and is provided on the vehicle upper side in the second housing 12. The rubber deformable part 622 is provided on the vehicle upper side of the rubber supporter 621.

The rubber deformable part 622 has a hemispherical shell shape that protrudes toward the vehicle upper side, and is connected to the rubber supporter 621 on the vehicle lower side. The rubber deformable part 622 has a hollow hemispherical shape, and has a space inside for the rubber deformable part 622 itself to deform. A connecting rod 80 fixed to a pedal back surface 52 of the brake pedal 50 is connected to a part of the rubber deformable part 622 on the vehicle upper side.

The rubber elastic part 620 configured in the above-described manner has the rubber deformable part 622 being pushed toward the vehicle lower part and elastically deformed when the stepping force applied to the brake pedal 50 is transmitted thereto via the connecting rod 80. Then, the rubber elastic part 620 generates a reaction force corresponding to the driver's stepping force applied to the brake pedal 50 by the elastic force generated by the elastic deformation of the rubber deformable part 622.

By the way, when the reaction force generating mechanism 60 has a spring formed of a steel material, it may possibly generate a sound when the spring is rubbed against a part that supports the spring due to vibrations of the vehicle or when the spring expands and contracts. On the other hand, when the rubber elastic part 620 is made of a rubber material, such a sound is less likely to be generated, compared to a case where corresponding member is made of a spring made of a steel material. Therefore, it is possible to suppress the generation of sound when a reaction force for the driver's stepping force is generated.

Ninth Embodiment

Figure 30:
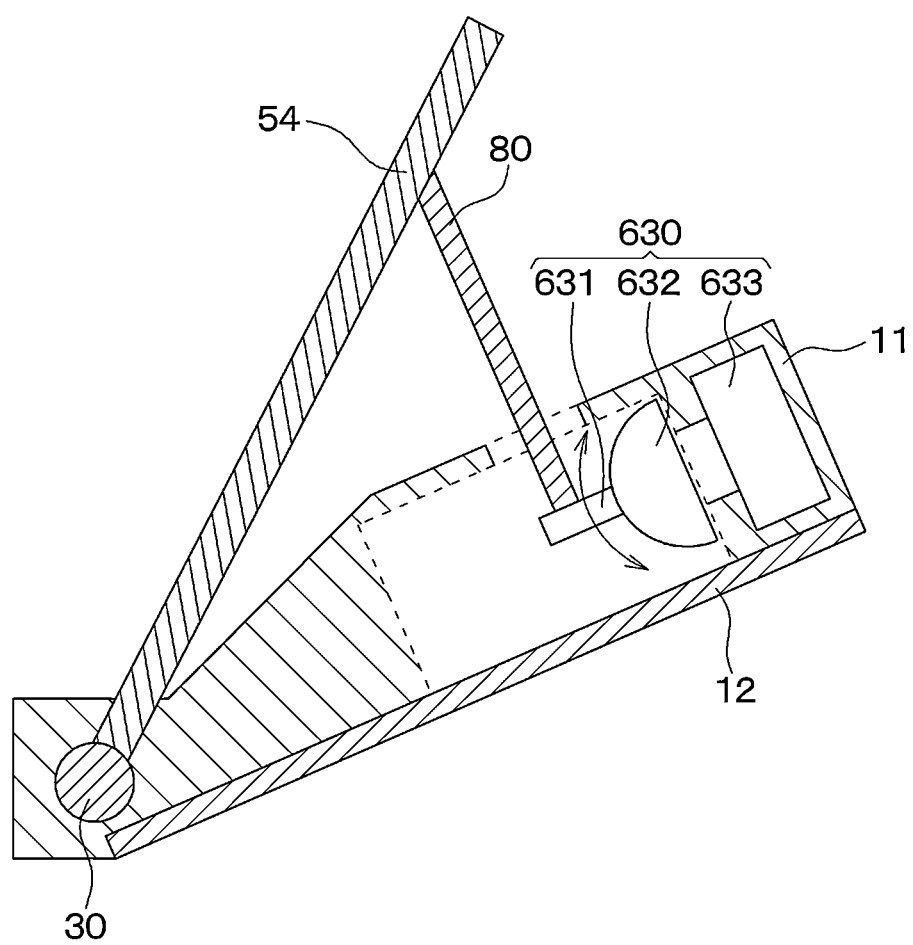
FIG. 30 is a cross-sectional view of a brake pedal device according to a ninth embodiment.

Next, the ninth embodiment will be described with reference to FIG. 30. The present embodiment is different from the first embodiment in that a reaction force generating mechanism 60 is replaced with an actuator part 630. Further, in the present embodiment, an inductive sensor 42 is eliminated compared to the first embodiment. The other configurations are the same as those of the first embodiment. Therefore, in the present embodiment, components that are different from the first embodiment will be mainly described, and descriptions of components similar to the first embodiment may be omitted.

In a brake pedal device 1 of the present embodiment, the reaction force generating mechanism 60 is eliminated compared to the first embodiment. In place of the discontinued reaction force generating mechanism 60, the brake pedal device 1 includes an actuator part 630 that generates a reaction force for the load put to the brake pedal 50 by the driver's brake operation. The actuator part 630 applies a reaction force for the brake pedal 50 in response to the load put to the brake pedal 50 according to the amount of rotation of the brake pedal 50 when the brake pedal 50 is rotated by the driver's brake operation. As shown in FIG. 30, the actuator part 630 includes a drive part 631, a drive connection part 632, and a control circuit part 633 that controls the operation of the drive part 631. Further, in FIG. 30, various components constituting the brake pedal device 1 are simplified as appropriate.

The drive part 631 is a rectangular plate-like member having a plate surface in the vehicle vertical direction Db, and has the plate surface on the vehicle upper side of the plate-like member connected to a connecting rod 80 which is fixed to a pedal back surface 52 of the brake pedal 50. Further, one longitudinal side of the drive part 631 is connected to the drive connection part 632. The drive part 631 is configured to be capable of swinging in the vehicle vertical direction Db by the drive connection part 632, centering on the side connected to the drive connection part 632.

The drive connection part 632 is a drive force generation part that includes an electric motor (not shown) and generates a driving force for swinging the drive part 631. The driving force generated by the drive connection part 632 is transmitted to the brake pedal 50 via the drive part 631. The drive connection part 632 swings the drive part 631 in the vehicle vertical direction Db based on a control signal transmitted from the control circuit part 633. The drive connection part 632 is electrically connected to the control circuit part 633.

The control circuit part 633 acquires information on the rotation angle of the brake pedal 50 when the driver performs a brake operation based on the detection signal transmitted from the sensor unit 40, and controls the operation of the drive connection part 632 based on the acquired rotation angle information. The control circuit part 633 is an electric circuit consisting of a microcomputer including a CPU, a storage unit such as ROM or RAM, and its peripheral circuits. For example, the storage unit such as the CPU, ROM, and RAM is a non-transitory, substantial storage medium. The storage unit stores a control map, which will be described later, regarding the driving force generated by the drive connection part 632. The control circuit part 633 has the sensor unit 40 connected to its input side, and has the drive connection part 632 connected to its output side.

When information on the rotation angle of the brake pedal 50 is input from the sensor unit 40, the control circuit part 633 calculates the driving force generated by the drive connection part 632 based on the information on the rotation angle. Then, the control circuit part 633 transmits a control signal corresponding to the calculated driving force to the electric motor of the drive connection part 632 to rotate the electric motor of the drive connection part 632. Thereby, the drive connection part 632 changes the reaction force for the load put to the brake pedal 50 by the driver's brake operation via the drive part 631.

The driving force output by the drive connection part 632 is set based on the rotation angle of the brake pedal 50 and a control map predefined in the storage unit of the control circuit part 633. That is, the control circuit part 633 controls the reaction force applied to the driver's brake operation based on the control map. The control map can be obtained through experiments conducted in advance to determine the rotation angle of the brake pedal 50 and the reaction force applied to the brake pedal 50. Further, the driving force set by the control map may be configured to be adjustable by the driver operating a setting device (not shown).

According to the above, the actuator part 630 can change the reaction force based on the detection result of the sensor unit 40. Further, for example, in case of having a configuration in which the reaction force is generated by a spring, the reaction force is determined by an elasticity coefficient of the spring. Therefore, in a configuration in which a spring generates a reaction force, it is difficult to adjust the reaction force corresponding to the rotation angle of the brake pedal 50 in a state in which the brake pedal device 1 is mounted on a vehicle.

In contrast, the actuator part 630, which can change the reaction force based on the rotation angle of the brake pedal 50 and a control map predetermined in the control circuit part 633, is capable of adjusting the reaction force by an adjustment of the control map according to the driver's preference, for example.

Tenth Embodiment

Next, the tenth embodiment will be described with reference to FIGS. 31 to 34. The present embodiment is different from the third embodiment in that a brake pedal device 1 is configured as a pendant-type pedal device. The other configurations are the same as those of the third embodiment. Therefore, in the present embodiment, components that are different from the third embodiment will be mainly described, and descriptions of components similar to the third embodiment may be omitted.

Figure 31:
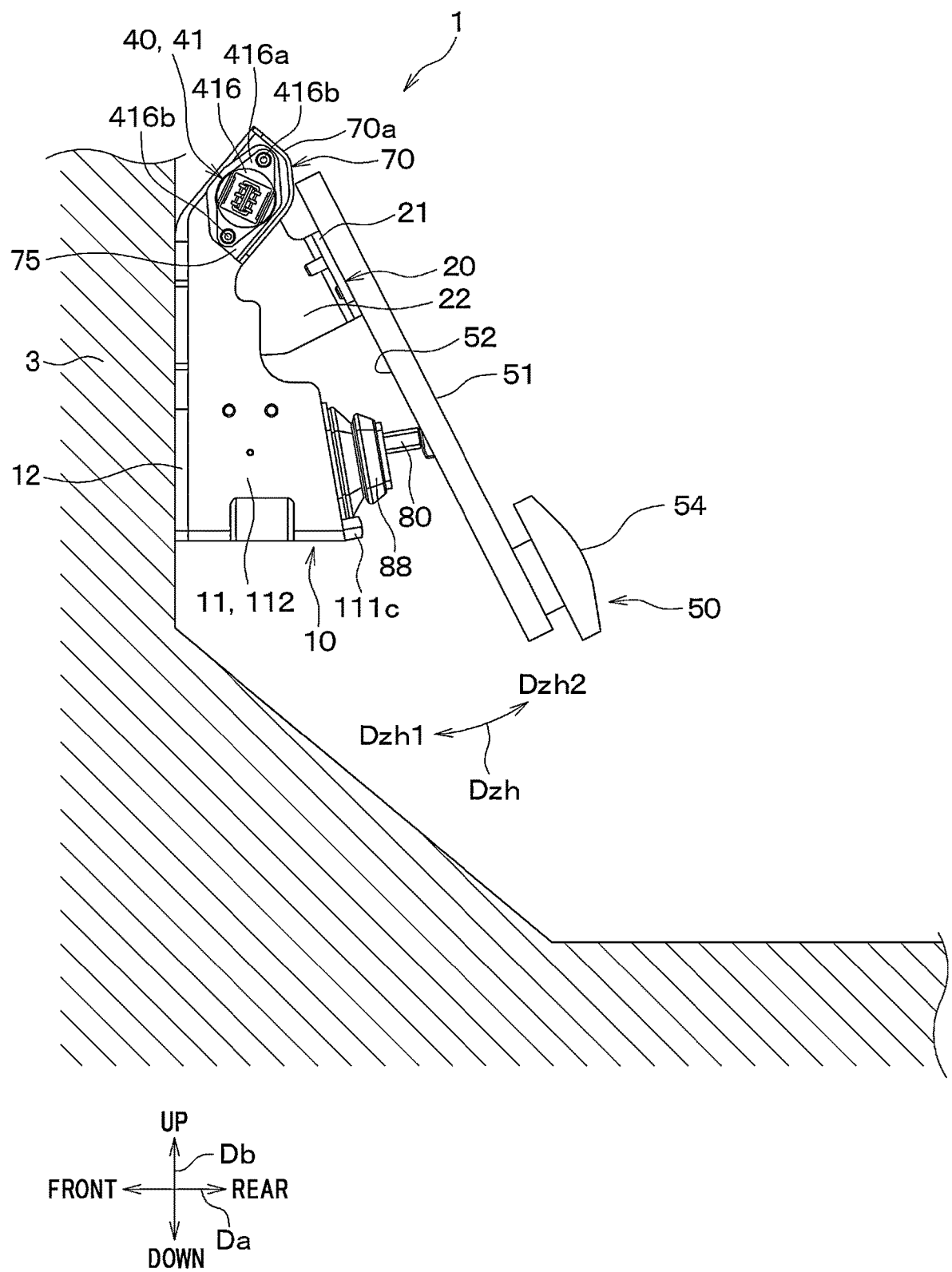
FIG. 31 is a left side view of a brake pedal device according to a tenth embodiment.
Figure 32:
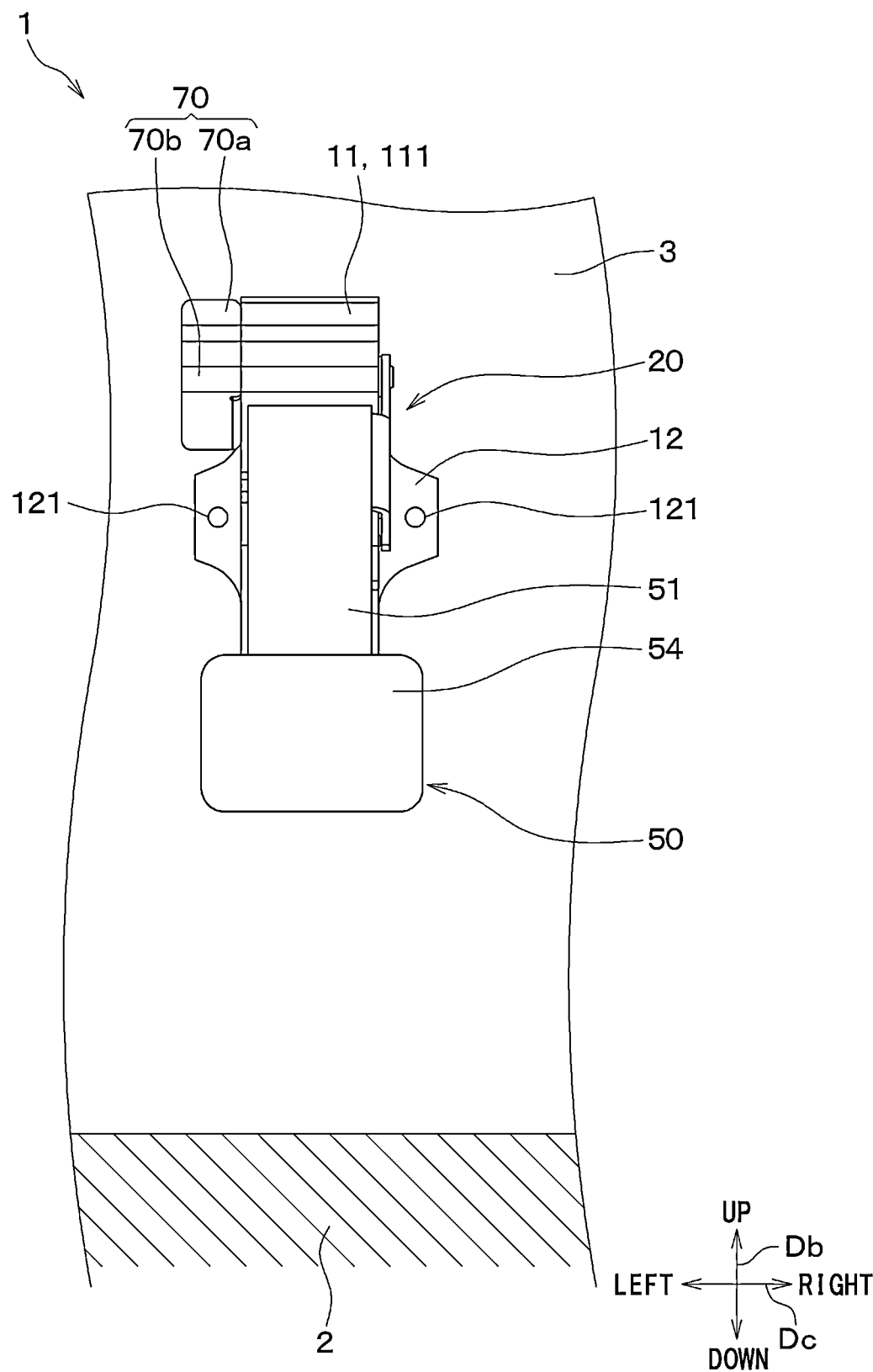
FIG. 32 is a front view of a brake pedal device according to the tenth embodiment.

As shown in FIGS. 31 and 32, the brake pedal device 1 of the present embodiment is attached to a dash panel 3 that separates an engine room from a vehicle compartment. When the brake pedal device 1 is attached to the dash panel 3, a pad 54 of a brake pedal 50, which is stepped on by the driver, is configured to be arranged on the vehicle lower side with respect to a rotation axis CL, which is the center of rotation of the brake pedal 50. That is, a shaft 30 of the present embodiment is arranged vertically above the pad 54. As described above, the brake pedal device 1 in which a part of the brake pedal 50 that is stepped on by the driver is provided vertically below the rotation axis CL is a pendant-type pedal device.

The brake pedal device 1 of the present embodiment is fixed to the dash panel 3 by inserting a housing bolt (not shown) into a bolt hole 121 of a second housing 12. Further, the brake pedal 50 is configured such that, when the brake pedal 50 is positioned at the reference position, an end thereof on the vehicle lower side is positioned in the vehicle lower part than an end of the housing 10 on the vehicle lower side.

Figure 33:
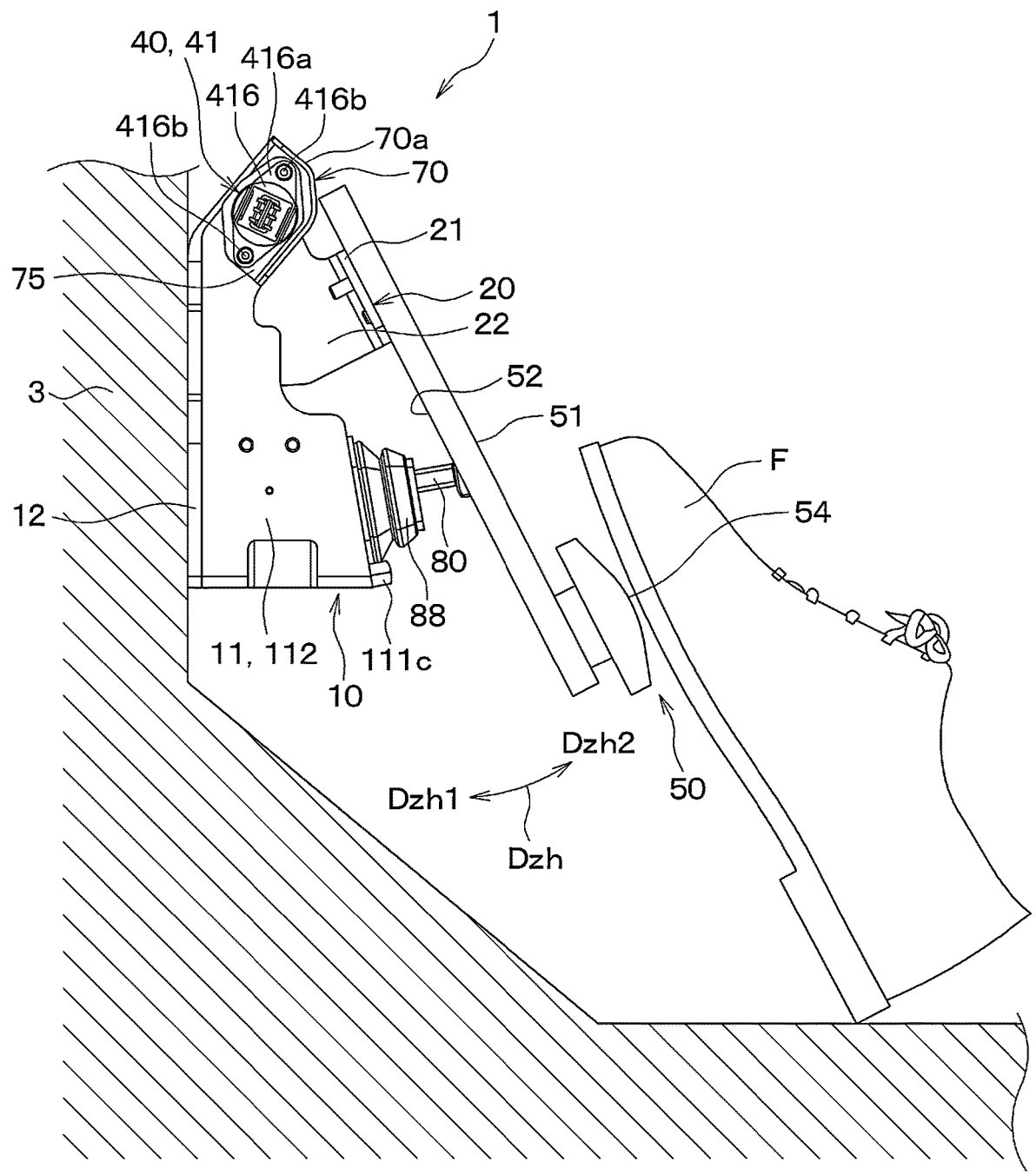
FIG. 33 is a diagram of a positional relationship between a sensor protection plate and a driver's foot according to the tenth embodiment.
Figure 34:
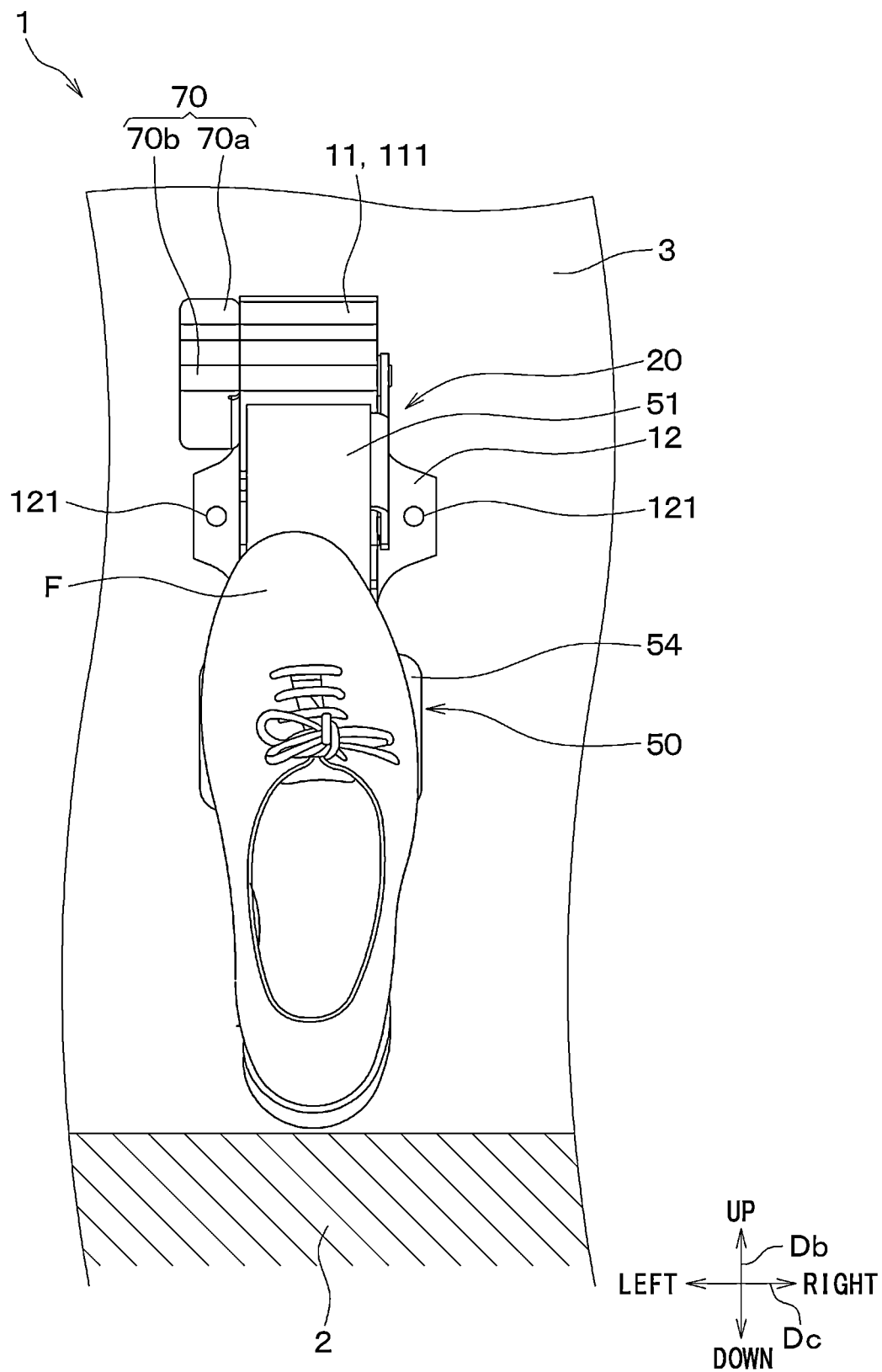
FIG. 34 is another diagram of a positional relationship between the sensor protection plate and the driver's foot according to the tenth embodiment.

As shown in FIGS. 33 and 34, in the pendant-type brake pedal device 1, when the driver steps on the pad 54, a part of the brake pedal 50 in the vehicle lower part than the rotation axis CL rotates from the reference position toward the floor 2 and the dash panel 3.

Further, when the driver's stepping force applied to the brake pedal 50 decreases, the pad 54 rotates away from the floor 2 or the dash panel 3 in the vehicle compartment. Then, by performing a brake release operation, the brake pedal 50 is restored to the reference position, i.e., to a position before stepping.

According to the above, as shown in FIGS. 33 and 34, compared to the configuration in which the shaft 30 is arranged vertically below the pad 54 as shown in the first embodiment and the like, the magnetic sensor 41 can be positioned away from the driver's foot F when the driver performs a brake operation. Therefore, even when the driver's foot F misses the pad 54 due to an operational error by the driver, contact between the magnetic sensor 41 and the driver's foot F is less likely to occur.

OTHER EMBODIMENTS

Although the representative embodiments of the present disclosure have been described above, the present disclosure is not limited to such embodiments and can be variously modified as follows, for example.

In the second to tenth embodiments described above, an example has been described in which the brake pedal device 1 does not include the inductive sensor 42. However, the present disclosure is not limited thereto. For example, a brake pedal device 1 may include an inductive sensor 42.

In the embodiments described above, a configuration in which the brake pedal device 1 is not provided with a member that protects the inductive sensor 42 has been described. However, the present disclosure is not limited thereto. For example, a brake pedal device 1 may be configured to include a member that protects an inductive sensor 42.

In the embodiments described above, an example has been described in which the magnetic sensor 41 is provided at a position farther away in the first circumferential direction Dzh1 than the virtual operation plane VP when the brake pedal 50 is positioned at the reference position. Further, an example has been described in which (i) at least a part of the sensor protection plate 70 is positioned on the near side in the first circumferential direction Dzh1 than the magnetic sensor 41, and (ii) the entire sensor protection plate 70 is positioned on the first circumference direction Dzh1 side than the virtual operation plane VP when the brake pedal 50 is positioned at the reference position. However, the arrangement of the magnetic sensor 41 and the sensor protection plate 70 is not limited thereto.

For example, the magnetic sensor 41 may be put at a position on the near side in the rotation axis circumferential direction Dzh (i.e., on the second circumferential direction Dzh2 side) than the virtual operation plane VP when the brake pedal 50 is positioned at the reference position.

Further, the sensor protection plate 70 may also be entirely provided on the near side in the rotation axis circumferential direction Dzh (that is, on the second circumferential direction Dzh2 side) than the virtual operation plane VP when the brake pedal 50 is positioned at the reference position.

In the embodiments described above, the sensor unit 40 has been described as having the magnetic sensor 41 and the inductive sensor 42 that detect the rotation angle of the brake pedal 50 using different detection methods. However, the sensor unit 40 is not limited thereto. The sensor unit 40 may be configured to detect the rotation angle of the brake pedal 50 using one detection method. For example, the sensor unit 40 may be configured to include only one of the magnetic sensor 41 and the inductive sensor 42.

Moreover, unlike the non-contact-type magnetic sensor 41 and the inductive sensor 42, the sensor unit 40 may be configured to include a contact-type angle sensor such as a contact-type potentiometer-type sensor or the like. Further, the sensor unit 40 may have a non-contact angle sensor different from the magnetic sensor 41 and the inductive sensor 42, such as an optical rotary encoder or the like.

In the embodiments described above, an example has been described in which the sensor unit 40 includes the magnetic field generating part 411 that generates a magnetic field using magnetism, and the magnetic detecting part 415 that detects changes in the magnetic field generated by the magnetic field generating part 411 according to the rotation angle of the brake pedal 50. However, the configuration of the sensor unit 40 is not limited thereto. For example, the sensor unit 40 may have a configuration that does not include the magnetic field generating part 411 and the magnetic detecting part 415.

In the embodiments described above, an example has been described in which the magnetic sensor 41 has two Hall elements 415a and 415b. However, the present disclosure is not limited thereto. For example, the magnetic sensor 41 may have only one Hall element, or may have three or more Hall elements.

In the embodiments described above, an example has been described in which the sensor unit 40 includes a coil part 422 to which an electric current is applied to generate a magnetic field, and a circuit board 423 that detects a change in impedance of the coil part 422 that changes according to the rotation angle of the brake pedal 50. However, the configuration of the sensor unit 40 is not limited thereto. For example, the sensor unit 40 may have a configuration that does not include the coil part 422 and the circuit board 423.

In the embodiments described above, the brake pedal device 1 in which a brake operation is performed by the driver's foot has been described. However, the present disclosure is not limited thereto. For example, the brake pedal device 1 may be configured to be operable by the driver's hands.

In the embodiments described above, an example has been described in which the brake pedal 50 is configured to be rotatable in the first circumferential direction Dzh1 and the second circumferential direction Dzh2 about the rotation axis CL. However, the brake pedal 50 is not limited thereto. For example, the brake pedal 50 may be configured to be capable of linearly reciprocating.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components in the embodiments, except when numerical values such as the number, numerical values, quantities, ranges, and the like are expressly referred to as essential, and when it is obviously limited to the specific number in principle, and the like.

In the embodiments described above, when referring to the shape, positional relationship, and the like of a component and the like, it is not limited to the shape, positional relationship, and the like, except for the case where it is specifically described, the case where it is fundamentally limited to a specific shape, positional relationship, and the like, and the like.

What is claimed is:

1. A brake pedal device comprising:
a casing;
a brake pedal connected to the casing with a posture changeable by a brake operation of a driver, and including an operation unit that is pressed by the driver when the brake operation is performed;
a reaction force generating unit provided inside the casing, and the reaction force generating unit being configured to generate a reaction force with respect to the brake pedal in accordance with an amount of change in the posture of the brake pedal during the brake operation, and to cause the brake pedal to return to a reference position when the brake operation is released;
a sensor unit provided outside the casing, to detect the amount of change in the posture of the brake pedal; and
a sensor protector provided at the casing in a position away from the brake pedal, and covering at least a part of the sensor unit, wherein
the casing is made of a material different from the sensor protector, and at least a part of the casing has a mass per unit volume smaller than that of the sensor protector, and
the sensor protector has a higher rigidity than at least the part of the casing.

2. The brake pedal device of claim 1, wherein
in a case that (i) a direction, in which the posture of the brake pedal changes from the reference position when the operation unit is pressed, is as a brake operation direction, and (ii) a virtual plane, perpendicular to the brake operation direction at a position of the operation unit when the brake pedal is positioned at the reference position, is as a virtual operation plane,
the sensor unit is provided at a position farther away in the brake operation direction than the virtual operation plane when the brake pedal is positioned at the reference position, and
the sensor protector is at least partially provided on a near side of the virtual operation plane in the brake operation direction than the sensor unit, and is entirely provided at a position farther away in the brake operation direction than the virtual operation plane when the brake pedal is positioned at the reference position.

3. The brake pedal device of claim 1, wherein
the sensor unit and the sensor protector are attached to the casing to be spaced apart from each other.

4. The brake pedal device of claim 1, wherein
the sensor unit and the sensor protector are attached to the casing by a common attachment member.

5. The brake pedal device of claim 1, wherein
the brake pedal device is mounted on a vehicle,
the sensor unit is provided on one side of the casing in a vehicle width direction of the vehicle, and
the sensor protector covers (i) a part of the sensor unit on the one side in the vehicle width direction and (ii) an upper part of the sensor unit in a vertical direction.

6. The brake pedal device of claim 5, further comprising:
a shaft rotating about a predetermined rotation axis together with the brake pedal according to the brake operation, wherein
the operation unit is a pad that is stepped on by the foot of the driver, and
the shaft is arranged below the pad in the vertical direction.

7. The brake pedal device of claim 5, further comprising:
a shaft rotating around a predetermined rotation axis together with the brake pedal in accordance with the brake operation, wherein
the sensor unit is provided at one end of the shaft in the direction in which the rotation axis extends, and detects the amount of change in the posture of the brake pedal by detecting a rotation angle of the shaft,
the operation unit is a pad that is stepped on by the foot of the driver, and
the shaft is arranged above the pad in the vertical direction.

8. The brake pedal device of claim 1, wherein
the brake pedal device is mounted on a vehicle having an accelerator pedal provided on a right side of the brake pedal device in a left-right direction of the vehicle, the accelerator pedal being configured to perform an accelerator operation by the foot of the driver,
the brake pedal is a pedal on which the brake operation is performed by the foot of the driver, and
the sensor unit and the sensor protector are provided on the left side of the casing in the left-right direction.

9. The brake pedal device of claim 8, wherein
the sensor protector is connected to a footrest provided in the vehicle.

10. The brake pedal device of claim 1, wherein
the brake pedal device is mounted on a vehicle having an accelerator pedal provided on a right side of the brake pedal device in a left-right direction of the vehicle, the accelerator pedal being configured to perform an accelerator operation by the foot of the driver,
the brake pedal is a pedal on which the brake operation is performed by the foot of the driver,
the sensor unit is provided at a position between the brake pedal and the accelerator pedal, and
the sensor protector covers at least one of an upper part of the sensor unit in a vertical direction and a rear part of the sensor unit in a vehicle front-rear direction.

11. The brake pedal device of claim 1, wherein
the sensor unit includes a plurality of detection units that detect the amount of change in the posture of the brake pedal using respectively different detection methods.

12. The brake pedal device of claim 11, wherein
the sensor unit includes (i) a magnetic field generating part that generates a magnetic field using own magnetism thereof, and (ii) a magnetic detecting part that detects changes in the magnetic field generated by the magnetic field generating part in accordance with changes in the posture of the brake pedal.

13. The brake pedal device of claim 12, wherein
the sensor unit includes a plurality of the magnetic detecting parts.

14. The brake pedal device of claim 11, wherein
the sensor unit includes (i) a coil part to which an electric current is applied to generate a magnetic field, and (ii) an impedance detection unit that detects a change in impedance of the coil part in accordance with the change in the posture of the brake pedal.

15. The brake pedal device of claim 1, wherein
the reaction force generating unit includes plural kinds of springs configured to apply the reaction force to the brake pedal by elastically deforming due to a load applied to the brake pedal when the posture of the brake pedal changes due to the brake operation, and the plural kinds of springs are from among a leaf spring, a compression coil spring, a tension coil spring, and a torsion coil spring.

16. The brake pedal device of claim 1, wherein
the reaction force generating unit is made of a rubber material, which is configured to be elastically deformed when the posture of the brake pedal changes due to the brake operation, and to apply the reaction force to the brake pedal due to a load applied to the brake pedal.

17. The brake pedal device of claim 1, wherein
the reaction force generating unit includes an actuator part configured to change the reaction force to the brake pedal based on (i) the amount of change in the posture of the brake pedal detected by the sensor unit and (ii) a predetermined control map.

18. A brake pedal device comprising:
a casing;
a brake pedal connected to the casing with a posture changeable by a brake operation of a driver, and including an operation unit that is pressed by the driver when the brake operation is performed;
a reaction force generating unit provided inside the casing, and the reaction force generating unit being configured to generate a reaction force with respect to the brake pedal in accordance with an amount of change in the posture of the brake pedal during the brake operation, and to cause the brake pedal to return to a reference position when the brake operation is released;
a sensor unit provided outside the casing, to detect as the amount of change in the posture of the brake pedal; and
a sensor protector provided at the casing in a position away from the brake pedal, and covering at least a part of the sensor unit, wherein
the brake pedal device is mounted on a vehicle having an accelerator pedal provided on a right side of the brake pedal device in a left-right direction of the vehicle, the accelerator pedal being configured to perform an accelerator operation by the foot of the driver,
the brake pedal is a pedal on which the brake operation is performed by the foot of the driver,
the sensor unit is provided at a position between the brake pedal and the accelerator pedal, and
the sensor protector covers at least one of an upper part of the sensor unit in a vertical direction and a rear part of the sensor unit in a vehicle front-rear direction.

19. The brake pedal device of claim 18, wherein
a pedal module includes an accelerator pedal device to which the accelerator pedal is attached,
the accelerator pedal device includes an accelerator housing by which the accelerator pedal is supported, and
the sensor protector is connected to the accelerator housing.

* * * * *